(12) United States Patent
Deng et al.

(10) Patent No.: US 12,003,714 B2
(45) Date of Patent: *Jun. 4, 2024

(54) DEBLOCKING FILTERING AT CODING BLOCK OR SUBBLOCK BOUNDARY

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Kai Zhang, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,082

(22) Filed: Aug. 8, 2022

(65) Prior Publication Data

US 2022/0394248 A1 Dec. 8, 2022

Related U.S. Application Data

(63) Continuation of application No. 17/678,827, filed on Feb. 23, 2022, now Pat. No. 11,438,585, which is a
(Continued)

(30) Foreign Application Priority Data

Aug. 23, 2019 (WO) ................ PCT/CN2019/102217

(51) Int. Cl.
*H04N 19/117* (2014.01)
*H04N 19/159* (2014.01)
(Continued)

(52) U.S. Cl.
CPC ......... *H04N 19/117* (2014.11); *H04N 19/159* (2014.11); *H04N 19/176* (2014.11);
(Continued)

(58) Field of Classification Search
CPC ..... H04N 19/117; H04N 19/159; H04N 19/70
(Continued)

(56) References Cited

U.S. PATENT DOCUMENTS 9,137,547 B2 9/2015 Van Der Auwera et al.
9,538,200 B2 1/2017 Van Der Auwera et al.
(Continued)

FOREIGN PATENT DOCUMENTS

CN 106464866 A 2/2017
CN 108989806 A 12/2018
(Continued)

OTHER PUBLICATIONS

Document: JVET-O0287-v2, Tsai, C., et al., "CE5-related: Simplification of subblock deblocking," Joint Video Experts Team (JVET) of ITU-T SG 16 WP3 and ISO/IEC JTC 1/SC 29/WG 11, 15th Meeting: Gothenburg, SE, 15th Meeting: Gothenburg, SE, Jul. 2019, 6 pages.
(Continued)

*Primary Examiner* — Amir Shahnami
(74) *Attorney, Agent, or Firm* — Conley Rose, P.C.

(57) ABSTRACT

A method of video processing is described. The method includes determining, for subblocks of a current video block of a video, subblock boundaries to which a deblocking filter is to be applied according to a rule; and performing a conversion between the video and a coded representation of the video using the deblocking filter, wherein the rule specifies that a deblocking filter length is determined without checking a relationship between i) a sum of a position of
(Continued)

a subblock of the current video block and a predefined value and ii) a width or a height of the current video block.

20 Claims, 24 Drawing Sheets

Related U.S. Application Data continuation of application No. PCT/CN2020/110784, filed on Aug. 24, 2020.

(51) Int. Cl.
　　*H04N 19/176*　　(2014.01)
　　*H04N 19/186*　　(2014.01)
　　*H04N 19/70*　　(2014.01)
　　*H04N 19/82*　　(2014.01)
(52) U.S. Cl.
　　CPC ........... *H04N 19/186* (2014.11); *H04N 19/70* (2014.11); *H04N 19/82* (2014.11)
(58) Field of Classification Search
　　USPC ..................................................... 375/240.02
　　See application file for complete search history.

(56)　　　　　　References Cited

U.S. PATENT DOCUMENTS

| | | | |
|---|---|---|---|
| 9,723,331 | B2 | 8/2017 | Van Der Auwera et al. |
| 10,321,130 | B2 | 6/2019 | Dong et al. |
| 10,582,213 | B2 | 3/2020 | Li et al. |
| 10,708,591 | B2 | 7/2020 | Zhang et al. |
| 10,708,592 | B2 | 7/2020 | Dong et al. |
| 2011/0200103 | A1 | 8/2011 | Kim et al. |
| 2013/0034169 | A1 | 2/2013 | Sadafale |
| 2013/0101024 | A1 | 4/2013 | Van der Auwera |
| 2013/0107973 | A1 | 5/2013 | Wang et al. |
| 2014/0321552 | A1 | 10/2014 | He et al. |
| 2015/0350687 | A1 | 12/2015 | Zhai |
| 2016/0100163 | A1 | 4/2016 | Rapaka |
| 2018/0270480 | A1 | 9/2018 | Zhang |
| 2019/0230353 | A1 | 7/2019 | Gadde et al. |
| 2019/0238845 | A1 | 8/2019 | Zhang et al. |
| 2020/0077092 | A1* | 3/2020 | Lin ...................... H04N 19/172 |
| 2020/0177910 | A1 | 6/2020 | Li et al. |
| 2020/0236353 | A1 | 7/2020 | Zhang et al. |
| 2021/0120239 | A1 | 4/2021 | Zhu et al. |
| 2021/0337239 | A1 | 10/2021 | Zhang et al. |
| 2021/0409701 | A1 | 12/2021 | Zhu et al. |

FOREIGN PATENT DOCUMENTS

| | | | |
|---|---|---|---|
| CN | 109547787 | A | 3/2019 |
| CN | 109792533 | A | 5/2019 |
| CN | 109891895 | A | 6/2019 |
| CN | 110024403 | A | 7/2019 |
| EP | 1677545 | A2 | 7/2006 |
| EP | 1909504 | A1 | 7/2006 |
| EP | 1950971 | A2 | 7/2008 |
| WO | 2019137750 | A1 | 7/2019 |
| WO | 2020050279 | A1 | 3/2020 |
| WO | 2020175145 | A1 | 9/2020 |

OTHER PUBLICATIONS

Document: JVET-R0072-v2 Deng, Z., et al., "AHG9: On signalling of deblocking control," Joint Video Experts Team (JVET) of ITU-T SG 16 WP 3 and ISO/IEC JTC 1/SC 29/WG 11, 18th Meeting: by teleconference, Apr. 15-24, 2020, 7 pages.
Document: JVET-R0289-r1, Park, N., et al., "[AHG16] On deblocking filter process," Joint Video Experts Team (JVET) of ITU-T SG 16 WP 3 and ISO/IEC JTC 1/SC 29/WG 11, 18th Meeting: by teleconference, Apr. 15-24, 2020, 10 pages.

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
High Efficiency Video Coding, Series H: Audiovisual and Multimedia Systems: Infrastructure of Audiovisual Services Coding of Moving Video, ITU-T Telecommunication Standardization Sector of ITU, H.265, Feb. 2018.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "Algorithm Description for Versatile Video Coding and Test Model 5 (VTM 5)," Joint Video Experts Team JVET) of ITU-T SG 16 WP 3 and ISO/IEC JTC 1/SC 29/WG 1114th Meeting: Geneva, CH, Mar. 19-27, 2019, document JVET-N1002, 2019.
VTM software: https://vcgit.hhi.fraunhofer.de/jvet/VVCSoftware_VTM.git, Oct. 28, 2022.
Leannec et al. "Non-CE6: Simplified SBT Mode Coding," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-00465, 2019.
Wamura et al. "Non-CE5: Boundary Strength Derivation of Deblocking Filter for Transform-Skipped Block," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0656, 2019.
Andersson et al. "CE5-2.1 and CE5-2.2: Deblocking on 4×4 Sample Grids," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0060, 2019.
Andersson et al. "Non-CE5: Deblocking Based on DMVR Refined Motion," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0158, 2019.
Misra et al. "Non-CE11: On ISP Transform Boundary Deblocking," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0473, 2019.
Document: JVET-R0289, Park, N., et al., "[AHG 16] On deblocking filter process," Joint Video Experts Team (JVET) of ITU-T SG 16 WP 3 and ISO/IEC JTC 1/SC 29/WG 11 18th Meeting: by teleconference, Apr. 15-24, 2020, 9 pages.
Document: JVET-R0072-v1, Deng, Z., et al., "AHG9: On signalling of deblocking control," Joint Video Experts Team (JVET) of ITU-T SG 16 WP 3 and ISO/IEC JTC 1/SC 29/WG 11 18th Meeting: by teleconference, Apr. 15-24, 2020, 7 pages.
Document: JVET-O0025-v6, Norkin, A., et al., "CE5: Summary Report on Loop Filtering," Joint Video Experts Team (JVET) of ITU-T SG 16 WP 3 and ISO/IEC JTC 1/SC 29/WG 11 15th Meeting: Gothenburg, SE, Jul. 3-12, 2019, 16 pages.
Document: JVET-K0307-v1, Andersson, K., et al., "CE2-2.1.1: Long deblocking filters and fixes," Joint Video Experts Team (JVET) of ITU-T SG 16 WP 3 and ISO/IEC JTC 1/SC 29/WG 11 11th Meeting: Ljubljana, SI, Jul. 10-18, 2018, 6 pages.
Document: JVET-O2002-v1, Chen, J., et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 80 pages.
International Search Report and Written Opinion from International Patent Application No. PCT/CN2020/110782 dated Dec. 2, 2020 (10 pages).
International Search Report and Written Opinion from International Patent Application No. PCT/CN2020/110784 dated Nov. 13, 2020 (11 pages).
Notice of Allowance dated Jun. 9, 2022, 16 pages, U.S. Appl. No. 17/678,827, filed Feb. 23, 2022.
Foreign Communication From A Related Counterpart Application, European Application No. 20858015.9, Extended European Search Report dated Aug. 23, 2022, 16 pages.

\* cited by examiner

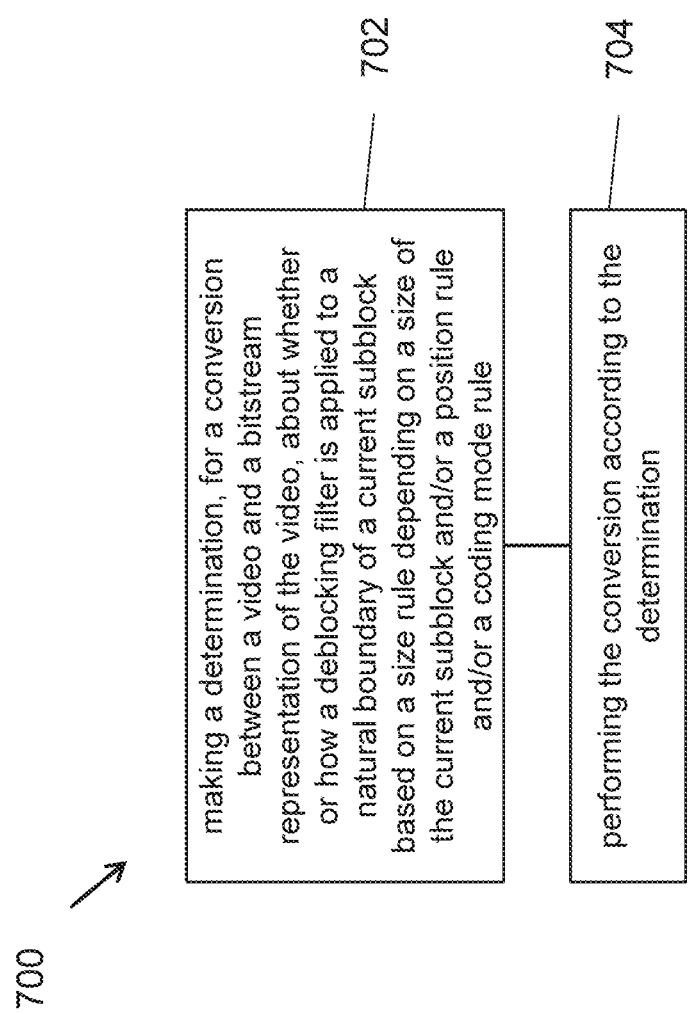

DEBLOCKING FILTERING AT CODING BLOCK OR SUBBLOCK BOUNDARY

CROSS REFERENCE TO RELATED APPLICATIONS

This application is a continuation of U.S. patent application Ser. No. 17/678,827 filed on Feb. 23, 2022, which is a continuation of International Patent Application No. PCT/CN2020/110784 filed on Aug. 24, 2020, which claims the priority to and benefits of International Patent Application No. PCT/CN2019/102217 filed on Aug. 23, 2019. All the aforementioned patent applications are hereby incorporated by reference in their entireties.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to video and image coding and decoding that use in-loop filtering such as a deblocking filter.

In one example aspect, a method of video processing is disclosed. The method includes determining, for subblocks of a current video block of a video, subblock boundaries to which a deblocking filter is to be applied according to a rule; and performing a conversion between the video and a coded representation of the video using the deblocking filter, wherein the rule specifies that a deblocking filter length is determined without checking a relationship between i) a sum of a position of a subblock of the current video block and a predefined value and ii) a width or a height of the current video block.

In another example aspect, another method of video processing is disclosed. The method includes making a determination, for a conversion between a current video block and a coded representation of the video, based on a rule, regarding whether a deblocking filter is applied to a boundary between subblocks of the current video block and/or a deblocking parameter to be used when the deblocking filter is applied; and performing the conversion based on the determination, wherein the rule is based on whether the boundary falls on an N×M sample grid of a subblock, where N and M are integers, and/or whether the boundary is a natural boundary of the current video block.

In another example aspect, another method of video processing is disclosed. The method includes making a determination to apply a deblocking filter to a N×N sample grid of a current video block coded with a geometry prediction mode in which the current video block is split into multiple sub-partitions for prediction, wherein N is equal to 4 or 8; and performing a conversion between a video including the current video block and a coded representation of the video based on the determination.

In another example aspect, another method of video processing is disclosed. The method includes determining, for subblocks of a current video block of a video, subblock boundaries to which a deblocking filter is to be applied according to a rule; and performing a conversion between the video and a coded representation of the video using the deblocking filter.

In another example aspect, another method of video processing is disclosed. The method includes determining, for a conversion between a current video block of a video and a coded representation of the video, a boundary strength applied to a subblock boundary of the current video block using a deblocking filter based on a rule; and performing the conversion based on the determining, wherein the rule specifies that the boundary strength is set equal to 2 regardless of whether the subblock boundary is a transform block boundary.

In another example aspect, another method of video processing is disclosed. The method includes performing a conversion between a current video block of a video and a coded representation of the video according to a rule, wherein, the conversion uses a sub-block transform (SBT) tool comprising: during encoding, partitioning the current video block into transform blocks (TBs) and applying a TB level transform to the TBs, or during decoding, applying a TB level inverse transform to coded samples in the coded representation of the video, wherein the rule specifies that an adaptive filter is enabled across at least three TB boundaries in a horizontal direction and/or vertical direction.

In another example aspect, another method of video processing is disclosed. The method includes making a first determination, for a conversion between a current video block of a video and a coded representation of the video, that two neighboring samples located at two sides of an edge of the current video block belong to two transform blocks without non-zero transform coefficient levels; making a second determination, based on the first determination, to set a deblocking filter strength of the current block edge as 0; and performing the conversion using the first determination and the second determination.

In another example aspect, another method of video processing is disclosed. The method includes performing a conversion between a current video block of a video and a coded representation of the video using a decoder-side motion vector refinement (DMVR) tool; and applying a deblocking filter to a reconstructed video block generated during the conversion; wherein the DMVR tool includes generating the reconstructed video block by motion compensation using a refined motion vector generated by refining a coded motion vector in the coded representation; wherein a parameter of the deblocking filter is based on the refined motion vector.

In another example aspect, another method of video processing is disclosed. The method includes determining, for a conversion between a current video block of a video and a coded representation of the video, based on a rule, a deblocking filter strength for a deblocking filtering process; and performing the conversion based on the determining, and wherein the rule specifies that the deblocking filter strength is not dependent on a prediction mode of adjacent blocks of the current video block.

In another example aspect, another method of video processing is disclosed. The method includes determining, for a conversion between a current video block of a video and a coded representation of the video, whether a deblocking filter is applied to a boundary of the current video block and/or a deblocking parameter to be used in case that the deblocking filter is applied, based on a rule that is dependent on or independent of a type of the boundary; and performing the conversion based on the determining.

In another example aspect, another method of video processing is disclosed. The method includes determining, for a conversion between a video region of a video and a coded representation of the video, that a deblocking filter for a direction is not applied across a virtual boundary that is N samples away from a horizontal boundary, whereby N is an integer greater than 0; and performing the conversion based on the determining.

In another example aspect, another method of video processing is disclosed. The method includes determining, for a conversion between a video region of a video and a coded representation of the video, whether or how to clip a value for a sample during a deblocking process using a deblocking filter, based on a rule that is dependent on whether a boundary to be filtered by the deblocking filter coincides with a virtual boundary that is N samples away from a horizontal boundary of the video region, whereby N is an integer greater than 0; and performing the conversion based on the determining.

In another example aspect, another method of video processing is disclosed. The method includes determining a coding tool used for a conversion between a current video block of a video and a coded representation of the video according to a rule, and performing the conversion according to the coding tool, wherein the rule specifies that a sub-block transform (SBT) tool is used exclusively with a subblock based coding mode.

In another example aspect, another method of video processing is disclosed. The method includes determining, for a current video block that is split into sub-partitions according to use of an intra sub-partitioning (ISP) mode, to apply a deblocking filter to a boundary between two sub-partitions of the current video block; and performing a conversion between the current video block of a video and a coded representation of the video based on the determining.

In another example aspect, another method of video processing is disclosed. The method includes determining, for a current video block coded with a geometry prediction mode in which the current video block is split into sub-partitions, to apply a deblocking filter to a boundary between two M×N regions of the current video block, where M and N are integers; and performing a conversion between the current video block of a video and a coded representation of the video based on the determining.

In another example aspect, another method of video processing is disclosed. The method includes determining, for a conversion between a video including video blocks and a coded representation of the video, to apply a deblocking filter to a boundary between two adjacent video blocks due to at least one of the two adjacent video blocks coded with a geometry prediction mode in which at least one of the two adjacent video blocks is split into sub-partitions; and performing the conversion based on the determining.

In another example aspect, another method of video processing is disclosed. The method includes determining, for a conversion between a current video block of a video and a coded representation of the video, a filtering parameter used in a filtering process based on a rule; and performing the conversion based on the determining, and wherein the rule specifies that the filtering parameter is dependent on i) motion information used in a motion compensation process, ii) motion information stored in a motion storage, or iii) motion information used in a motion vector prediction process.

In another example aspect, another method of video processing is disclosed. The method includes performing a conversion between a video and a coded representation of the video, and wherein the coded representation conforms to a formatting rule, wherein the formatting rule specifies whether to include a chroma syntax element indicative of a chroma component in the coded representation based on a chroma format, a coding mode associated with the chroma component, or a chroma information syntax element.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 7 is a flowchart for an example method of video processing.

DETAILED DESCRIPTION

Figure 1:
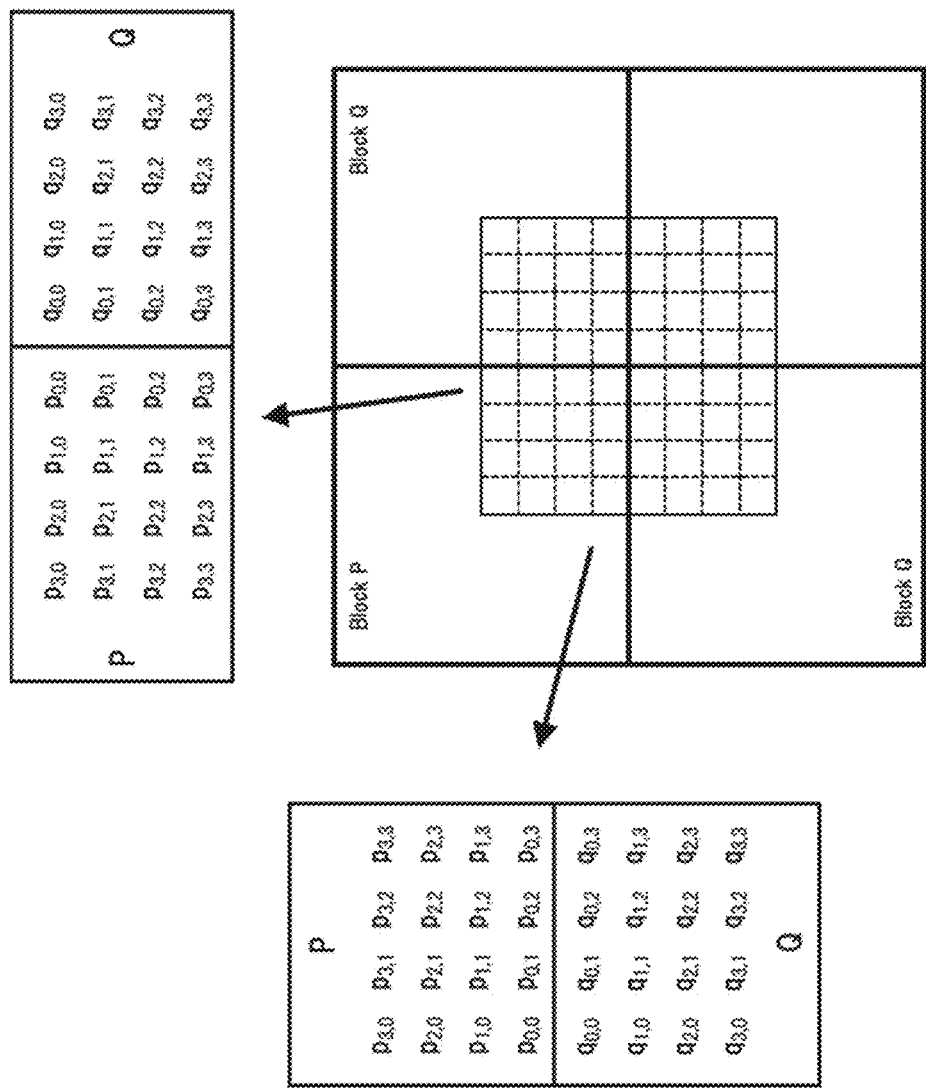
FIG. 1 shows examples of Sample position of $p_{i,k}$ and $q_{i,k}$.

Embodiments of the disclosed technology may be applied to existing video coding standards (e.g., High Efficiency Video Coding (HEVC), H.265) and future standards to improve compression performance. Section headings are used in the present document to improve readability of the description and do not in any way limit the discussion or the embodiments (and/or implementations) to the respective sections only.

1 SUMMARY

This document is related to video coding technologies. Specifically, it is about deblocking filter and related techniques in video coding. It may be applied to the existing video coding standard like HEVC, or the standard Versatile Video Coding (VVC) to be finalized. It may be also applicable to future video coding standards or video codec.

2 INITIAL DISCUSSION

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (WET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

2.1 Deblocking Filter in VVC

There are totally three in-loop filters in VTM6. Besides deblocking filter and sample adaptive offset (SAO) (the two loop filters in HEVC), adaptive loop filter (ALF) are applied in the VTM5. The order of the filtering process in the VTM6 is the deblocking filter, SAO and ALF. In the VTM6, deblocking filtering process is mostly the same to those in HEVC. However, the following modifications are added.
  a) The filter strength of the deblocking filter dependent of the averaged luma level of the reconstructed samples.
  b) Deblocking tC table extension.
  c) luma deblocking on 4×4 sample grids and chroma deblocking on 8×8 sample grids.
  d) Stronger deblocking filter for luma.
  e) Stronger deblocking filter for chroma.

2.1.1 Filter Strength Dependent on Reconstructed Average Luma Level

In HEVC, the filter strength of the deblocking filter is controlled by the variables $\beta$ and $t_C$ which are derived from the averaged quantization parameters $qP_L$. In the VTM5, deblocking filter controls the strength of the deblocking filter by adding offset to $qP_L$ according to the luma level of the reconstructed samples. The reconstructed luma level LL is derived as follows:

$$LL=((p_{0,0}+p_{0,3}+q_{0,0}+q_{0,3})>>2)/(1<<\text{bitDepth})$$

where, the sample values $p_{i,k}$ and $q_{i,k}$ with i=0 . . . 3 and k=0 and 3 are derived as shown in FIG. 1.

The variable $qP_L$ is derived as follows:

$$qP_L=((Qp_Q+Qp_P+1)>>1)+qp\text{Offset}$$

where $Qp_Q$ and $Qp_P$ denote the quantization parameters of the coding units containing the sample $q_{0,0}$ and $p_{0,0}$, respectively. The offset qpOffset dependent on transfer function, the values are signaled in the sequence parameter set (SPS).

2.1.2 Deblocking $t_C$ Table Extension

In VVC, Maximum QP was changed from 51 to 63, and it is desired to reflect corresponding change to deblocking table, which derive values of deblocking parameters $t_C$ based on the block QP. Table 1 is updated $t_C'$ table to accommodate the extension of the QP range. The variable $t_C$ is derived as follows:

$$t_C=\text{BitDepth}_Y<10?(t_C'+2)<<(10-\text{BitDepth}_Y):t_C'*(1<<(\text{BitDepth}_Y-10))$$

TABLE 1

Derivation of threshold variables β' and $t_C'$ from input Q

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| β' | 0 | 0 | 0 | 0 | 0 | 0 | 0 | 0 | 0 | 0 | 0 | 0 | 0 | 0 | 0 | 0 | 6 |
| $t_C'$ | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| $t_C'$ | 0 | 3 | 4 | 4 | 4 | 4 | 5 | 5 | 5 | 5 | 7 | 7 | 8 | 9 | 10 | 10 | 11 |
| Q | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| $t_C'$ | 13 | 14 | 15 | 17 | 19 | 21 | 24 | 25 | 29 | 33 | 36 | 41 | 45 | 51 | 57 | 64 | 71 |
| Q | 51 | 52 | 53 | 54 | 55 | 56 | 57 | 58 | 59 | 60 | 61 | 62 | 63 | 64 | 65 | | |
| β' | 64 | 66 | 68 | 70 | 72 | 74 | 76 | 78 | 80 | 82 | 84 | 86 | 88 | — | — | | |
| $t_C'$ | 80 | 89 | 100 | 112 | 125 | 141 | 157 | 177 | 198 | 222 | 250 | 280 | 314 | 352 | 395 | | |

2.1.3 Stronger Deblocking Filter for Luma

A bilinear filter (stronger deblocking filter) is used when samples at either one side of a boundary belong to a large block. A sample belonging to a large block is defined as when the width is larger than or equal to 32 for a vertical edge, and when height is larger than or equal to 32 for a horizontal edge. Block boundary samples $p_i$ for i=0 to Sp−1 and $q_i$ for j=0 to Sq−1 are then replaced by linear interpolation as follows:

$$p_i'=(f_i*\text{Middle}_{s,t}+(64-f_i)*P_S+32)>>6),\text{clipped to } p_i\pm tcPD_i$$

$$q_i'=(g_j*\text{Middle}_{s,t}+(64-g_j)*Q_S+32)>>6),\text{clipped to } q_j\pm tcPD_j$$

where $tcPD_i$ and $tcPD_j$ term is a position dependent clipping and $g_j$, $f_i$, $\text{Middle}_{s,t}$, $P_s$ and $Q_s$ are given below:

TABLE 2

Derivation of stronger deblocking parameters for luma

| Sp, Sq | |
|---|---|
| 7, 7 (p side: 7, q side: 7) | $f_i = 59 - i * 9$, can also be described as $f = \{59, 50, 41, 32, 23, 14, 5\}$<br>$g_j = 59 - j * 9$, can also be described as $g = \{59, 50, 41, 32, 23, 14, 5\}$<br>$\text{Middle}_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1, Q_7 = (q_6 + q_7 + 1) >> 1$ |
| 7, 3 (p side: 7 q side: 3) | $f_i = 59 - i * 9$, can also be described as $f = \{59, 50, 41, 32, 23, 14, 5\}$<br>$g_j = 53 - j * 21$, can also be described as $g = \{53, 32, 11\}$<br>$\text{Middle}_{7,3} = (2 * (p_0 + q_0) + q_0 + 2 * (q_1 + q_2) + p_1 + q_1 + p_2 + p_3 + p_4 + p_5 + p_6 + 8) >> 4$<br>$P_7 = (p_6 + p_7 + 1) >> 1, Q_3 = (q_2 + q_3 + 1) >> 1$ |

TABLE 2-continued

Derivation of stronger deblocking parameters for luma

| | |
|---|---|
| 3, 7<br>(p side: 3<br>q side: 7) | $g_j = 59 - j * 9$, can also be described as<br>$g = \{59, 50, 41, 32, 23, 14, 5\}$<br>$f_i = 53 - i * 21$, can also be described as<br>$f = \{53, 32, 11\}$<br>Middle$_{3,7} = (2 * (q_0 + p_0) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1$, $P_3 = (q_2 + q_3 + 1) >> 1$ |
| 7, 5<br>(p side: 7<br>q side: 5) | $g_j = 58 - j * 13$, can also be described as<br>$g = \{58, 45, 32, 19, 6\}$<br>$f_i = 59 - i * 9$, can also be described as<br>$f = \{59, 50, 41, 32, 23, 14, 5\}$<br>Middle$_{7,5} = (2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1$, $P_7 = (p_6 + p_7 + 1) >> 1$ |
| 5, 7<br>(p side: 5<br>q side: 7) | $g_j = 59 - j * 9$, can also be described as<br>$g = \{59, 50, 41, 32, 23, 14, 5\}$<br>$f_i = 58 - i * 13$, can also be described as<br>$f = \{58, 45, 32, 19, 6\}$<br>Middle$_{5,7} = (2 * (q_0 + p_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1$, $P_5 = (p_4 + p_5 + 1) >> 1$ |
| 5, 5<br>(p side: 5<br>q side: 5) | $g_j = 58 - j * 13$, can also be described as<br>$g = \{58, 45, 32, 19, 6\}$<br>$f_i = 58 - i * 13$, can also be described as<br>$f = \{58, 45, 32, 19, 6\}$<br>Middle$_{5,5} = (2 * (q_0 + p_0 + p_1 + q_1 + q_2 + p_2) + q_3 + p_3 + q_4 + p_4 + 8) >> 4$<br>$Q_5 = (q_4 + q_5 + 1) >> 1$, $P_5 = (p_4 + p_5 + 1) >> 1$ |
| 5, 3<br>(p side: 5<br>q side: 3) | $g_j = 53 - j * 21$, can also be described as<br>$g = \{53, 32, 11\}$<br>$f_i = 58 - i * 13$, can also be described as<br>$f = \{58, 45, 32, 19, 6\}$<br>Middle$_{5,3} = (q_0 + p_0 + p_1 + q_1 + q_2 + p_2 + q_3 + p_3 + 4) >> 3$<br>$Q_3 = (q_2 + q_3 + 1) >> 1$, $P_5 = (p_4 + p_5 + 1) >> 1$ |
| 3, 5<br>(p side: 3<br>q side: 5) | $g_j = 58 - j * 13$, can also be described as<br>$g = \{58, 45, 32, 19, 6\}$<br>$f_i = 53 - i * 21$, can also be described as<br>$f = \{53, 32, 11\}$<br>Middle$_{3,5} = (q_0 + p_0 + p_1 + q_1 + q_2 + p_2 + q_3 + p_3 + 4) >> 3$<br>$Q_5 = (q_4 + q_5 + 1) >> 1$, $P_3 = (p_2 + p_3 + 1) >> 1$ |

Above mentioned stronger luma filters are used only if all of the Condition1, Condition2 and Condition 3 are TRUE. The condition 1 is the "large block condition". This condition detects whether the samples at P-side and Q-side belong to large blocks. The condition 2 and condition 3 are determined by:

Condition2=$(d<\beta)$?TRUE:FALSE

Condition3=StrongFilterCondition=($dpq$ is less than $(\beta>>2)$,$sp_3+sq_3$ is less than $(3*\beta>>5)$, and Abs $(p_0-q_0)$ is less than $(5*t_C+1)>>1$)?TRUE: FALSE 2.1.4 Strong Deblocking Filter for Chroma The following strong deblocking filter for chroma is defined:

$p_2'=(3*p_3+2*p_2+p_1+p_0+q_0+4)>>3$ $p_1'=(2*p_3+p_2+2*p_1+p_0+q_0+q_1+4)>>3$ $p_0'=(p_3+p_2+p_1+2*p_0+q_0+q_1+q_2+4)>>3$

The above chroma filter performs deblocking on an 8×8 chroma sample grid. The chroma strong filters are used on both sides of the block boundary. Here, the chroma filter is selected when both sides of the chroma edge are greater than or equal to 8 (in unit of chroma sample), and the following decision with three conditions are satisfied. The first one is for decision of boundary strength as well as large block. The second and third ones are basically the same as for HEVC luma decision, which are on/off decision and strong filter decision, respectively. In the first decision, boundary strength (bS) is modified for chroma filtering as shown in Table 2. The condition in Table 3 are checked sequentially. If a condition is satisfied, then the remaining conditions with lower priorities are skipped.

TABLE 3

The modified boundary strength (note that P and Q are two adjacent blocks at left/right or top/bottom side of a deblocking edge)

| Conditions | Y | U | V |
|---|---|---|---|
| P and Q are BDPCM | 0 | N/A | N/A |
| P or Q is intra | 2 | 2 | 2 |
| It is a transform block edge, and P or Q is CIIP | 2 | 2 | 2 |
| It is a transform block edge, and P or Q has non-zero transform coefficients | 1 | 1 | 1 |
| It is a transform block edge, and P or Q is JCCR | N/A | 1 | 1 |
| P and Q are in different code modes | 1 | 1 | 1 |
| P and Q are IBC, and the BV distance >= 1/2-pel in x- or y-dir | 1 | N/A | N/A |
| P and Q have different ref pictures, or have different number of MVs | 1 | N/A | N/A |
| P and Q have only one mv, and the MV distance >= 1/2-pel in x- or y-dir | 1 | N/A | N/A |
| P and Q have two MVs pointing to two difference ref pictures, their MVs pointing to the same ref picture have the distance >= 1/2-pel in x- or y-dir | 1 | N/A | N/A |
| P and Q have two MVs pointing to the same ref pictures, any one of their four MV pairs has the distance >= 1/2-pel in x- or y-dir | 1 | N/A | N/A |
| Otherwise | 0 | 0 | 0 |

Chroma deblocking is performing when bS is equal to 2, or bS is equal to 1 when a large block boundary is detected. The second and third condition is basically the same as BEVC luma strong filter decision.

Figure 2:
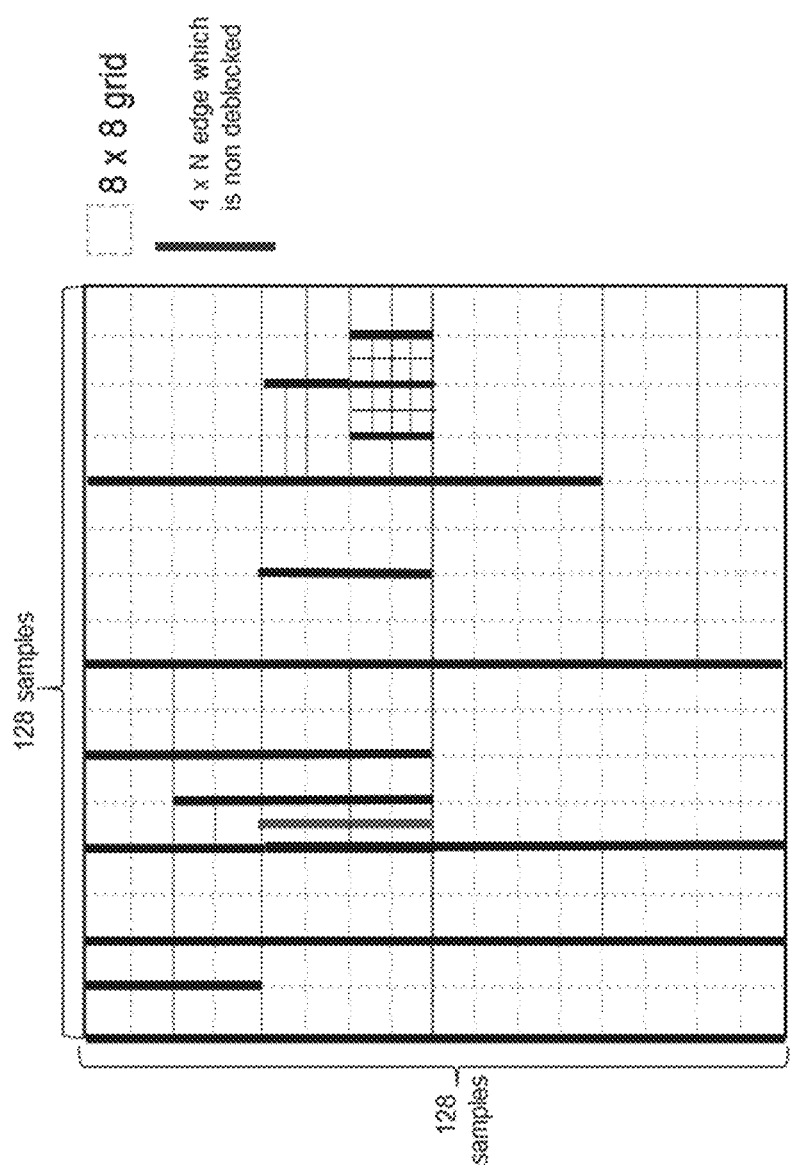
FIG. 2 shows an example of deblocking on an 8×8 grid.

2.1.5 Luma Deblocking on 4×4 Sample Grids and Chroma Deblocking on 8×8 Sample Grids VTM5.0 performs deblocking on 8×8 sample grids. Therefore deblocking is only performed for all the block edges which overlap with the 8×8 sample grids. Due to the VTM5.0 partitioning scheme (Binary-tree (BT), Ternary-tree (TT), Intra Sub Partitions, Sub Block Transforms), some long coding unit (CU) edges which may not overlap with the 8×8 sample grids but still have sufficient blocking artifacts. The scenario is depicted in the FIG. 2. The edge shown in gray color belongs to a 4×16 block and VTM5.0 deblocking does not perform deblocking on this edge, as it does not overlap with an 8×8 sample grid.

In VTM6.0, it adopted to apply luma deblocking on 4×4 sample grids and chroma deblocking on 8×8 sample grids. It enforces the luma weak filtering with one or no sample modification, when any of the blocks sharing the edge has a size of 4 samples. (i.e. width=4 samples for vertical edge, height=4 samples for horizontal edge).

The different steps performed for a vertical edge are illustrated below:

Check if filter on/off condition (i.e. d<Beta, where d=dpq0+dpq3 and dpq0=dp0+dq0 and dpq3=dp3+dq3) is evaluated to true for the respective edge. If true, then:
Check if the one of the blocks has a block width of 4 samples. If true, then:
Enforce weak filter with maximum one sample modification. Therefore the following condition is checked $|\delta|<10(t_C)$ where $8=(9*(q_0-p_0)-(3*(q_1-p_1)+8)>>4$, and if the condition is evaluated to true, then samples $p_0$ and $q_0$ are modified, otherwise no filtering is applied.

Figure 3:
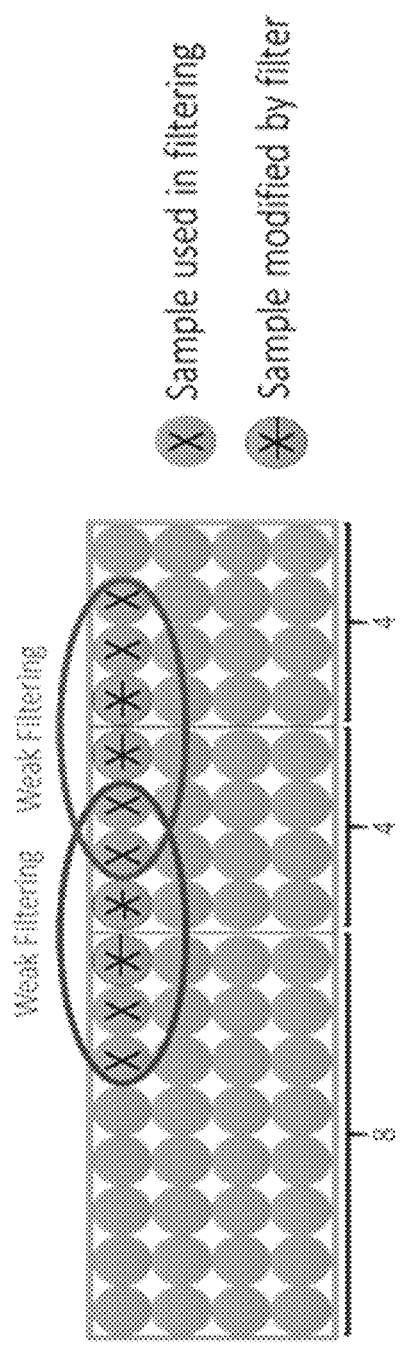
FIG. 3 shows an example of a Weak filter with one sample modification for 4×N, N×4 and 8×N, N×8 blocks.

FIG. 3 shows an example of a weak filter with one sample modification for 4×N, N×4 and 8×N, N×8 blocks.

2.1.6 Boundary Decision (Edges which May be Filtered)

Filtering is applied to 4×4 grid for luma, and 8×8 grid for chroma. In addition, it must be a transform block boundary or a coding subblock boundary (e.g., due to usage of Affine motion prediction, ATMVP). For those which are not such boundaries, filter is disabled. maxFilterLengthPs and maxFilterLengthQs indicates how many samples to be filtered for the P and Q side, respectively.

2.1.6.1 Transform Unit (TU) Boundary

For each 4 columns for horizontal edges (or 4 rows for horizontal edge), check the following to decide the filter length for P and Q blocks separately. Taking the horizontal edges for example:
If the row is a transform block edge (i.e., the location (xCb+x, yCb+y) is at a transform block edge), edgeFlags[x][y] is set equal to 1.
If edgeFlags[x][y] is set equal to 1, the following applies:
maxFilterLengthQs[x][y] is set:
   if transform block height of P or Q is smaller or equal to 4, is font s
   if transform block height of Q is equal to or greater than 32, maxFilterLengthQs[x][y] is set to 7;
   otherwise, maxFilterLengthQs[x][y] is set to 3.
maxFilterLengthPs[x][y] is set:
   if transform block width of P or Q is smaller or equal to 4, maxFilterLengthPs[x][y] is set to 1;
   if transform block width of P is equal to or greater than 32, maxFilterLengthPs[x][y] is set to 7;
   otherwise, maxFilterLengthPs[x][y] is set to 3.

2.1.6.2 Sub-Block Boundary

The sub-block height used in deblocking filter process for sub-block boundary detection is set to Max(8, nCbH/numSbY).

The array edgeTbFlags is set equal to edgeFlags.
For yEdge=0 . . . min((nCbH/8)-1, numSbY-1), x=0 . . . nCbW-1:
   The vertical position y inside the current coding block is set equal to yEdge*sbH.
   When edgeFlags[x][y] is equal to 1, the values of maxFilterLengthPs[x][y] and maxFilterLengthQs[x][y] are modified as follows:
      If y is equal to 0 (first sub-block) and edgeFlags[x][y] is equal to 1, the following applies:
         When numSbY is greater than 1 (Q is sub-block coded), the following applies:

maxFilterLength$Qs$[x][y]=Min(5,maxFilterLength$Qs$[x][y])   (8-1039)

When inter_affine_flag[xCb][yCb-1] is equal to 1 or merge_subblock_flag[xCb][yCb-1] is equal to 1(P is sub-block coded), the following applies:

maxFilterLength$Ps$[x][y]=Min(5,maxFilterLength$Ps$[x][y])   (8-1040)

Otherwise, if edgeTbFlags[x][y] is equal to 1(not 1st sub-block and TB boundary), the following applies:

maxFilterLength$Ps$[x][y]=Min(5,maxFilterLength$Ps$[x][y])   (8-1041)

maxFilterLength$Qs$[x][y]=Min(5,maxFilterLength$Qs$[x][y])   (8-1042)

Otherwise, if one or more of the following conditions are true:
         (y+4) is greater than or equal to nCbH, (last sub-block)
         edgeTbFlags[x][y-4] is equal to 1, (top 4-samples away is a TU boundary)
         edgeTbFlags[x][y+4] is equal to 1, (below 4-samples away is a TU boundary) the following applies:

maxFilterLength$Ps$[x][y]=maxFilterLength$Qs$[x][y]=1

Otherwise, if one or more of the following conditions are true:
         yEdge is equal to 1, (second sub-block)
         yEdge is equal to (nCbH/8)-1, (last sub-block)
         edgeTbFlags[x][y-sbH] is equal to 1, (top sbH-samples away is a TU boundary)
         edgeTbFlags[x][y+sbH] is equal to 1, (top sbH-samples away is a TU boundary) the following applies:

maxFilterLength$Ps$[x][y]=maxFilterLength$Qs$[x][y]=2

Otherwise, the following applies:

maxFilterLength$Ps$[x][y]=maxFilterLength$Qs$[x][y]=3

It could be seen that deblocking filter is enabled on 4×4 luma grid at transform edges but 8×8 luma grid at subblock boundaries. The subblock boundaries include the prediction unit boundaries introduced by spatial temporal motion vector prediction (STMVP) and affine modes. For subblock-based TMVP (SbTMVP) and affine subblocks on 8×8 grid, the same logic in prediction unit (PU) in HEVC deblocking filter is applied. For PU boundaries, the deblocking filter is applied on 8×8 grid with the consideration of the difference between motion vectors and reference pictures of the neighboring subblock.

2.2 Deblocking filtering process in VVC Spec WD6

The following specification of deblocking filtering process is extracted from the latest VVC working draft JVET-O2001-vE.

2.2.1 Deblocking Filter Process 2.2.1.1 General

Inputs to this process are the reconstructed picture prior to deblocking, i.e., the array recPicture$_L$ and, when ChromaArrayType is not equal to 0, the arrays recPicture$_{Cb}$ and recPicture$_{Cr}$.

Outputs of this process are the modified reconstructed picture after deblocking, i.e., the array recPicture$_L$ and, when ChromaArrayType is not equal to 0, the arrays recPicture$_{Cb}$ and recPicture$_{Cr}$.

The vertical edges in a picture are filtered first. Then the horizontal edges in a picture are filtered with samples modified by the vertical edge filtering process as input. The vertical and horizontal edges in the coding tree blocks (CTBs) of each coding tree unit (CTU) are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE—Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,
Edges that coincide with the boundaries of a subpicture for which loop_filter_across_subpic_enabled_flag [SubPicIdx] is equal to 0,
Edges that coincide with the virtual boundaries of the picture when pps_loop_filter_across_virtual_boundaries_disabled_flag is equal to 1,
Edges that coincide with brick boundaries when loop_filter_across_bricks_enabled_flag is equal to 0,
Edges that coincide with slice boundaries when loop_filter_across_slices_enabled_flag is equal to 0,
Edges that coincide with upper or left boundaries of slices with slice_deblocking_filter_disabled_flag equal to 1,
Edges within slices with slice_deblocking_filter_disabled_flag equal to 1,
Edges that do not correspond to 4×4 sample grid boundaries of the luma component,
Edges that do not correspond to 8×8 sample grid boundaries of the chroma component,
Edges within the luma component for which both sides of the edge have intra_bdpcm_flag equal to 1,
Edges of chroma subblocks that are not edges of the associated transform unit.

The edge type, vertical or horizontal, is represented by the variable edgeType as specified in Table 8-17.

TABLE 8-17

Name of association to edgeType

| edgeType | Name of edgeType |
|---|---|
| 0 (vertical edge) | EDGE_VER |
| 1 (horizontal edge) | EDGE_HOR |

When slice_deblocking_filter_disabled_flag of the current slice is equal to 0, the period following applies:

The variable treeType is set equal to DUAL_TREE_LUMA.
The vertical edges are filtered by invoking the deblocking filter process for one direction as specified in clause 8.8.3.2 with the variable treeType, the reconstructed picture prior to deblocking, i.e., the array recPicture$_L$ and the variable edgeType set equal to EDGE_VER as inputs, and the modified reconstructed picture after deblocking, i.e., the array recPicture$_L$ as outputs.
The horizontal edge are filtered by invoking the deblocking filter process for one direction as specified in clause 8.8.3.2 with the variable treeType, the modified reconstructed picture after deblocking, i.e., the array recPicture$_L$ and the variable edgeType set equal to EDGE_HOR as inputs, and the modified reconstructed picture after deblocking, i.e., the array recPicture$_L$ as outputs.

When ChromaArrayType is not equal to 0, the following applies:
The variable treeType is set equal to DUAL_TREE_CHROMA.
The vertical edges are filtered by invoking the deblocking filter process for one direction as specified in clause 8.8.3.2 with the variable treeType, the reconstructed picture prior to deblocking, i.e., the arrays recPicture$_{Cb}$ and recPicture$_{Cr}$, and the variable edgeType set equal to EDGE_VER as inputs, and the modified reconstructed picture after deblocking, i.e., the arrays recPicture$_{Cb}$ and recPicture$_{Cr}$ as outputs.
The horizontal edge are filtered by invoking the deblocking filter process for one direction as specified in clause 8.8.3.2 with the variable treeType, the modified reconstructed picture after deblocking, i.e., the arrays recPicture$_{Cb}$ and recPicture$_{Cr}$, and the variable edgeType set equal to EDGE_HOR as inputs, and the modified reconstructed picture after deblocking, i.e., the arrays recPicture$_{Cb}$ and recPicture$_{Cr}$ as outputs.

2.2.1.2 Deblocking Filter Process for One Direction

Inputs to this process are:
the variable treeType specifying whether the luma (DUAL_TREE_LUMA) or chroma components (DUAL_TREE_CHROMA) are currently processed,
when treeType is equal to DUAL_TREE_LUMA, the reconstructed picture prior to deblocking, i.e., the array recPicture$_L$,
when ChromaArrayType is not equal to 0 and treeType is equal to DUAL_TREE_CHROMA, the arrays recPicture$_{Cb}$ and recPicture$_{Cr}$,
a variable edgeType specifying whether a vertical (EDGE_VER) or a horizontal (EDGE_HOR) edge is filtered.

Outputs of this process are the modified reconstructed picture after deblocking, i.e:
when treeType is equal to DUAL_TREE_LUMA, the array recPicture$_L$,
when ChromaArrayType is not equal to 0 and treeType is equal to DUAL_TREE_CHROMA, the arrays recPicture$_{Cb}$ and recPicture$_{Cr}$.

The variables firstCompIdx and lastCompIdx are derived as follows:

firstCompIdx=
(treeType==DUAL_TREE_CHROMA)?1:0    (8-1022)

lastCompIdx=
(treeType==DUAL_TREE_LUMA||ChromaArrayType==0)
?0:2    (8-1023)

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edgeType is equal to EDGE_VER and xCb % 8 is equal 0, or when cIdx is not equal to 0 and edgeType is equal to EDGE_HOR and yCb % 8 is equal to 0, the edges are filtered by the following ordered steps:

1. The variable filterEdgeFlag is derived as follows:
   If edgeType is equal to EDGE_VER and one or more of the following conditions are true, filterEdgeFlag is set equal to 0:
   The left boundary of the current coding block is the left boundary of the picture.

The left boundary of the current coding block is the left or right boundary of the subpicture and loop_filter_across_subpic_enabled_flag[SubPicIdx] is equal to 0.

The left boundary of the current coding block is the left boundary of the brick and loop_filter_across_bricks_enabled_flag is equal to 0.

The left boundary of the current coding block is the left boundary of the slice and loop_filter_across_slices_enabled_flag is equal to 0.

The left boundary of the current coding block is one of the vertical virtual boundaries of the picture and pps_loop_filter_across_virtual_boundaries_disabled_flag is equal to 1.

Otherwise, if edgeType is equal to EDGE_HOR and one or more of the following conditions are true, the variable filterEdgeFlag is set equal to 0:

The top boundary of the current luma coding block is the top boundary of the picture.

The top boundary of the current coding block is the top or bottom boundary of the subpicture and loop_filter_across_subpic_enabled_flag[SubPicIdx] is equal to 0.

The top boundary of the current coding block is the top boundary of the brick and loop_filter_across_bricks_enabled_flag is equal to 0.

The top boundary of the current coding block is the top boundary of the slice and loop_filter_across_slices_enabled_flag is equal to 0.

The top boundary of the current coding block is one of the horizontal virtual boundaries of the picture and pps_loop_filter_across_virtual_boundaries_disabled_flag is equal to 1.

Otherwise, filterEdgeFlag is set equal to 1.

2. All elements of the two-dimensional (nCbW)×(nCbH) array edgeFlags, maxFilterLengthQs and maxFilterlengthPs are initialized to be equal to zero.

3. The derivation process of transform block boundary specified in clause 8.8.3.3 is invoked with the location (xCb, yCb), the coding block width nCbW, the coding block height nCbH, the variable cIdx, the variable filterEdgeFlag, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.

4. When cIdx is equal to 0, the derivation process of coding subblock boundary specified in clause 8.8.3.4 is invoked with the location (xCb, yCb), the coding block width nCbW, the coding block height nCbH, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.

5. The picture sample array recPicture is derived as follows:

If cIdx is equal to 0, recPicture is set equal to the reconstructed luma picture sample array prior to deblocking recPicture$_L$.

Otherwise, if cIdx is equal to 1, recPicture is set equal to the reconstructed chroma picture sample array prior to deblocking recPicture$_{Cb}$.

Otherwise (cIdx is equal to 2), recPicture is set equal to the reconstructed chroma picture sample array prior to deblocking recPicture$_{Cr}$.

6. The derivation process of the boundary filtering strength specified in clause 8.8.3.5 is invoked with the picture sample array recPicture, the luma location (xCb, yCb), the coding block width nCbW, the coding block height nCbH, the variable edgeType, the variable cIdx, and the array edgeFlags as inputs, and an (nCbW)×(nCbH) array bS as output.

7. The edge filtering process for one direction is invoked for a coding block as specified in clause 8.8.3.6 with the variable edgeType, the variable cIdx, the reconstructed picture prior to deblocking recPicture, the location (xCb, yCb), the coding block width nCbW, the coding block height nCbH, and the arrays bS, maxFilterLengthPs, and maxFilterLengthQs, as inputs, and the modified reconstructed picture recPicture as output.

2.2.1.3 Derivation Process of Transform Block Boundary

Inputs to this process are:

a location (xCb, yCb) specifying the top-left sample of the current coding block relative to the top-left sample of the current picture, a variable nCbW specifying the width of the current coding block, a variable nCbH specifying the height of the current coding block, a variable cIdx specifying the colour component of the current coding block, a variable filterEdgeFlag, a two-dimensional (nCbW)×(nCbH) array edgeFlags, two-dimensional (nCbW)×(nCbH) arrays maxFilterLengthQs and maxFilterLengthPs, a variable edgeType specifying whether a vertical (EDGE_VER) or a horizontal (EDGE_HOR) edge is filtered.

Outputs of this process are:

the modified two-dimensional (nCbW)×(nCbH) array edgeFlags, the modified two-dimensional (nCbW)×(nCbH) arrays maxFilterLengthQs, maxFilterLengthPs.

Depending on edgeType, the arrays edgeFlags, maxFilterLengthPs and maxFilterLengthQs are derived as follows:

The variable gridSize is set as follows:

$$\text{gridSize}=cIdx==0?4:8 \tag{8-1024}$$

If edgeType is equal to EDGE_VER, the following applies:

The variable numEdges is set equal to Max(1, nCbW/gridSize).

For xEdge=0 ... numEdges−1 and y=0 ... nCbH−1, the following applies:

The horizontal position x inside the current coding block is set equal to xEdge*gridSize.

The value of edgeFlags[x][y] is derived as follows:

If pps_loop_filter_across_virtual_boundaries_disabled_flag equal to 1 and (xCb+x) is equal to PpsVirtualBoundariesPosX[n] for any n=0 ... pps_num_ver_virtual_boundaries−1, edgeFlags[x][y] is set equal to 0.

Otherwise, if x is equal to 0, edgeFlags[x][y] is set equal to filterEdgeFlag.

Otherwise, if the location (xCb+x, yCb+y) is at a transform block edge, edgeFlags[x][y] is set equal to 1.

When edgeFlags[x][y] is equal to 1, the following applies:

If cIdx is equal to 0, the following applies:

The value of maxFilterLengthQs[x][y] is derived as follows:

If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthQs[x][y] is set equal to 1.

Otherwise, if the width in luma samples of the transform block at luma location (xCb+x, yCb+y) is equal to or greater than 32, maxFilterLengthQs[x][y] is set equal to 7.

Otherwise, maxFilterLengthQs[x][y] is set equal to 3.

The value of maxFilterLengthPs[x][y] is derived as follows:

If the width in luma samples of the transform block at luma location (xCb+x, yCb+y) is equal to or less than 4 or the width in luma samples of the transform block at luma location (xCb+x−1, yCb+y) is equal to or less than 4, maxFilterLengthPs[x][y] is set equal to 1.

Otherwise, if the width in luma samples of the transform block at luma location (xCb+x−1, yCb+y) is equal to or greater than 32, maxFilterLengthPs[x][y] is set equal to 7.

Otherwise, maxFilterLengthPs[x][y] is set equal to 3.

Otherwise (cIdx is not equal to 0), the values of maxFilterLengthPs[x][y] and maxFilterLengthQs[x][y] are derived as follows:

If the width in chroma samples of the transform block at chroma location (xCb+x, yCb+y) and the width at chroma location (xCb+x−1, yCb+y) are both equal to or greater than 8, maxFilterLengthPs[x][y] and maxFilterLengthQs[x][y] are set equal to 3.

Otherwise, maxFilterLengthPs[x][y] and maxFilterLengthQs[x][y] are set equal to 1.

Otherwise (edgeType is equal to EDGE_HOR), the following applies:

The variable numEdges is set equal to Max(1, nCbH/gridSize).

For yEdge=0 . . . numEdges−1 and x=0 . . . nCbW−1, the following applies:

The vertical position y inside the current coding block is set equal to yEdge*gridSize.

The value of edgeFlags[x][y] is derived as follows:

If pps_loop_filter_across_virtual_boundaries_disabled_flag equal to 1 and (yCb+y) is equal to PpsVirtualBoundariesPosY[n] for any n=0 . . . pps_num_hor_virtual_boundaries−1, edgeFlags[x][y] is set equal to 0.

Otherwise, if y is equal to 0, edgeFlags[x][y] is set equal to filterEdgeFlag.

Otherwise, if the location (xCb+x, yCb+y) is at a transform block edge, edgeFlags[x][y] is set equal to 1.

When edgeFlags[x][y] is equal to 1, the following applies:

If cIdx is equal to 0, the following applies:

The value of maxFilterLengthQs[x][y] is derived as follows:

If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthQs[x][y] is set equal to 1.

Otherwise, if the height in luma samples of the transform block at luma location (xCb+x, yCb+y) is equal to or greater than 32, maxFilterLengthQs[x][y] is set equal to 7.

Otherwise, maxFilterLengthQs[x][y] is set equal to 3.

The value of maxFilterLengthPs[x][y] is derived as follows:

If the height in luma samples of the transform block at luma location (xCb+x, yCb+y) is equal to or less than 4 or the height in luma samples of the transform block at luma location (xCb+x, yCb+y−1) is equal to or less than 4, maxFilterLengthPs[x][y] is set equal to 1.

Otherwise, if the height in luma samples of the transform block at luma location (xCb+x, yCb+y−1) is equal to or greater than 32, maxFilterLengthPs[x][y] is set equal to 7.

Otherwise, maxFilterLengthPs[x][y] is set equal to 3.

Otherwise (cIdx is not equal to 0), the values of maxFilterLengthPs[x][y] and maxFilterLengthQs[x][y] are derived as follows:

If all of the following conditions are true, maxFilterLengthPs[x][y] and maxFilterLengthQs[x][y] are set equal to 3:

The height in chroma samples of the transform block at chroma location (xCb+x, yCb+y) and the height at chroma location (xCb+x, yCb+y−1) are both equal to or greater than 8.

(yCb+y) % CtbHeightC is greater than 0, i.e. the horizontal edge do not overlap with the upper chroma CTB boundary.

Otherwise, maxFilterLengthPs[x][y] and maxFilterLengthQs[x][y] are set equal to 1.

2.2.1.4 Derivation Process of Coding Subblock Boundary

Inputs to this process are:

a location (xCb, yCb) specifying the top-left sample of the current coding block relative to the top-left sample of the current picture, a variable nCbW specifying the width of the current coding block, a variable nCbH specifying the height of the current coding block, a two-dimensional (nCbW)×(nCbH) array edgeFlags, two-dimensional (nCbW)×(nCbH) arrays maxFilterLengthQs and maxFilterLengthPs, a variable edgeType specifying whether a vertical (EDGE_VER) or a horizontal (EDGE_HOR) edge is filtered.

Outputs of this process are:

the modified two-dimensional (nCbW)×(nCbH) array edgeFlags, the modified two-dimensional (nCbW)×(nCbH) arrays maxFilterLengthQs and maxFilterLengthPs.

The number of coding subblock in horizontal direction numSbX and in vertical direction numSbY are derived as follows:

If inter_affine_flag[xCb][yCb] is equal to 1 or merge_subblock_flag[xCb][yCb] is equal to 1, numSbX and numSbY are set equal to NumSbX[xCb][yCb] and NumSbY[xCb][yCb], respectively.

Otherwise, numSbX and numSbY are both set equal to 1.

Depending on the value of edgeType the following applies:

If edgeType is equal to EDGE_VER, the following applies:

The variable sbW is set equal to Max(8, nCbW/num-SbX).

The array edgeTbFlags is set equal to edgeFlags.

For xEdge=0 . . . min((nCbW/8)−1, numSbX−1), y=0 . . . nCbH−1:

The horizontal position x inside the current coding block is set equal to xEdge*sbW.

The value of edgeFlags[x][y] is derived as follows:

If pps_loop_filter_across_virtual_boundaries_disabled_flag is equal to 1 and x is equal to PpsVirtualBoundariesPosX[n] for any n=0 . . . pps_num_ver_virtual_boundaries−1, the following applies:

edgeFlags[$x$][$y$]=0    (8-1025)

Otherwise, the following applies:

edgeFlags[$x$][$y$]=1    (8-1026)

When edgeFlags[x][y] is equal to 1, the values of maxFilterLengthPs[x][y] and maxFilterLengthQs[x][y] are modified as follows:

If x is equal to 0, the following applies:

When numSbX is greater than 1, the following applies:

maxFilterLength$Qs$[$x$][$y$]=Min(5,maxFilterLength$Qs$[$x$][$y$])    (8-1027)

When inter_affine_flag[xCb−1][yCb] is equal to 1 or merge_subblock_flag[xCb−1][yCb] is equal to 1, the following applies:

maxFilterLength$Ps$[$x$][$y$]=Min(5,maxFilterLength$Ps$[$x$][$y$])    (8-1028)

Otherwise, if edgeTbFlags[x][y] is equal to 1, the following applies:

maxFilterLength$Ps$[$x$][$y$]=Min(5,maxFilterLength$Ps$[$x$][$y$])    (8-1029)

maxFilterLength$Qs$[$x$][$y$]=Min(5,maxFilterLength$Qs$[$x$][$y$])    (8-1030)

Otherwise, if one or more of the following conditions are true:

(x+4) is greater than or equal to nCbW,
edgeTbFlags[x−4][y] is equal to 1,
edgeTbFlags[x+4][y] is equal to 1,
the following applies:

maxFilterLength$Ps$[$x$][$y$]=1    (8-1031)

maxFilterLength$Qs$[$x$][$y$]=1    (8-1032)

Otherwise, if one or more of the following conditions are true:

xEdge is equal to 1,
xEdge is equal to (nCbW/8)−1,
edgeTbFlags[x−sbW][y] is equal to 1,
edgeTbFlags[x+sbW][y] is equal to 1,
the following applies:

maxFilterLength$Ps$[$x$][$y$]=2    (8-1033)

maxFilterLength$Qs$[$x$][$y$]=2    (8-1034)

Otherwise, the following applies:

maxFilterLength$Ps$[$x$][$y$]=3    (8-1035)

maxFilterLength$Qs$[$x$][$y$]=3    (8-1036)

Otherwise, if edgeType is equal to EDGE_HOR, the following applies:

The variable sbH is set equal to Max(8, nCbH/numSbY).

The array edgeTbFlags is set equal to edgeFlags.

For yEdge=0 . . . min((nCbH/8)−1, numSbY−1), x=0 . . . nCbW−1:

The vertical position y inside the current coding block is set equal to yEdge*sbH.

The value of edgeFlags[x][y] is derived as follows:

If pps_loop_filter_across_virtual_boundaries_disabled_flag is equal to 1 and y is equal to PpsVirtualBoundariesPosY[n] for any n=0 . . . pps_num_hor_virtual_boundaries−1, the following applies:

edgeFlags[$x$][$y$]=0    (8-1037)

Otherwise, the following applies:

edgeFlags[$x$][$y$]=1    (8-1038)

When edgeFlags[x][y] is equal to 1, the values of maxFilterLengthPs[x][y] and maxFilterLengthQs[x][y] are modified as follows:

If y is equal to 0 and edgeFlags[x][y] is equal to 1, the following applies:

When numSbY is greater than 1, the following applies:

maxFilterLength$Qs$[$x$][$y$]=Min(5,maxFilterLength$Qs$[$x$][$y$])    (8-1039)

When inter_affine_flag[xCb][yCb−1] is equal to 1 or merge_subblock_flag[xCb][yCb−1] is equal to 1, the following applies:

maxFilterLength$Ps$[$x$][$y$]=Min(5,maxFilterLength$Ps$[$x$][$y$])    (8-1040)

Otherwise, if edgeTbFlags[x][y] is equal to 1, the following applies:

maxFilterLength$Ps$[$x$][$y$]=Min(5,maxFilterLength$Ps$[$x$][$y$])    (8-1041)

maxFilterLength$Qs$[$x$][$y$]=Min(5,maxFilterLength$Qs$[$x$][$y$])    (8-1042)

Otherwise, if one or more of the following conditions are true:

(y+4) is greater than or equal to nCbH,
edgeTbFlags[x][y−4] is equal to 1,
edgeTbFlags[x][y+4] is equal to 1,
the following applies:

maxFilterLength$Ps$[$x$][$y$]=1    (8-1045)

maxFilterLength$Qs$[$x$][$y$]=1    (8-1046)

Otherwise, if one or more of the following conditions are true:

yEdge is equal to 1,
yEdge is equal to (nCbH/8)−1,
edgeTbFlags[x][y−sbH] is equal to 1,
edgeTbFlags[x][y+sbH] is equal to 1,
the following applies:

maxFilterLength$Ps$[$x$][$y$]=2    (8-1043)

maxFilterLength$Qs$[$x$][$y$]=2    (8-1044)

Otherwise, the following applies:

maxFilterLength$Ps$[$x$][$y$]=3    (8-1047)

maxFilterLength$Qs$[$x$][$y$]=3    (8-1048)

2.2.1.5 Derivation Process of Boundary Filtering Strength

Inputs to this process are:

a picture sample array recPicture, a location (xCb, yCb) specifying the top-left sample of the current coding block relative to the top-left sample of the current picture, a variable nCbW specifying the width of the current coding block, a variable nCbH specifying the height of the current coding block, a variable edgeType specifying whether a vertical (EDGE_VER) or a horizontal (EDGE_HOR) edge is filtered, a variable cIdx specifying the colour component of the current coding block, a two-dimensional (nCbW)×(nCbH) array edgeFlags.

Output of this process is a two-dimensional (nCbW)×(nCbH) array bS specifying the boundary filtering strength.

The variables $xD_i$, $yD_j$, xN and yN are derived as follows:
The variable gridSize is set as follows:

$$gridSize = cIdx == 0 ? 4 : 8 \quad (8\text{-}1049)$$

If edgeType is equal to EDGE_VER, $$xD_i = (i * gridSize) \quad (8\text{-}1050)$$

$$yD_j = cIdx == 0 ? (j << 2) : (j << 1) \quad (8\text{-}1051)$$

$$xN \text{ is set equal to } Max(0, (nCbW/gridSize) - 1) \quad (8\text{-}1052)$$

$$yN = cIdx == 0 ? (nCbH/4) - 1 : (nCbH/2) - 1 \quad (8\text{-}1053)$$

Otherwise (edgeType is equal to EDGE_HOR), $$xD_i = cIdx == 0 ? (i << 2) : (i << 1) \quad (8\text{-}1054)$$

$$yD_j = (j * gridSize) \quad (8\text{-}1055)$$

$$xN = cIdx == 0 ? (nCbW/4) - 1 (nCbW/2) - 1 \quad (8\text{-}1056)$$

$$yN = Max(0, (nCbH/gridSize) - 1) \quad (8\text{-}1057)$$

For $xD_i$ with i=0 ... xN and $yD_j$ with j=0 ... yN, the following applies:

If edgeFlags[$xD_i$][$yD_j$] is equal to 0, the variable bS[$xD_i$][$yD_j$] is set equal to 0.

Otherwise, the following applies:

The sample values $p_0$ and $q_0$ are derived as follows:

If edgeType is equal to EDGE_VER, $p_0$ is set equal to recPicture[xCb+$xD_i$−1][yCb+$yD_j$] and $q_0$ is set equal to recPicture[xCb+$xD_i$][yCb+$yD_j$].

Otherwise (edgeType is equal to EDGE_HOR), $p_0$ is set equal to recPicture[xCb+$xD_i$][yCb+$yD_j$−1] and $q_0$ is set equal to recPicture[xCb+$xD_i$][yCb+$yD_j$].

The variable bS[$xD_i$][$yD_j$] is derived as follows:

If cIdx is equal to 0 and both samples $p_0$ and $q_0$ are in a coding block with intra_bdpcm_flag equal to 1, bS[$xD_i$][$yD_j$] is set equal to 0.

Otherwise, if the sample $p_0$ or $q_0$ is in the coding block of a coding unit coded with intra prediction mode, bS[$xD_i$][$yD_j$] is set equal to 2.

Otherwise, if the block edge is also a transform block edge and the sample $p_0$ or $q_0$ is in a coding block with ciip_flag equal to 1, bS[$xD_i$][$yD_j$] is set equal to 2.

Otherwise, if the block edge is also a transform block edge and the sample $p_0$ or $q_0$ is in a transform block which contains one or more non-zero transform coefficient levels, bS[$xD_i$][$yD_j$] is set equal to 1.

Otherwise, if the block edge is also a transform block edge, cIdx is greater than 0, and the sample $p_0$ or $q_0$ is in a transform unit with tu_joint_cbcr_residual_flag equal to 1, bS[$xD_i$][$yD_j$] is set equal to 1.

Otherwise, if the prediction mode of the coding subblock containing the sample $p_0$ is different from the prediction mode of the coding subblock containing the sample $q_0$ (i.e. one of the coding subblock is coded in intra block copy (IBC) prediction mode and the other is coded in inter prediction mode), bS[$xD_i$][$yD_j$] is set equal to 1.

Otherwise, if cIdx is equal to 0 and one or more of the following conditions are true, bS[$xD_i$][$yD_j$] is set equal to 1:

The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

2.2.1.6 Edge Filtering Process for One Direction

Inputs to this process are:
a variable edgeType specifying whether vertical edges (EDGE_VER) or horizontal edges (EDGE_HOR) are currently processed,
a variable cIdx specifying the current colour component,
the reconstructed picture prior to deblocking recPicture,
a location (xCb, yCb) specifying the top-left sample of the current coding block relative to the top-left sample of the current picture,
a variable nCbW specifying the width of the current coding block,
a variable nCbH specifying the height of the current coding block,
the array bS specifying the boundary strength,
the arrays maxFilterLengthPs and maxFilterLengthQs.

Output of this process is the modified reconstructed picture after deblocking recPicture.

For the edge filtering process, the following applies:
The variable gridSize is set as follows:

$$\text{gridSize}=cIdx==0?4:8 \qquad (8\text{-}1058)$$

The variables subW, subH, xN, yN are derived as follows:

$$\text{sub}W=cIdx==0?1:\text{SubWidth}C \qquad (8\text{-}1059)$$

$$\text{sub}H=cIdx==0?1:\text{SubHeight}C \qquad (8\text{-}1060)$$

$$xN=\text{edgeType}==\text{EDGE\_VER}?\text{Max}(0,(nCbW/\text{grid-Size})-1):(nCbW/4/\text{sub}W)-1 \qquad (8\text{-}1061)$$

$$yN=\text{edgeType}==\text{EDGE\_VER}?(nCbH/4/\text{sub}H)-1:\text{Max}(0,(nCbH/\text{gridSize})-1) \qquad (8\text{-}1062)$$

The variables $xD_k$ with k=0 . . . xN and $yD_m$ with m=0 . . . yN are derived as follows:

$$xD_k=\text{edgeType}==\text{EDGE\_VER}?(k*\text{gridSize}):(k<<(2/\text{sub}W)) \qquad (8\text{-}1063)$$

$$yD_m=\text{edgeType}==\text{EDGE\_VER}?(m<<(2/\text{sub}H)):(m*\text{gridSize}) \qquad (8\text{-}1064)$$

For $xD_k$ with k=0 . . . xN and $yD_m$ with m=0 . . . yN, the following applies:

When $bS[xD_k][yD_m]$ is greater than 0, the following ordered steps apply:

If cIdx is equal to 0, the filtering process for edges in the luma coding block of the current coding unit consists of the following ordered steps:

1. The decision process for luma block edges as specified in clause 8.8.3.6.1 is invoked with the luma picture sample array recPicture, the location of the luma coding block (xCb, yCb), the luma location of the block (xBl, yBl) set equal to $(xD_k, yD_m)$, the edge direction edgeType, the boundary filtering strength $bS[xD_k][yD_m]$, the maximum filter lengths maxFilterLengthP set equal to maxFilterLengthPs$[xD_k][yD_m]$ and maxFilterLengthQ set equal to maxFilterLengthQs$[xD_k][yD_m]$ as inputs, and the decisions dE, dEp and dEq, the modified maximum filter lengths maxFilterLengthP and maxFilterLengthQ, and the variable $t_C$ as outputs.

2. The filtering process for block edges as specified in clause 8.8.3.6.2 is invoked with the luma picture sample array recPicture, the location of the luma coding block (xCb, yCb), the luma location of the block (xBl, yBl) set equal to $(xD_k, yD_m)$, the edge direction edgeType, the decisions dE, dEp and dEq, the maximum filter lengths maxFilterLengthP and maxFilterLengthQ, and the variable $t_C$ as inputs, and the modified luma picture sample array recPicture as output.

Otherwise (cIdx is not equal to 0), the filtering process for edges in the chroma coding block of current coding unit specified by cIdx consists of the following ordered steps:

1. The variable cQpPicOffset is derived as follows:

$$\text{cQpPicOffset}=cIdx==1?pps\_cb\_qp\_\text{offset}:pps\_cr\_qp\_\text{offset} \qquad (8\text{-}1065)$$

2. The decision process for chroma block edges as specified in clause 8.8.3.6.3 is invoked with the chroma picture sample array recPicture, the location of the chroma coding block (xCb, yCb), the location of the chroma block (xBl, yBl) set equal to $(xD_k, yD_m)$, the edge direction edgeType, the variable cIdx, the variable cQpPicOffset, the boundary filtering strength $bS[xD_k][yD_m]$, and the variable maxFilterLengthCbCr set equal to maxFilterLengthPs$[xD_k][yD_m]$ as inputs, and the modified variable maxFilterLengthCbCr, and the variable $t_C$ as outputs.

3. When maxFilterLengthCbCr is greater than 0, the filtering process for chroma block edges as specified in clause 8.8.3.6.4 is invoked with the chroma picture sample array recPicture, the location of the chroma coding block (xCb, yCb), the chroma location of the block (xBl, yBl) set equal to $(xD_k, yD_m)$, the edge direction edgeType, the variable maxFilterLengthCbCr, and the variable $t_C$ as inputs, and the modified chroma picture sample array recPicture as output.

2.2.1.6.1 Decision Process for Luma Block Edges

Inputs to this process are:
a picture sample array recPicture,
a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, a variable bS specifying the boundary filtering strength, a variable maxFilterLengthP specifying the max filter length, a variable maxFilterLengthQ specifying the max filter length.

Outputs of this process are:
the variables dE, dEp and dEq containing decisions,
the modified filter length variables maxFilterLengthP and maxFilterLengthQ,
the variable $t_C$.

The sample values $p_{i,k}$ and $q_{j,k}$ with i=0 . . . maxFilterLengthP, j=0 . . . maxFilterLengthQ and k=0 and 3 are derived as follows:

If edgeType is equal to EDGE_VER, the following applies:

$$q_{j,k}=\text{recPicture}_L[xCb+xBl+j][yCb+yBl+k] \quad (8\text{-}1066)$$

$$p_{i,k}=\text{recPicture}_L[xCb+xBl-i-1][yCb+yBl+k] \quad (8\text{-}1067)$$

Otherwise (edgeType is equal to EDGE_HOR), the following applies:

$$q_{j,k}=\text{recPicture}[xCb+xBl+k][yCb+yBl+j] \quad (8\text{-}1068)$$

$$p_{i,k}=\text{recPicture}[xCb+xBl+k][yCb+yBl-i-1] \quad (8\text{-}1069)$$

The variable qpOffset is derived as follows:
If sps_ladf_enabled_flag is equal to 1, the following applies:

The variable lumaLevel of the reconstructed luma level is derived as follow:

$$\text{lumaLevel}=((p_{0,0}+p_{0,3}+q_{0,0}+q_{0,3})>>2), \quad (8\text{-}1070)$$

The variable qpOffset is set equal to sps_ladf_lowest_interval_qp_offset and modified as follows:

```
for(i=0;i<sps_num_ladf_intervals_minus2+1;i++){if
  (lumaLevel>SpsLadfIntervalLowerBound[i+1])
  qpOffset=sps_ladf_qp_offset[i]              (8-1071)
else
  break
}
```

Otherwise, qpOffset is set equal to 0.

The variables $Qp_Q$ and $Qp_P$ are set equal to the $Qp_Y$ values of the coding units which include the coding blocks containing the sample $q_{0,0}$ and $p_{0,0}$, respectively.
The variable qP is derived as follows:

$$qP=((Qp_Q+Qp_P+1)>>1)+qp\text{Offset} \quad (8\text{-}1072)$$

The value of the variable β' is determined as specified in Table 8-18 based on the quantization parameter Q derived as follows:

$$Q=\text{Clip3}(0,63,qP+(\text{slice\_beta\_offset\_div 2}<<1)) \quad (8\text{-}1073)$$

where slice_beta_offset_div 2 is the value of the syntax element slice_beta_offset_div 2 for the slice that contains sample $q_{0,0}$.
The variable β is derived as follows:

$$\beta=\beta'*(1<<(\text{BitDepth}_Y-8)) \quad (8\text{-}1074)$$

The value of the variable $t_C'$ is determined as specified in Table 8-18 based on the quantization parameter Q derived as follows:

$$Q=\text{Clip3}(0,65,qP+2*(bS-1)+(\text{slice\_}t_C\text{\_offset\_div} 2<<1)) \quad (8\text{-}1075)$$

where slice_$t_C$_offset_div 2 is the value of the syntax element slice_$t_C$_offset_div 2 for the slice that contains sample $q_{0,0}$.
The variable $t_C$ is derived as follows:

$$t_C=\text{BitDepth}_Y<10?(t_C'+2)>>(10-\text{BitDepth}_Y):t_C'*(1<<(\text{BitDepth}_Y-10)) \quad (8\text{-}1076)$$

The following ordered steps apply:
1. The variables dp0, dp3, dq0 and dq3 are derived as follows:

$$dp0=\text{Abs}(p_{2,0}-2*p_{1,0}+p_{0,0}) \quad (8\text{-}1077)$$

$$dp3=\text{Abs}(p_{2,3}-2*p_{1,3}+p_{0,3}) \quad (8\text{-}1078)$$

$$dq0=\text{Abs}(q_{2,0}-2*q_{1,0}+q_{0,0}) \quad (8\text{-}1079)$$

$$dq3=\text{Abs}(q_{2,3}-2*q_{1,3}+q_{0,3}) \quad (8\text{-}1080)$$

2. When maxFilterLengthP and maxFilterLengthQ both are equal to or greater than 3 the variables sp0, sq0, spq0, sp3, sq3 and spq3 are derived as follows:

$$sp0=\text{Abs}(p_{3,0}-p_{0,0}) \quad (8\text{-}1081)$$

$$sq0=\text{Abs}(q_{0,0}-q_{3,0}) \quad (8\text{-}1082)$$

$$spq0=\text{Abs}(p_{0,0}-q_{0,0}) \quad (8\text{-}1083)$$

$$sp3=\text{Abs}(p_{3,3}-p_{0,3}) \quad (8\text{-}1084)$$

$$sq3=\text{Abs}(q_{0,3}-q_{3,3}) \quad (8\text{-}1085)$$

$$spq3=\text{Abs}(p_{0,3}-q_{0,3}) \quad (8\text{-}1086)$$

3. The variables sidePisLargeBlk and sideQisLargeBlk are set equal to 0.
4. When maxFilterLengthP is greater than 3, sidePisLargeBlk is set equal to 1:
5. When maxFilterLengthQ is greater than 3, sideQisLargeBlk is set equal to 1:
6. When edgeType is equal to EDGE_HOR and (yCb+yBl) % CtbSizeY is equal to 0, sidePisLargeBlk is set equal to 0.
7. The variables dSam0 and dSam3 are initialized to 0.
8. When sidePisLargeBlk or sideQisLargeBlk is greater than 0, the following applies:
   a. The variables dp0L, dp3L are derived and maxFilterLengthP is modified as follows:
      If sidePisLargeBlk is equal to 1, the following applies:

$$dp0L=(dp0+\text{Abs}(p_{5,0}-2*p_{4,0}+p_{3,0})+1)>>1 \quad (8\text{-}1087)$$

$$dp3L=(dp3+\text{Abs}(p_{5,3}-2*p_{4,3}+p_{3,3})+1)>>1 \quad (8\text{-}1088)$$

Otherwise, the following applies:

$$dp0L=dp0 \quad (8\text{-}1089)$$

$$dp3L=dp3 \quad (8\text{-}1090)$$

$$\text{maxFilterLength}P=3 \quad (8\text{-}1091)$$

b. The variables dq0L and dq3L are derived as follows:
   If sideQisLargeBlk is equal to 1, the following applies:

$$dq0L=(dq0+\text{Abs}(q_{5,0}-2*q_{4,0}+q_{3,0})+1)>>1 \quad (8\text{-}1092)$$

$$dq3L=(dq3+\text{Abs}(q_{5,3}-2*q_{4,3}+q_{3,3})+1)>>1 \quad (8\text{-}1093)$$

Otherwise, the following applies:

$$dq0L=dq0 \quad (8\text{-}1094)$$

$$dq3L=dq3 \quad (8\text{-}1095)$$

c. The variables dpq0L, dpq3L, and dL are derived as follows:

$$dpq0L=dp0L+dq0L \quad (8\text{-}1096)$$

$$dpq3L=dp3L+dq3L \quad (8\text{-}1097)$$

$$dL=dpq0L+dpq3L \quad (8\text{-}1098)$$

d. When dL is less than β, the following ordered steps apply:
   i. The variable dpq is set equal to 2*dpq0L.
   ii. The variable sp is set equal to sp0, the variable sq is set equal to sq0 and the variable spq is set equal to spq0.
   iii. The variables $p_0$ $p_3$ $q_o$ and $q_3$ are first initialized to 0 and then modified according to sidePisLargeBlk and sideQisLargeBlk as follows:
     When sidePisLargeBlk is equal to 1, the following applies:

$$p_3=p_{3,0} \quad (8\text{-}1099)$$

$$p_0=p_{maxFilterLengthP,0} \quad (8\text{-}1100)$$

When sideQisLargeBlk is equal to 1, the following applies:

$$q_3=q_{3,0} \quad (8\text{-}1101)$$

$$q_0=q_{maxFilterLengthQ,0} \quad (8\text{-}1102)$$

iv. For the sample location (xCb+xBl, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam0.
   v. The variable dpq is set equal to 2*dpq3L.
   vi. The variable sp is set equal to sp3, the variable sq is set equal to sq3 and the variable spq is set equal to spq3.
   vii. The variables $p_0$ $p_3$ $q_0$ and $q_3$ are first initialized to 0 and are then modified according to sidePisLargeBlk and sideQisLargeBlk as follows:
     When sidePisLargeBlk is equal to 1, the following applies:

$$p_3=p_{3,3} \quad (8\text{-}1103)$$

$$p_0=p_{maxFilterLengthP,3} \quad (8\text{-}1104)$$

When sideQisLargeBlk is equal to 1, the following applies:

$$q_3=q_{3,3} \quad (8\text{-}1105)$$

$$q_0=q_{maxFilterLengthQ,3} \quad (8\text{-}1106)$$

viii. When edgeType is equal to EDGE_VER for the sample location (xCb+xBl, yCb+yBl+3) or when edgeType is equal to EDGE_HOR for the sample location (xCb+xBl+3, yCb+yBl), the decision process for a luma sample as specified in clause 8.8.3.6.5 is invoked with the sample values $p_0$, $p_3$, $q_0$, $q_3$, the variables dpq, sp, sq, spq, sidePisLargeBlk, sideQisLargeBlk, β and $t_C$ as inputs, and the output is assigned to the decision dSam3.

9. The variables dE, dEp and dEq are derived as follows:
If dSam0 and dSam3 are both equal to 1, the variable dE is set equal to 3, dEp is set equal to 1, and dEq is set equal to 1.
Otherwise, the following ordered steps apply:
   a. The variables dpq0, dpq3, dp, dq and d are derived as follows:

$$dpq0=dp0+dq0 \quad (8\text{-}1107)$$

$$dpq3=dp3+dq3 \quad (8\text{-}1108)$$

$$dp=dp0+dp3 \quad (8\text{-}1109)$$

$$dq=dq0+dq3 \quad (8\text{-}1110)$$

$$d=dpq0+dpq3 \quad (8\text{-}1111)$$

b. The variables dE, dEp, dEq, sidePisLargeBlk and sideQisLargeBlk are set equal to 0.
   c. When d is less than R and both maxFilterLengthP and maxFilterLengthQ are greater than 2, the following ordered steps apply:
     i. The variable dpq is set equal to 2*dpq0.
     ii. The variable sp is set equal to sp0, the variable sq is set equal to sq0 and the variable spq is set equal to spq0.
     iii. For the sample location (xCb+xBl, yCb+yBl), the decision process for a luma sample as specified in clause 8.8.3.6.5 is invoked with the variables $p_0$, $p_3$, $q_0$, $q_3$ all set equal to 0, the variables dpq, sp, sq, spq, sidePisLargeBlk, sideQisLargeBlk, β and $t_C$ as inputs, and the output is assigned to the decision dSam0.
     iv. The variable dpq is set equal to 2*dpq3.
     v. The variable sp is set equal to sp3, the variable sq is set equal to sq3 and the variable spq is set equal to spq3.
     vi. When edgeType is equal to EDGE_VER for the sample location (xCb+xBl, yCb+yBl+3) or when edgeType is equal to EDGE_HOR for the sample location (xCb+xBl+3, yCb+yBl), the decision process for a sample as specified in clause 8.8.3.6.5 is invoked with the variables $p_0$, $p_3$, $q_0$, $q_3$ all set equal to 0, the variables dpq, sp, sq, spq, sidePisLargeBllk, sideQisLargeBlk, β and $t_C$ as inputs, and the output is assigned to the decision dSam3.
   d. When d is less than β, the following ordered steps apply:
     i. The variable dE is set equal to 1.
     ii. When dSam0 is equal to 1 and dSam3 is equal to 1, the variable dE is set equal to 2.
     iii. When maxFilterLengthP is greater than 1, and maxFilterLengthQ is greater than 1, and dp is less than $(β+(β>>1))>>3$, the variable dEp is set equal to 1.
     iv. When maxFilterLengthP is greater than 1, and maxFilterLengthQ is greater than 1, and dq is less than $((β+(β>>1))>>3$, the variable dEq is set equal to 1.

TABLE 8-18

Derivation of threshold variables β' and $t_C$' from input Q

| Q | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| β' | 0 | 0 | 0 | 0 | 0 | 0 | 0 | 0 | 0 | 0 | 0 | 0 | 0 | 0 | 0 | 0 | 6 |
| $t_C$' | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| $t_C$' | 0 | 3 | 4 | 4 | 4 | 4 | 5 | 5 | 5 | 5 | 7 | 7 | 8 | 9 | 10 | 10 | 11 |
| Q | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| $t_C$' | 13 | 14 | 15 | 17 | 19 | 21 | 24 | 25 | 29 | 33 | 36 | 41 | 45 | 51 | 57 | 64 | 71 |
| Q | 51 | 52 | 53 | 54 | 55 | 56 | 57 | 58 | 59 | 60 | 61 | 62 | 63 | 64 | 65 | | |
| β' | 64 | 66 | 68 | 70 | 72 | 74 | 76 | 78 | 80 | 82 | 84 | 86 | 88 | — | — | | |
| $t_C$' | 80 | 89 | 100 | 112 | 125 | 141 | 157 | 177 | 198 | 222 | 250 | 280 | 314 | 352 | 395 | | |

2.2.1.6.2 Filtering Process for Luma Block Edges

Inputs to this process are:

a picture sample array recPicture, a location (xCb, yCb) specifying the top-left sample of the current coding block relative to the top-left sample of the current picture, a location (xBl, yBl) specifying the top-left sample of the current block relative to the top-left sample of the current coding block, a variable edgeType specifying whether a vertical (EDGE_VER) or a horizontal (EDGE_HOR) edge is filtered, the variables dE, dEp and dEq containing decisions, the variables maxFilterLengthP and maxFilterLengthQ containing max filter lengths, the variable $t_C$.

Output of this process is the modified picture sample array recPicture.

Depending on the value of edgeType, the following applies:

If edgeType is equal to EDGE_VER, the following ordered steps apply:

1. The sample values $p_{i,k}$ and $q_{i,k}$ with i=0 . . . maxFilterLengthP, j=0 . . . maxFilterLengthQ and k=0 . . . 3 are derived as follows:

$$q_{j,k} = recPicture_L[xCb+xBl+j][yCb+yBl+k] \quad (8\text{-}1112)$$

$$p_{i,k} = recPicture_L[xCb+xBl-i-1][yCb+yBl+k] \quad (8\text{-}1113)$$

2. When dE is not equal to 0 and dE is not equal to 3, for each sample location (xCb+xBl, yCb+yBl+k), k=0 . . . 3, the following ordered steps apply:

a. The filtering process for a luma sample using short filters as specified in clause 8.8.3.6.6 is invoked with the sample values $p_{i,k}$, $q_{i,k}$ with i=0 . . . 3, the locations ($xP_i$, $yP_i$) set equal to (xCb+xBl−i−1, yCb+yBl+k) and ($xQ_i$, $yQ_i$) set equal to (xCb+xBl+i, yCb+yBl+k) with i=0 . . . 2, the decision dE, the variables dEp and dEq and the variable $t_C$ as inputs, and the number of filtered samples nDp and nDq from each side of the block boundary and the filtered sample values $p_i$' and $q_j$' as outputs.

b. When nDp is greater than 0, the filtered sample values $p_i$' with i=0 . . . nDp−1 replace the corresponding samples inside the sample array recPicture as follows:

$$recPicture[xCb+xBl-i-1][yCb+yBl+k]=p_i' \quad (8\text{-}1114)$$

c. When nDq is greater than 0, the filtered sample values $q_j$' with j=0 . . . nDq−1 replace the corresponding samples inside the sample array recPicture as follows:

$$recPicture[xCb+xBl+j][yCb+yBl+k]=q_j' \quad (8\text{-}1115)$$

3. When dE is equal to 3, for each sample location (xCb+xBl, yCb+yBl+k), k=0 . . . 3, the following ordered steps apply:

a. The filtering process for a luma sample using long filters as specified in clause 8.8.3.6.7 is invoked with the sample values $p_{i,k}$, $q_{j,k}$ with i=0 . . . maxFilterLengthP and j=0 . . . maxFilterLengthQ, the locations ($xP_i$, $yP_i$) set equal to (xCb+xBl−i−1, yCb+yBl+k) with i=0 . . . maxFilterLengthP−1 and ($xQ_j$, $yQ_j$) set equal to (xCb+xBl+j, yCb+yBl+k) with j=0 . . . maxFilterLengthQ−1, the variables maxFilterLengthP, maxFilterLengthQ and $t_C$ as inputs and the filtered samples values $p_i$' and $q_j$' as outputs.

b. The filtered sample values $p_i$' with i=0 . . . maxFilterLengthP−1 replace the corresponding samples inside the sample array recPicture as follows:

$$recPicture[xCb+xBl-i-1][yCb+yBl+k]=p_i' \quad (8\text{-}1116)$$

c. The filtered sample values $q_j$' with j=0 . . . maxFilterLengthQ−1 replace the corresponding samples inside the sample array recPicture as follows:

$$recPicture[xCb+xBl+j][yCb+yBl+k]=q_j' \quad (8\text{-}1117)$$

Otherwise (edgeType is equal to EDGE_HOR), the following ordered steps apply:

1. The sample values $p_{i,k}$ and $q_{i,k}$ with i=0 . . . maxFilterLengthP, j=0 . . . maxFilterLengthQ and k=0 . . . 3 are derived as follows:

$$q_{j,k} = recPicture_L[xCb+xBl+k][yCb+yBl+j] \quad (8\text{-}1118)$$

$$p_{i,k} = recPicture_L[xCb+xBl+k][yCb+yBl-i-1] \quad (8\text{-}1119)$$

2. When dE is not equal to 0 and dE is not equal to 3, for each sample location (xCb+xBl+k, yCb+yBl), k=0 . . . 3, the following ordered steps apply:

a. The filtering process for a luma sample using short filters as specified in clause 8.8.3.6.6 is invoked with the sample values $p_{i,k}$, $q_{i,k}$ with i=0 . . . 3, the locations ($xP_i$, $yP_i$) set equal to (xCb+xBl+k, yCb+yBl−i−1) and ($xQ_i$, $yQ_i$) set equal to (xCb+xBl+k, yCb+yBl+i) with i=0 . . . 2, the decision dE, the variables dEp and dEq, and the variable $t_C$ as inputs, and the number of filtered samples nDp and nDq from each side of the block boundary and the filtered sample values $p_i$' and $q_j$' as outputs.

b. When nDp is greater than 0, the filtered sample values $p_j$' with i=0 . . . nDp−1 replace the corresponding samples inside the sample array recPicture as follows:

$$recPicture[xCb+xBl+k][yCb+yBl-i-1]=p_i' \quad (8\text{-}1120)$$

c. When nDq is greater than 0, the filtered sample values $q_j'$ with j=0 . . . nDq−1 replace the corresponding samples inside the sample array recPicture as follows:

$$recPicture[xCb+xBl+k][yCb+yBl+j]=q_j' \qquad (8\text{-}1121)$$

3. When dE is equal to 3, for each sample location (xCb+xBl+k, yCb+yBl), k=0 . . . 3, the following ordered steps apply:
   a. The filtering process for a luma sample using long filters as specified in clause 8.8.3.6.7 is invoked with the sample values $p_{i,k}$, $q_{j,k}$ with i=0 . . . maxFilterLengthP and j=0 . . . maxFilterLengthQ, the locations $(xP_i, yP_i)$ set equal to (xCb+xBl+k, yCb+yBl−i−1) with i=0 . . . maxFilterLengthP−1 and $(xQ_j, yQ_j)$ set equal to (xCb+xBl+k, yCb+yBl+j) with j=0 . . . maxFilterLengthQ−1, the variables maxFilterLengthP, maxFilterLengthQ, and the variable $t_C$ as inputs, and the filtered sample values $p_i'$ and $q_j'$ as outputs.
   b. The filtered sample values $p_i'$ with i=0 . . . maxFilterLengthP−1 replace the corresponding samples inside the sample array recPicture as follows:

$$recPicture[xCb+xBl+k][yCb+yBl-i-1]=p_i' \qquad (8\text{-}1122)$$

c. The filtered sample values $q_j'$ with j=0 . . . maxFilterLengthQ−1 replace the corresponding samples inside the sample array recPicture as follows:

$$recPicture[xCb+xBl+k][yCb+yBl+j]=q_j' \qquad (8\text{-}1123)$$

2.2.1.6.3 Decision Process for Chroma Block Edges

This process is only invoked when ChromaArrayType is not equal to 0.

Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable cIdx specifying the colour component index,
a variable cQpPicOffset specifying the picture-level chroma quantization parameter offset,
a variable bS specifying the boundary filtering strength,
a variable maxFilterLengthCbCr.

Outputs of this process are
the modified variable maxFilterLengthCbCr,
the variable $t_C$.

The variable maxK is derived as follows:
If edgeType is equal to EDGE_VER, the following applies:

$$maxK=(SubHeightC==1)?3:1 \qquad (8\text{-}1124)$$

Otherwise (edgeType is equal to EDGE_HOR), the following applies:

$$maxK=(SubWidthC==1)?3:1 \qquad (8\text{-}1125)$$

The values $p_i$ and $q_i$ with i=0 . . . maxFilterLengthCbCr and k=0 . . . maxK are derived as follows:
If edgeType is equal to EDGE_VER, the following applies::

$$q_{i,k}=recPicture[xCb+xBl+i][yCb+yBl+k] \qquad (8\text{-}1126)$$

$$p_{i,k}=recPicture[xCb+xBl-i-1][yCb+yBl+k] \qquad (8\text{-}1127)$$

$$subSampleC=SubHeightC \qquad (8\text{-}1128)$$

Otherwise (edgeType is equal to EDGE_HOR), the following applies:

$$q_{i,k}=recPicture[xCb+xBl+k][yCb+yBl+i] \qquad (8\text{-}1129)$$

$$p_{i,k}=recPicture[xCb+xBl+k][yCb+yBl-i-1] \qquad (8\text{-}1130)$$

$$subSampleC=SubWidthC \qquad (8\text{-}1131)$$

The variables $Qp_Q$ and $Qp_P$ are set equal to the $Qp_Y$ values of the coding units which include the coding blocks containing the sample $q_{0,0}$ and $p_{0,0}$, respectively.

The variable $Qp_C$ is derived as follows:

$$qPi=\text{Clip3}(0,63,((Qp_Q+Qp_P+1)>>1)+cQpPicOffset) \qquad (8\text{-}1132)$$

$$Qp_C=\text{Chroma}QpTable[cIdx-1][qPi] \qquad (8\text{-}1133)$$

NOTE—The variable cQpPicOffset provides an adjustment for the value of pps_cb_qp_offset or pps_cr_qp_offset, according to whether the filtered chroma component is the Cb or Cr component. However, to avoid the need to vary the amount of the adjustment within the picture, the filtering process does not include an adjustment for the value of slice_cb_qp_offset or slice_cr_qp_offset nor (when cu_chroma_qp_offset_enabled_flag is equal to 1) for the value of $CuQpOffset_{Cb}$, $CuQpOffset_{Cr}$, or $CuQpOffset_{CbCr}$.

The value of the variable β' is determined as specified in Table 8-18 based on the quantization parameter Q derived as follows:

$$Q=\text{Clip3}(0,63,Qp_C+(slice\_beta\_offset\_div\ 2<<1)) \qquad (8\text{-}1134)$$

where slice_beta_offset_div 2 is the value of the syntax element slice_beta_offset_div 2 for the slice that contains sample $q_{0,0}$.

The variable β is derived as follows:

$$\beta=\beta'*(1<<(BitDepth_C-8)) \qquad (8\text{-}1135)$$

The value of the variable $t_C'$ is determined as specified in Table 8-18 based on the chroma quantization parameter Q derived as follows:

$$Q=\text{Clip3}(0,65,Qp_C+2*(bS-1)+(slice\_t_C\_offset\_div\ 2<<1)) \qquad (8\text{-}1136)$$

where slice_$t_C$_offset_div 2 is the value of the syntax element slice_$t_C$_offset_div 2 for the slice that contains sample $q_{0,0}$.

The variable $t_C$ is derived as follows:

$$t_C=(BitDepth_C<10)?(t_C'+2)>>(10-BitDepth_C):t_C'*(1<<(BitDepth_C-8)) \qquad (8\text{-}1137)$$

When maxFilterLengthCbCr is equal to 1 and bS is not equal to 2, maxFilterLengthCbCr is set equal to 0.

When maxFilterLengthCbCr is equal to 3, the following ordered steps apply:

1. The variables n1, dpq0, dpq1, dp, dq and d are derived as follows:

$$n1=(subSampleC==2)?1:3 \qquad (8\text{-}1138)$$

$$dp0=\text{Abs}(p_{2,0}-2*p_{1,0}+p_{0,0}) \qquad (8\text{-}1139)$$

$$dp1=\text{Abs}(p_{2,n1}-2*p_{1,n1}+p_{0,n1}) \qquad (8\text{-}1140)$$

$$dq0=\text{Abs}(q_{2,0}-2*q_{1,0}+q_{0,0}) \qquad (8\text{-}1141)$$

$$dq1=\text{Abs}(q_{2,n1}-2*q_{1,n1}+q_{0,n1}) \qquad (8\text{-}1142)$$

$$dpq0 = dp0 + dq0 \quad (8\text{-}1143)$$

$$dpq1 = dp1 + dq1 \quad (8\text{-}1144)$$

$$dp = dp0 + dp1 \quad (8\text{-}1145)$$

$$dq = dq0 + dq1 \quad (8\text{-}1146)$$

$$d = dpq0 + dpq1 \quad (8\text{-}1147)$$

2. The variables dSam0 and dSam1 are both set equal to 0.
3. When d is less than β, the following ordered steps apply:
   a. The variable dpq is set equal to 2*dpq0.
   b. The variable dSam0 is derived by invoking the decision process for a chroma sample as specified in clause 8.8.3.6.8 for the sample location (xCb+xBl, yCb+yBl) with sample values $p_{0,0}$, $p_{3,0}$, $q_{0,0}$, and $q_{3,0}$, the variables dpq, β and $t_C$ as inputs, and the output is assigned to the decision dSam0.
   c. The variable dpq is set equal to 2*dpq1.
   d. The variable dSam1 is modified as follows:
   If edgeType is equal to EDGE_VER, for the sample location (xCb+xBl, yCb+yBl+n1), the decision process for a chroma sample as specified in clause 8.8.3.6.8 is invoked with sample values $p_{0,n1}$, $p_{3,n1}$, $q_{0,n1}$, and $q_{3,n1}$, the variables dpq, β and $t_C$ as inputs, and the output is assigned to the decision dSam1.
   Otherwise (edgeType is equal to EDGE_HOR), for the sample location (xCb+xBl+n1, yCb+yBl), the decision process for a chroma sample as specified in clause 8.8.3.6.8 is invoked with sample values $p_{0,n1}$, $p_{3,n1}$, $q_{0,n1}$ and $q_{3,n1}$, the variables dpq, β and $t_C$ as inputs, and the output is assigned to the decision dSam1.
4. The variable maxFilterLengthCbCr is modified as follows:
   If dSam0 is equal to 1 and dSam1 is equal to 1, maxFilterLengthCbCr is set equal to 3.
   Otherwise, maxFilterLengthCbCr is set equal to 1.

2.2.1.6.4 Filtering Process for Chroma Block Edges

This process is only invoked when ChromaArrayType is not equal to 0.
Inputs to this process are:
a chroma picture sample array recPicture,
a chroma location (xCb, yCb) specifying the top-left sample of the current chroma coding block relative to the top-left chroma sample of the current picture,
a chroma location (xBl, yBl) specifying the top-left sample of the current chroma block relative to the top-left sample of the current chroma coding block,
a variable edgeType specifying whether a vertical (EDGE_VER) or a horizontal (EDGE_HOR) edge is filtered,
a variable maxFilterLengthCbCr containing the maximum chroma filter length,
the variable $t_C$.
Output of this process is the modified chroma picture sample array recPicture.
The variable maxK is derived as follows:
If edgeType is equal to EDGE_VER, the following applies:

$$maxK = (SubHeightC == 1)?3:1 \quad (8\text{-}1148)$$

Otherwise (edgeType is equal to EDGE_HOR), the following applies:

$$maxK = (SubWidthC == 1)?3:1 \quad (8\text{-}1149)$$

The values $p_i$ and $q_i$ with i=0 . . . maxFilterLengthCbCr and k=0 . . . maxK are derived as follows:
If edgeType is equal to EDGE_VER, the following applies:

$$q_{i,k} = recPicture[xCb+xBl+i][yCb+yBl+k] \quad (8\text{-}1150)$$

$$p_{i,k} = recPicture[xCb+xBl-i-1][yCb+yBl+k] \quad (8\text{-}1151)$$

Otherwise (edgeType is equal to EDGE_HOR), the following applies:

$$q_{i,k} = recPicture[xCb+xBl+k][yCb+yBl+i] \quad (8\text{-}1152)$$

$$p_{i,k} = recPicture[xCb+xBl+k][yCb+yBl-i-1] \quad (8\text{-}1153)$$

Depending on the value of edgeType, the following applies:
If edgeType is equal to EDGE_VER, for each sample location (xCb+xBl, yCb+yBl+k) k=0 . . . maxK, the following ordered steps apply:
1. The filtering process for a chroma sample as specified in clause 8.8.3.6.9 is invoked with the variable maxFilterLengthCbCr, the sample values $p_{i,k}$, $q_{i,k}$ with i=0 . . . maxFilterLengthCbCr, the locations (xCb+xBl−i−1, yCb+yBl+k) and (xCb+xBl+i, yCb+yBl+k) with i=0 . . . maxFilterLengthCbCr−1, and the variable $t_C$ as inputs, and the filtered sample values $p_i'$ and $q_i'$ with i=0 . . . maxFilterLengthCbCr−1 as outputs.
2. The filtered sample values $p_i'$ and $q_i'$ with i=0 . . . maxFilterLengthCbCr−1 replace the corresponding samples inside the sample array recPicture as follows:

$$recPicture[xCb+xBl+i][yCb+yBl+k] = q_i' \quad (8\text{-}1154)$$

$$recPicture[xCb+xBl-i-1][yCb+yBl+k] = p_i' \quad (8\text{-}1155)$$

Otherwise (edgeType is equal to EDGE_HOR), for each sample location (xCb+xBl+k, yCb+yBl), k=0 . . . maxK, the following ordered steps apply:
1. The filtering process for a chroma sample as specified in clause 8.8.3.6.9 is invoked with the variable maxFilterLengthCbCr, the sample values $p_{i,k}$, $q_{i,k}$ with i=0 . . . maxFilterLengthCbCr, the locations (xCb+xBl+k, yCb+yBl−i−1) and (xCb+xBl+k, yCb+yBl+i), and the variable $t_C$ as inputs, and the filtered sample values $p_i'$ and $q_i'$ as outputs.
2. The filtered sample values $p_i'$ and $q_i'$ replace the corresponding samples inside the sample array recPicture as follows:

$$recPicture[xCb+xBl+k][yCb+yBl+i] = q_i' \quad (8\text{-}1156)$$

$$recPicture[xCb+xBl+k][yCb+yBl-i-1] = p_i' \quad (8\text{-}1157)$$

2.2.1.6.5 Decision Process for a Luma Sample
Inputs to this process are:
the sample values $p_0$, $p_3$, $q_0$ and $q_3$,
the variables dpq, sp, sq, spq, sidePisLargeBlk, sideQisLargeBlk, β and $t_C$.
Output of this process is the variable dSam containing a decision.
The variables sp and sq are modified as follows:
When sidePisLargeBlk is equal to 1, the following applies:

$$sp = (sp + Abs(p_3 - p_0) + 1) >> 1 \quad (8\text{-}1158)$$

When sideQisLargeBlk is equal to 1, the following applies:

$$sq = (sq + Abs(q_3 - q_0) + 1) >> 1 \quad (8\text{-}1159)$$

The variable sThr is derived as follows:
If sidePisLargeBlk is equal to 1 or sideQisLargeBlk is equal to 1, the following applies:

$$sThr = 3*\beta >> 5 \quad (8\text{-}1160)$$

Otherwise, the following applies:

$$sThr = \beta >> 3 \quad (8\text{-}1161)$$

The variable dSam is specified as follows:
If all of the following conditions are true, dSam is set equal to 1:
  dpq is less than ($\beta>>2$),
  sp+sq is less than sThr,
  spq is less than ($5*t_C+1$)>>1.
Otherwise, dSam is set equal to 0.

2.2.1.6.6 Filtering Process for a Luma Sample Using Short Filters

Inputs to this process are:
  the sample values $p_i$ and $q_i$ with i=0..3,
  the locations of $p_i$ and $q_i$, ($xP_i$, $yP_i$) and ($xQ_i$, $yQ_i$) with i=0 . . . 2,
  a variable dE,
  the variables dEp and dEq containing decisions to filter samples p1 and q1, respectively,
  a variable $t_C$.
Outputs of this process are:
  the number of filtered samples nDp and nDq,
  the filtered sample values $p_i'$ and $q_j'$ with i=0 . . . nDp−1, j=0 . . . nDq−1.
Depending on the value of dE, the following applies:
If the variable dE is equal to 2, nDp and nDq are both set equal to 3 and the following strong filtering applies:

$$p_0' = \text{Clip3}(p_0-3*t_C, p_0+3*t_C, (p_2+2*p_1+2*p_0+2*q_0+q_1+4)>>3) \quad (8\text{-}1162)$$

$$p_1' = \text{Clip3}(p_1-2*t_C, p_1+2*t_C, (p_2+p_1+p_0+q_0+2)>>2) \quad (8\text{-}1163)$$

$$p_2' = \text{Clip3}(p_2-1*t_C, p_2+1*t_C, (2*p_3+3*p_2+p_1+p_0+q_0+4)>>3) \quad (8\text{-}1164)$$

$$q_0' = \text{Clip3}(q_0-3*t_C, q_0+3*t_C, (p_1+2*p_0+2*q_0+2*q_1+q_2+4)>>3) \quad (8\text{-}1165)$$

$$q_1' = \text{Clip3}(q_1-2*t_C, q_1+2*t_C, (p_0+q_0+q_1+q_2+2)>>2) \quad (8\text{-}1166)$$

$$q_2' = \text{Clip3}(q_2-1*t_C, q_2+1*t_C, (p_0+q_0+q_1+3*q_2+2*q_3+4)>>3) \quad (8\text{-}1167)$$

Otherwise, nDp and nDq are set both equal to 0 and the following weak filtering applies:
The following applies:

$$\Delta = (9*(q_0-p_0)-3*(q_1-p_1)+8)>>4 \quad (8\text{-}1168)$$

When Abs($\Delta$) is less than $t_C*10$, the following ordered steps apply:
  The filtered sample values $p_0'$ and $q_0'$ are specified as follows:

$$\Delta = \text{Clip3}(-t_C, t_C, \Delta) \quad (8\text{-}1169)$$

$$p_0' = \text{Clip1}_Y(p_0+\Delta) \quad (8\text{-}1170)$$

$$q_0' = \text{Clip1}_Y(p_0-\Delta) \quad (8\text{-}1171)$$

When dEp is equal to 1, the filtered sample value $p_1'$ is specified as follows:

$$\Delta p = \text{Clip3}(-(t_C>>1), t_C>>1, (((p_2+p_0+1)<<1)-p_1+\Delta)>>1) \quad (8\text{-}1172)$$

$$p_1' = \text{Clip1}_Y(p_1+\Delta p) \quad (8\text{-}1173)$$

When dEq is equal to 1, the filtered sample value $q_1'$ is specified as follows:

$$\Delta q = \text{Clip3}(-(t_C>>1), t_C>>1, (((q_2+q_0+1)>>1)-q_1-\Delta)>>1) \quad (8\text{-}1174)$$

$$q_1' = \text{Clip1}_Y(q_1+\Delta q) \quad (8\text{-}1175)$$

nDp is set equal to dEp+1 and nDq is set equal to dEq+1.

When nDp is greater than 0 and one or more of the following conditions are true, nDp is set equal to 0:
  cu_transquant_bypass_flag of the coding unit that includes the coding block containing the sample $p_0$ is equal to 1.
  pred_mode_plt_flag of the coding unit that includes the coding block containing the sample $p_0$ is equal to 1.
When nDq is greater than 0 and one or more of the following conditions are true, nDq is set equal to 0:
  cu_transquant_bypass_flag of the coding unit that includes the coding block containing the sample $q_0$ is equal to 1.
  pred_mode_plt_flag of the coding unit that includes the coding block containing the sample $q_0$ is equal to 1.

2.2.1.6.7 Filtering Process for a Luma Sample Using Long Filters

Inputs to this process are:
  the variables maxFilterLengthP and maxFilterLengthQ,
  the sample values $p_i$ and $q_j$ with i=0 . . . maxFilterLengthP and j=0 . . . maxFilterLengthQ,
  the locations of $p_i$ and $q_j$, ($xP_i$, $yP_i$) and ($xQ_j$, $yQ_j$) with i=0 . . . maxFilterLengthP−1 and j=0 . . . maxFilterLengthQ−1,
  a variable $t_C$.
Outputs of this process are:
  the filtered sample values $p_i'$ and $q_j'$ with i=0 . . . maxFilterLengthP−1, j=0 . . . maxFilterLenghtQ−1.
The variable refMiddle is derived as follows:
If maxFilterLengthP is equal to maxFilterLengthQ and maxFilterLengthP is equal to 5, the following applies:

$$\text{refMiddle} = (p_4+p_3+2*(p_2+p_1+p_0+q_0+q_1+q_2)+q_3+q_4+8)>>4 \quad (8\text{-}1176)$$

Otherwise, if maxFilterLengthP is equal to maxFilterLengthQ and maxFilterLengthP is not equal to 5, the following applies:

$$\text{refMiddle} = (p_6+p_5+p_4+p_3+p_2+p_1+2*(p_0+q_0)+q_1+q_2+q_3+q_4+q_5+q_6+8)>>4 \quad (8\text{-}1177)$$

Otherwise, if one of the following conditions are true,
  maxFilterLengthQ is equal to 7 and maxFilterLengthP is equal to 5,
  maxFilterLengthQ is equal to 5 and maxFilterLengthP is equal to 7, the following applies:

$$\text{refMiddle} = (p_4+p_3+2*(p_2+p_1+p_0+q_0+q_1+q_2)+q_3+q_4+8)>>4 \quad (8\text{-}1178)$$

Otherwise, if one of the following conditions are true,
  maxFilterLengthQ is equal to 5 and maxFilterLengthP is equal to 3,
  maxFilterLengthQ is equal to 3 and maxFilterLengthP is equal to 5,
the following applies:

$$\text{refMiddle} = (p_3+p_2+p_1+p_0+q_0+q_1+q_2+q_3+4)>>3 \quad (8\text{-}1179)$$

Otherwise, if maxFilterLengthQ is equal to 7 and maxFilterLengthP is equal to 3, the following applies:

$$\text{refMiddle} = (2*(p_2+p_1+p_0+q_0)+p_0+p_1+q_1+q_2+q_3+q_4+q_5+q_6+8)>>4 \quad (8\text{-}1180)$$

Otherwise, the following applies:

$$\text{refMiddle}=(p_6+p_5+p_4+p_3+p_2+p_1+2*(q_2+q_1+q_0+p_0)+q_0+q_1+8)>>4 \quad (8\text{-}1181)$$

The variables refP and refQ are derived as follows:

$$\text{refP}=(p_{maxFilterLengthP}+p_{maxFilterLengthP-1}+1)>>1 \quad (8\text{-}1182)$$

$$\text{refQ}=(q_{maxFilterLengthQ}+q_{maxFilterLengthQ-1}+1)>>1 \quad (8\text{-}1183)$$

The variables $f_i$ and $t_C PD_i$ are defined as follows:
If maxFilterLengthP is equal to 7, the following applies:

$$f_{0\ldots6}=\{59,50,41,32,23,14,5\} \quad (8\text{-}1184)$$

$$t_C PD_{0\ldots6}=\{6,5,4,3,2,1,1\} \quad (8\text{-}1185)$$

Otherwise, if maxFilterLengthP is equal to 5, the following applies:

$$f_{0\ldots4}=\{58,45,32,19,6\} \quad (8\text{-}1186)$$

$$t_C PD_{0\ldots4}=\{6,5,4,3,2\} \quad (8\text{-}1187)$$

Otherwise, the following applies:

$$f_{0\ldots2}=\{53,32,11\} \quad (8\text{-}1188)$$

$$t_C PD_{0\ldots2}=\{6,4,2\} \quad (8\text{-}1189)$$

The variables $g_j$ and $t_C QD_j$ are defined as follows:
If maxFilterLengthQ is equal to 7, the following applies:

$$g_{0\ldots6}=\{59,50,41,32,23,14,5\} \quad (8\text{-}1190)$$

$$t_C QD_{0\ldots6}=\{6,5,4,3,2,1,1\} \quad (8\text{-}1191)$$

Otherwise, if maxFilterLengthQ is equal to 5, the following applies:

$$g_{0\ldots4}=\{58,45,32,19,6\} \quad (8\text{-}1192)$$

$$t_C QD_{0\ldots4}=\{6,5,4,3,2\} \quad (8\text{-}1193)$$

Otherwise, the following applies:

$$g_{0\ldots2}=\{53,32,11\} \quad (8\text{-}1194)$$

$$t_C QD_{0\ldots2}=\{6,4,2\} \quad (8\text{-}1195)$$

The filtered sample values $p_i'$ and $g_i'$ with i=0 . . . maxFilterLengthP−1 and j=0 . . . maxFilterLengthQ−1 are derived as follows:

$$p_i'=\text{Clip3}(p_i-(t_C*t_C PD_i)>>1,p_i+(t_C*t_C PD_i)>>1,(\text{refMiddle}*f_i+\text{refP}*(64-f_i)+32)>>6) \quad (8\text{-}1196)$$

$$q_j'\text{Clip3}(q_j-(t_C*t_C QD_j)>>1,q_j+(t_C*t_C QD_j)>>1,(\text{refMiddle}*g_j+\text{refQ}*(64-g_j)+32)>>6) \quad (8\text{-}1197)$$

When one or more of the following conditions are true, the filtered sample value, $p_1'$ is substituted by the corresponding input sample value $p_i$ with i=0 . . . maxFilterLengthP−1:
  cu_transquant_bypass_flag of the coding unit that includes the coding block containing the sample $p_i$ is equal to 1.
  pred_mode_plt_flag of the coding unit that includes the coding block containing the sample $p_i$ is equal to 1.

When one or more of the following conditions are true, the filtered sample value, $q_i'$ is substituted by the corresponding input sample value $q_j$ with j=0 . . . maxFilterLengthQ−1:
  cu_transquant_bypass_flag of the coding unit that includes the coding block containing the sample $q_i$ is equal to 1.
  pred_mode_plt_flag of the coding unit that includes the coding block containing the sample $q_i$ is equal to 1.

2.2.1.6.8 Decision Process for a Chroma Sample
  Inputs to this process are:
  the sample values $p_0$, $p_3$, $q_0$ and $q_3$,
  the variables dpq, β and $t_C$.
  Output of this process is the variable dSam containing a decision.
  The variable dSam is specified as follows:
  If all of the following conditions are true, dSam is set equal to 1:
    dpq is less than (β>>2),
    Abs($p_3-p_0$)+Abs($q_0-q_3$) is less than (β>>3),
    Abs($p_0-q_0$) is less than (5*$t_C$+1)>>1.
  Otherwise, dSam is set equal to 0.

2.2.1.6.9 Filtering Process for a Chroma Sample
  This process is only invoked when ChromaArrayType is not equal to 0.
  Inputs to this process are:
  the variable maxFilterLength,
  the chroma sample values $p_i$ and $q_i$ with i=0 . . . maxFilterLengthCbCr,
  the chroma locations of $p_i$ and $q_i$, ($xP_i$, $yP_i$) and ($xQ_i$, $yQ_i$) with i=0 . . . maxFilterLengthCbCr−1,
  a variable $t_C$.
  Outputs of this process are the filtered sample values $p_i'$ and $q_i'$ with i=0 . . . maxFilterLengthCbCr−1.
  The filtered sample values $p_i'$ and $q_i'$ with i=0 . . . maxFilterLengthCbCr−1 are derived as follows:
  If maxFilterLengthCbCr is equal to 3, the following strong filtering applies:

$$p_0'=\text{Clip3}(p_0-t_C,p_0+t_C,(p_3+p_2+p_1+2*p_0+q_0+q_1+q_2+4)>>3) \quad (8\text{-}1198)$$

$$p_1'=\text{Clip3}(p_1-t_C,p_1+t_C,(2*p_3+p_2+2*p_1+p_0+q_0+q_1+4)>>3) \quad (8\text{-}1199)$$

$$p_2'=\text{Clip3}(p_2-t_C,p_2+t_C,(3*p_3+2*p_2+p_1+p_0+q_0+4)>>3) \quad (8\text{-}1200)$$

$$q_0'=\text{Clip3}(q_0-t_C,q_0+t_C,(p_2+p_1+p_0+2*q_0+q_1+q_2+q_3+4)>>3) \quad (8\text{-}1201)$$

$$q_1'=\text{Clip3}(q_1-t_C,41+t_C,(p_i+p_0+q_0+2*q_1+q_2+2*q_3+4)>>3) \quad (8\text{-}1202)$$

$$q_2'=\text{Clip3}(q_2-t_C,2+t_C,(p_0+q_0+q_1+2*q_2+3*q_3+4)>>3) \quad (8\text{-}1203)$$

Otherwise, the following weak filtering applies:

$$\Delta=\text{Clip3}(-t_C,t_C,((((q_0-p_0)<<2)+p_1-q_1+4)>>3)) \quad (8\text{-}1204)$$

$$p_0'=\text{Clip1}_C(p_0+\Delta) \quad (8\text{-}1205)$$

$$q_0'=\text{Clip1}_C(q_0-\Delta) \quad (8\text{-}1206)$$

When one or more of the following conditions are true, the filtered sample value, $p_1'$ is substituted by the corresponding input sample value $p_i$ with i=0 . . . maxFilterLengthCbCr−1:
  cu_transquant_bypass_flag of the coding unit that includes the coding block containing the sample $p_i$ is equal to 1.
  pred_mode_plt_flag of the coding unit that includes the coding block containing the sample $p_i$ is equal to 1.

When one or more of the following conditions are true, the filtered sample value, $q_i'$ is substituted by the corresponding input sample value $q_i$ with i=0 . . . maxFilterLengthCbCr−1:
  cu_transquant_bypass_flag of the coding unit that includes the coding block containing the sample $q_i$ is equal to 1.
  pred_mode_plt_flag of the coding unit that includes the coding block containing the sample $q_i$ is equal to 1.

2.4 Virtual Boundary Filtering Process for Line Buffer Reduction

In VTM6, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 4, with N equal to 4 for the Luma component and 2 for the Chroma component.

Figure 4:
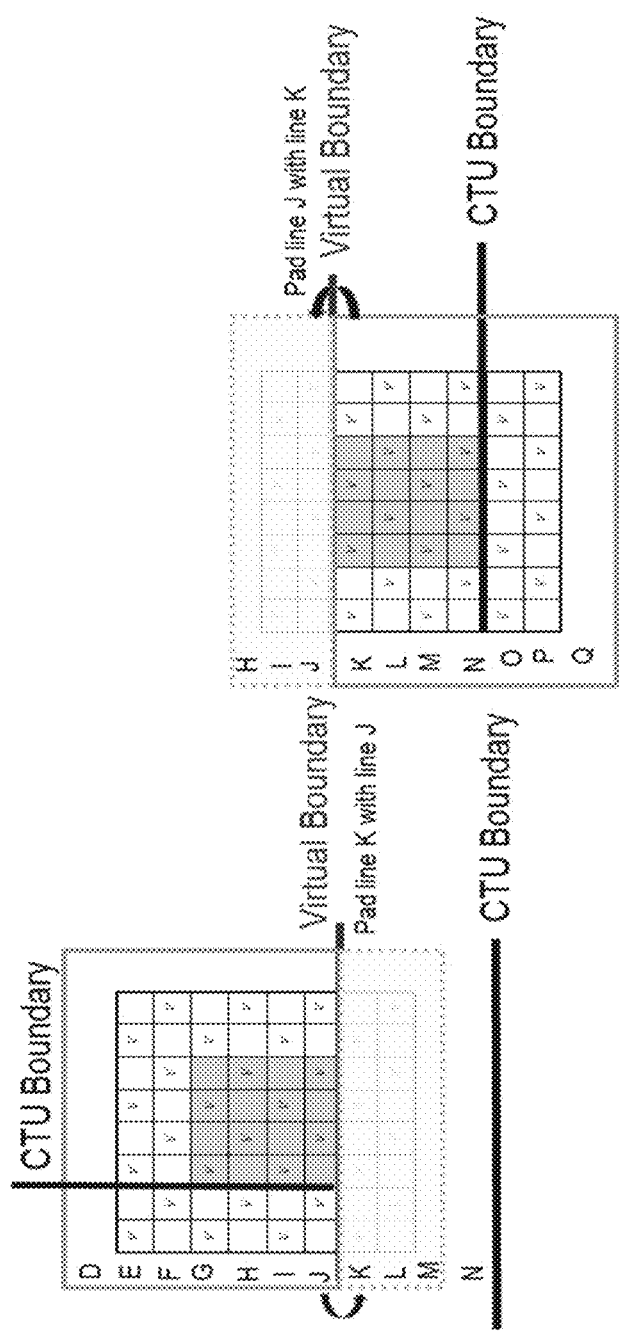
FIG. 4 shows an example of a modified block classification at virtual boundaries.

FIG. 4 shows an example of a modified block classification at virtual boundaries.

Figure 5:
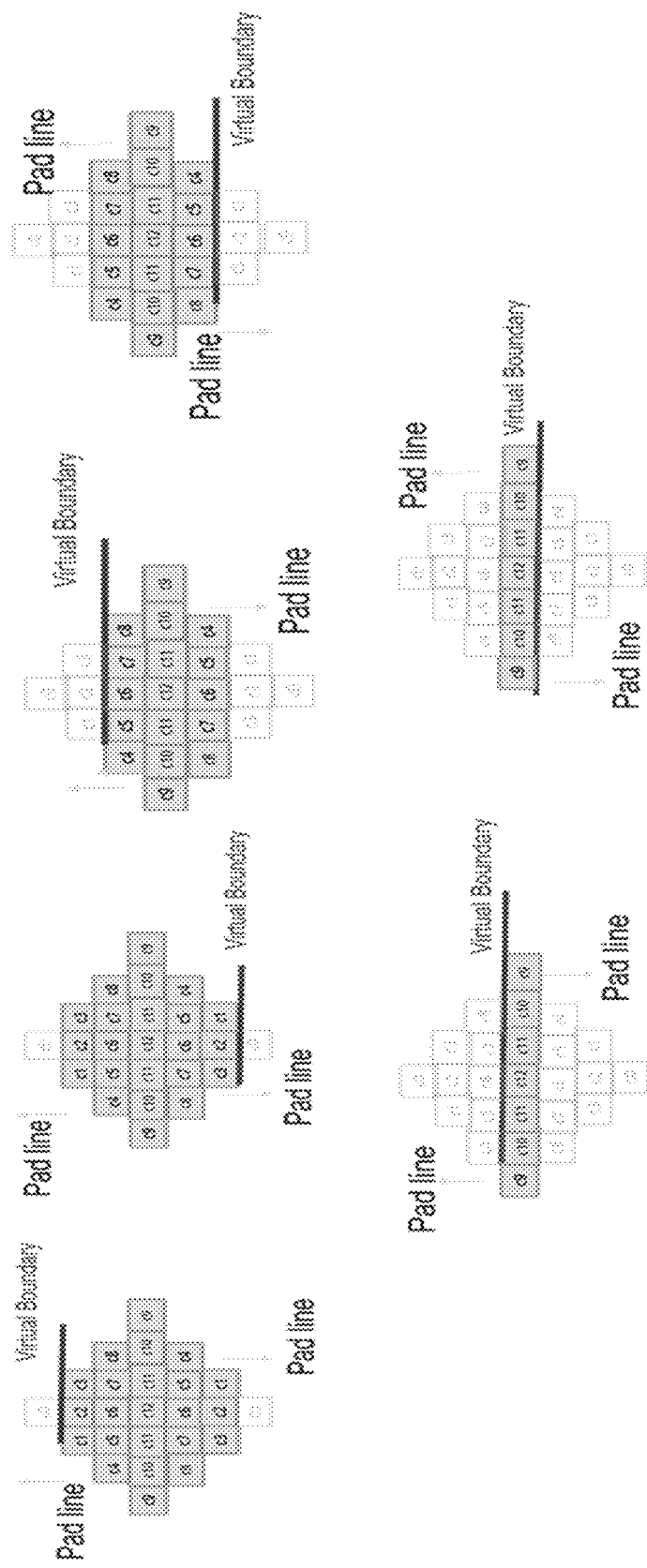
FIG. 5 shows an example of modified ALF filtering for Luma component at virtual boundaries.

Modified block classification is applied for the Luma component as depicted in FIG. 5. For the one dimension (1D) Laplacian gradient calculation of the 4×4 block above the virtual boundary, only the samples above the virtual boundary are used. Similarly for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

For filtering processing, symmetric padding operation at the virtual boundaries are used for both Luma and Chroma components. As shown in FIG. 5, when the sample being filtered is located below the virtual boundary, the neighboring samples that are located above the virtual boundary are padded. Meanwhile, the corresponding samples at the other sides are also padded, symmetrically.

FIG. 5 shows an example of modified ALF filtering for Luma component at virtual boundaries.

3 EXAMPLE TECHNICAL PROBLEMS SOLVED BY DISCLOSED EMBODIMENTS AND TECHNIQUES

There are several problems in the latest VVC working draft JVET-O2001-v14, which are described below.

(1) The 4×4 sample grid luma deblock filtering is applied to virtual boundary, which increases the line buffer used for practical CTU-based in-loop filtering. Improved methods may be used to reduce the extra line buffer.

(2) In working draft 6 (WD6), luma deblocking is applied at 4×4 grid transform block boundaries, but for subblock boundaries, luma deblocking is applied at 8×8 grid. However, the subblock based affine prediction is 4×4 based, which may result in large motion vector difference between two adjacent 4×4 blocks. Therefore, blocking artifact may happen at 4×4 subblock boundaries, which requires extending the luma deblocking filter to 4×4 grid subblock boundaries.

(3) In WD6, deblocking filter is not applied to the internal subblock edges of merge triangle prediction mode (TPM) coded block. However, the motion vector of TPM block is stored at 4×4 block granularity, which may cause large motion vector difference between two adjacent 4×4 blocks. Thus applying deblocking filter to TPM block internal edges may be needed.

(4) In WD6, not all chroma flags are signaled dependent on the chroma formats, which may be not desirable.

(5) In WD6, the picture parameter set (PPS) syntax element log 2_transform_skip_max_size_minus2 is signaled conditioned on SPS syntax element, which may cause parsing dependency between SPS and PPS.

(6) In WD6, the settings of maxFilterLengthPs is dependent on whether the current coding block contains more than one 8×8 block. For example, for 8×8 affine or sbTMVP coded block, the maxFilterLengthPs is kept unchanged which is derived from transform block boundaries. However, for other subblock boundaries, maxFilterLengthQs is reset to be Min(5, maxFilterLengthQs).

(7) In WD6, the settings of maxFilterLengthQs is dependent on whether the edge is lying at the first subblock boundary (left most or top most). For the following two cases:
  a) If the block left to a vertical edge is not subblock coded.
  b) If the block top to a horizontal edge block is not subblock coded.
  For above cases, the maxFilterLengthPs is kept unchanged which is derived from transform block boundaries. However, for other subblock boundaries, maxFilterLengthPs is reset to be Min(5, maxFilterLengthPs).

(8) In WD6, the settings of maxFilterLengthPs and maxFilterLengthQs of a subblock edge are dependent on whether the position of the edge plus 4 is greater than or equal to the current coding block width, which may be not necessary.

(9) In WD6, for internal sub-block edges which are 4-samples away from the transform block edge, maxFilterLengthPs and maxFilterLengthQs are set to 1; otherwise, for internal first/last sub-block edges and the subblock edges which are 8-samples away from the TU edge, maxFilterLengthPs and maxFilterLengthQs are set to 2; otherwise, for other internal sub-block edges, maxFilterLengthPs and maxFilterLengthQs are set to 3. These conditions may be further refined.

(10) In WD6, the setting of deblocking filter strength bS is dependent on prediction mode of adjacent blocks (e.g., if the prediction mode of the coding subblock containing the sample p0 is different from the prediction mode of the coding subblock containing the sample q0), bS is set equal to 1.

(11) In WD6, when it is a transform block edge and one adjacent block resides at either side of an edge is coded with Combined Inter-Intra Prediction (CIIP) mode, the deblocking filter strength bS of this edge is set to 2.

4 A LISTING OF EMBODIMENTS AND TECHNIQUES

The detailed inventions below should be considered as examples to explain general concepts. These inventions should not be interpreted in a narrow way. Furthermore, these inventions can be combined in any manner.

In the following disclosure, the term "natural boundary" may refer to a boundary between two coding blocks (e.g. two CUs), or two prediction blocks (e.g. two PUs), or two transform blocks (two TUs), or two sub-blocks.

The deblocking process derives some "boundaries" (e.g., subblock boundary or transform block boundary) to be under consideration of the deblocking process from natural boundaries. These boundaries may be also called "deblocking boundaries" in the following disclosure.

In one example, a deblocking boundary must be a natural boundary, but a natural boundary may not be a deblocking boundary. If a boundary is not a deblocking boundary, it may not be considered in the deblocking process.

The term "edge" is equivalent to "boundary" in the following disclosure.

Deblocking Filter at Coding Block and Subblock Boundaries

1. Luma deblocking filter process may be applied at 4×4 grid on subblock natural boundaries.
  a. In one example, the decision of whether the current subblock natural boundary needs to be luma deblocking filtered or not (such as the value of edgeFlags) may be performed at 4×4 grid.
  i. In one example, the decision of whether the current subblock natural boundary needs to be luma deblocking filtered or not (such as the value of edgeFlags) may not be performed at 8×8 grid.
  b. In one example, the decision of luma deblocking filter length (such as maxFilterLengthPs and maxFilterLengthQs) may be applied at 4×4 grid.
    i. In one example, the decision of luma deblocking filter length (such as maxFilterLengthPs and maxFilterLengthQs) may be not applied at 8×8 grid.
  c. In one example, the grid unit (e.g., 4×4 or 8×8) for subblock boundary/filter length/filter strength determination in sub-block coded blocks may be dependent on the sub-block coding method.
    i. In one example, the grid unit (e.g., 4×4 or 8×8) for sub-block boundary/filter length/filter strength determination in sub-block coded blocks may be aligned with the sub-block size used in motion compensation/motion derivation.
    ii. In one example, if the current block is affine coded, the luma deblocking filter may be applied at 4×4 grid on affine subblock boundaries.
      1) For example, for subblock boundaries of an affine coded block, the above bullet 1.a and bullet 2.a may be applied.
    iii. In one example, if the current block is SbTMVP coded, the deblocking filter may be applied at 8×8 grid on SbTMVP subblock boundaries.
2. Chroma deblocking filter process may be applied at subblock natural boundaries.
  a. In one example, chroma deblocking filter may be applied at N×M (e.g. 8×8 or 4×4 or 4×8 or 8×4) grid subblock boundaries.
  b. In one example, the decision of whether the current chroma deblocking edge is subblock boundary or not (such as the value of edgeFlags) may be performed at N×N (N=8 or 4) grid.
  c. In one example, the decision of chroma deblocking filter length (such as maxFilterLengthPs and maxFilterLengthQs) may be applied at N×M (e.g. 8×8 or 4×4 or 4×8 or 8×4)
  d. In one example, the value of chroma deblocking filter length (such as maxFilterLengthPs and maxFilterLengthQs) may be smaller than or equal to L (such as L=3 or 2 or 1).
  e. In one example, the value of boundary filtering strength (such as bS) for chroma subblock boundary may be dependent on the number of motion vectors, reference pictures, absolute block vector (BV)/motion vector (MV) difference between two neighboring pixels located at two sides of the current boundary.
  f. Whether to apply the above methods may be dependent on the current block is coded with sub-block-based technologies (e.g., SbTMVP, Affine, DMVR, chroma IBC mode in dual tree case).
  g. Whether to apply the above methods may be dependent on the color subsampling format (e.g., equal to 4:4:4 or not).
  h. The deblocking grid N×M may depend on the color format.
3. For a block coded with triangle prediction mode (TPM) (also referred to as a geometry prediction mode), N×N (N=4 or 8) grid deblocking filter may be applied.
  a. In one example, the internal edge derivation for a TPM coded block may be the same as the subblock boundary derivation process for a SbTMVP and/or affine coded block.
  b. In one example, TPM coded block may be treated as subblock coded block, and sub-block boundary/filter length/filter strength determination may be decided at 4×4 or 8×8 grid.
4. The settings of deblocking filter length may be treated in the same way for all subblock deblocking boundaries regardless it is the first subblock deblocking boundary (e.g., leftmost vertical boundary or topmost horizontal boundary).
  a. For the leftmost vertical boundary (and/or the topmost horizontal boundary) of current coding block, the value of deblocking filter length may be conditioned on whether it coincides with the transform block edge (such as edgeTbFlags) or not.
    i. In one example, for the leftmost vertical boundary (or topmost horizontal boundary) of current coding block, if edgeTbFlags of this boundary is equal to 1, the deblocking filter length maxFilterLengthPs of current block may be set to Min(5, maxFilterLengthPs), regardless of whether the neighboring coding block left (or top) to the boundary is SbTMVP-coded or affine-coded.
    ii. In one example, for the leftmost vertical boundary (or topmost horizontal boundary) of current coding block, if edgeTbFlags of this boundary is equal to 1, the deblocking filter length maxFilterLengthPs of current block is set to Min(5, maxFilterLengthPs), regardless of the number of sub-blocks in the current coding block.
5. When deriving the subblock deblocking boundaries, the decision of deblocking filter length may be dependent on the subblock edge position (such as subblock edge index (e.g., xEdge) of current coding block). Suppose the range of xEdge is [0, M] wherein M is an integer no less than 0.
  a. In one example, for the xEdge in the range of [a, b], maxFilterLengthPs and/maxFilterLengthQs may be set to a fixed integer value L (e.g., L=1, 2, 3).
    i. In one example, a=0 or 1.
    ii. In one example, b=M or M−1.
    iii. In one example, a=b=0 or 1 or M or M−1.
6. Suppose x denotes the horizontal/vertical subblock position inside the current coding block, the decision of deblocking filter length may be dependent on the relationship between x+delta (e.g. delta may be equal to 4 or 8) and the coding block width/height.
  a. In one example, when deriving the SbTMVP and affine subblock boundaries, the deblocking filter length (such as maxFilterLengthPs and/or maxFilterLengthQs) may be decided without checking whether x+delta is greater than or equal to the block width/height.
  b. In one example, when deriving the SbTMVP and affine subblock boundaries, the deblocking filter length (such as maxFilterLengthPs and/or maxFilterLengthQs) may be decided by checking whether x+delta is greater than or equal to the block width/height.
7. When deriving the subblock deblocking boundaries, the decision of deblocking filter length of a vertical boundary at column x or a horizontal boundary at row y in the block may be dependent on whether the vertical boundary at column x+dx or a horizontal boundary at row y+dy is a transform block boundary or not. dx and dy are integers such as 4 or 8.
  a. In one example, when deriving the subblock deblocking boundaries for a block (e.g., coded with SbTMVP and/or affine), the decision of deblocking filter length (such as maxFilterLengthPs and maxFilterLengthQs) of a vertical boundary at column x or a horizontal boundary at row y in the block may be dependent on one of the below cases:
    i. Whether the vertical boundary at column x+dx or a horizontal boundary at row y+dy is a transform block boundary or not, without checking whether x+dx>=block width is satisfied and/or whether y+dy>=block height is satisfied.
    ii. Whether the vertical boundary at column x+dx or a horizontal boundary at row y+dy is a transform block boundary or not, and, whether x+dx>=block width is satisfied and/or whether y+dy>=block height is satisfied.
  b. Alternatively, when deriving the subblock deblocking boundaries for a block (e.g., coded with SbTMVP and/or affine), the decision of deblocking filter length (such as maxFilterLengthPs and maxFilterLengthQs) of a vertical boundary at column x or a horizontal boundary at row y in the block may be not dependent on whether the vertical boundary at column x+dx or a horizontal boundary at row y+dy is a transform block boundary or not.

General Issues on Deblocking Filter

8. For SBT coded blocks, instead of marking two deblocking boundaries between the transform block (which is smaller than the block), it is proposed to mark three transform block boundaries for one direction (horizontal or vertical).
  a. In one example, for one direction (horizontal or vertical), the two transform block boundaries plus the coded block boundary are all treated as deblocking boundaries which may be filtered in the deblocking filter process.
  b. Alternatively, furthermore, whether to filter the coded block boundary may further depend on whether it is a subblock boundary, etc. al.
9. If two neighboring samples located at two sides of current block edge belong to two transforms without non-zero transform coefficient levels, the deblocking filter strength (such as bS) of this edge may be set to 0.
  a. In one example, if two neighboring samples located at two sides of current transform block edge belong to two transform blocks without non-zero transform coefficient levels, and one the two neighboring samples is coded as merge triangle prediction mode (TPM), the bS may be set to 0.
  b. In one example, if two neighboring samples located at two sides of current transform block edge belong to two transform blocks without non-zero transform coefficient levels, and the motion vector difference between the two neighboring samples is larger than a threshold T (such as T=8 in units of 1/16 luma samples), the bS may be set to 0.
  c. In one example, the decision of deblocking filter strength at transform block boundaries may be decoupled from the motion vector related criteria.
10. The derived motion vector difference (MVD) in DMVR may be used in deblocking.
  a. In one example, for a CU processed by DMVR, deblocking may be performed at sub-block boundaries within the CU using the derived MVDs of sub-blocks instead of the signaled MV.
  b. In one example, for a CU processed by DMVR, deblocking may be performed at CU boundaries using the signaled MV of the CU.
  c. Alternatively, for a CU processed by DMVR, deblocking may be performed at CU boundaries using the signaled MV and the derived MVDs of sub-blocks at CU boundaries.
    i. For example, for a block at CU boundary, a MV may be generated by adding the derived MVD of the associated sub-block to the signaled MV, and then may be used for deblocking.
11. The setting of deblocking filter strength bS may be not dependent on prediction modes of adjacent blocks.
  a. In one example, the setting of deblocking filter strength bS may be decided on whether one of the adjacent blocks is coded as MODE_INTRA, but not decided on MODE_IBC and/or MODE_INTER.
12. Whether to and/or how to filter an edge may be dependent on the edge type (e.g., transform block boundary or subblock boundary).
  a. In one example, the deblocking filter strength at transform block boundaries and deblocking filter strength at coding subblock boundaries may be separately determined.
    i. In one example, transform block boundary flags may be stored at a (nCbW)×(nCbH) array A, while coding subblock boundaries may be stored at a (nCbW)×(nCbH) array B, wherein A and B are different array buffers.
    ii. In one example, the deblocking filter strength (such as bS) of transform block boundaries may be set according to transform coefficients (such as non-zero coefficients).
      1) In one example, if both the two neighboring samples located at two sides of current transform block edge have zero transform coefficient levels, then bS may be set to 0.
    iii. In one example, the deblocking filter strength (such as bS) of coding subblock boundaries may be set according to the motion vectors, and/or reference pictures between two neighboring pixels which are located at two sides of the current boundary.
    iv. In one example, if the block edge is also (a transform block edge but NOT a subblock boundary) and at least one of two neighboring samples along the edge is in a coding block with CIIP mode, Boundary strength (BS) is set equal to X (X=1 or 2).
  b. Alternatively, the decision of filter strength/filter length/boundary strength may be the same for different edge types.
    i. In one example, if the block edge is also (a transform block edge or a subblock boundary) and at least one of two neighboring samples along the edge is in a coding block with CIIP mode, Boundary strength (BS) is set equal to X (X=1 or 2).

Interaction with Virtual Boundaries

13. Deblocking filter may be not applied at virtual boundaries which is N samples (such as N=4 for luma and N=2 for chroma) above the horizontal CTU boundary.
  a. In one example, for a TU/CU/PU/subblock edge which coincide with the virtual boundary, horizontal edge deblock filtering may be not applied.

b. Alternatively, furthermore, for a TU/CU/PU/sub-block edge which coincide with the virtual boundary, vertical edge deblock filtering may still be applied.
14. In one example, whether and/or how to clip a value in the deblocking process may depend on whether the boundary to be filtered by the deblocking filter coincides with a virtual boundary.
  a. In one example, a sample with value p is modified to be value p' after the deblocking process, p is derived as p'=p+d', and d'=Clip3(t1, t2, d), where d is derived in the deblocking process and [t1, t2] is the clipping range. t1 and/or t2 may depend on whether the boundary to be filtered by the deblocking filter coincides with a virtual boundary.
    i. In one example, $t1=-2^N$ and $t2=2^N-1$, where N is an integer.
      1) For example, N may be dependent on color component.
      2) For example, N may be sent from the encoder to the decoder.
      3) For example, N may be dependent on sample bit-depth.

Interaction with Other Coding Tools

15. SBT and subblock-based coding methods (e.g., SbTMVP and/or affine) may be exclusively used.
  a. SBT may be not allowed for subblock-based coding blocks such as SbTMVP and affine prediction block.
  b. In one example, if a coding block is coded with SbTMVP, then SBT may be not applied.
  c. In one example, if a coding block is coded with affine prediction, then SBT may be not applied
  d. In one example, if a coding block is coded with SbTMVP or affine prediction, then SBT may be not applied.
    i. For example, when inter_affine_flag is equal to 1 or merge_subblock_flag is equal to 1, cu_sbt_flag may be not signaled and inferred to be 0.
16. For above examples, when a coding tool is disallowed, the signaling of indications of usage of the tool is skipped.
  a. Alternatively, if a first tool is disallowed when a second tool is applied, the signaling of usage of the first tool may be under the condition that the second tool is not applied.
17. Deblocking filter may be applied on a boundary between two sub-partitions of a block coded with Intra Sub-Partitioning (ISP) mode.
  a. In one example, a vertical boundary at column x between two sub-partitions of a block is filtered by deblocking if x satisfies x=M*P+offset and/or x<W, where offset, M and P are positive integers. In one example, M=1, 2, 3 . . . , and P=1. In another example, M=1, 2, 3 . . . , and P=2. W is the width of the block. For example, offset=0.
  b. In one example, a horizontal boundary at row y between two sub-partitions of a block is filtered by deblocking if y satisfies y=M*P+offset and/or y<H, where offset, M and P are positive integers. In one example, M=1, 2, 3 . . . , and P=1. In another example, M=1, 2, 3 . . . , and P=2. H is the height of the block. For example, offset=0.
  c. Alternatively, deblocking filter is not applied on a boundary between two sub-partitions of a block coded with Intra Sub-Partitioning (ISP) mode
18. Deblocking filter may be applied on a boundary between two M×N (e.g. 4×4 or 8×8) regions of a block coded with TPM.
  a. For example, if one of the two adjacent coding blocks is coded with TPM, the boundary between the two blocks may be deblocking filtered.
19. The filtering process (e.g., deblock filter, SAO, ALF) may depend on the motion information of TPM-coded blocks used in the motion compensation process instead of those used in the motion storage/motion vector prediction for following coded blocks.
  a. In one example, during the deblocking filter strength (e.g., bS) derivation process, the motion vector for TPM-coded block may be the one used in the motion compensation process.
  b. In one example, the stored H×H (such as 4×4) motion vectors of a TPM-coded block may be not used for deblocking boundary filtering strength setting.
  c. In one example, the motion vectors used for TPM motion compensation may be used for deblocking boundary filtering strength setting.
  d. Alternatively, whether to use motion information in the motion compensation process or the motion storage or motion vector prediction process may be adaptively changed.
  e. Alternatively, whether to use motion information in the motion compensation process or the motion storage or motion vector prediction process may be determined based on decoded information and/or block dimension, etc. al.

Chroma Flag Signaling

20. Chroma syntax element signaling may be dependent on the chroma format sampling structure (e.g., chroma_format_idc), and/or coding method (e.g., separate_colour_plane_flag, and/or ChromaArrayType, and etc.).
  a. In one example, PPS Cb/Cr flags may be signaled according to the chroma format sampling structure.
    i. In one example, if ChromaArrayType is equal to true, syntax element X may be signaled. Otherwise, syntax element X may be not signaled.
    ii. In one example, if the chroma format is monochrome (such as 4:0:0), syntax element X may be signaled. Otherwise, syntax element X may be not signaled.
    iii. In one example, if the chroma format is 4:4:4 and the separate_colour_plane_flag is equal to 1, syntax element X may be signaled. Otherwise, syntax element X may be not signaled.
    iv. For example, X may be pps_cb_qp_offset and pps_cr_qp_offset in the above bullets.
    v. For example, X may be pps_joint_cbcr_qp_offset in the above bullets.
    vi. For example, X may be cu_chroma_qp_offset_enabled_flag in the above bullets.
    vii. For example, X may be pps_slice_chroma_qp_offsets_present_flag in the above bullets.

SPS-PPS Syntax Dependency

21. The PPS syntax element may be not dependent on SPS syntax element.
  a. In one example, PPS syntax element log 2_transform_skip_max_size_minus2 may be not conditionally signaled by the SPS syntax element (e.g., sps_transform_skip_enabled_flag).

5 EMBODIMENTS

Below are example embodiments, which could be applied to VVC specification. The modifications are based on the latest VVC working draft (JVET-O2001-v14). Newly added parts are highlighted in bold and Italic, and the deleted parts from VVC working draft are marked with double brackets (e.g., [[a]] denotes the deletion of the character "a").

Embodiment #1 on Applying Luma Deblocking Filter at 4×4 Grid for Subblock Boundaries 8.8.3.4 Derivation Process of Coding Subblock Boundary
. . .
If edgeType is equal to EDGE_VER, the following applies:
The variable sbW is set equal to Max(4, nCbW/numSbX).
The array edgeTbFlags is set equal to edgeFlags.
For xEdge=0 . . . min((nCbW/4)−1, numSbX−1), y=0 . . . nCbH−1:
The horizontal position x inside the current coding block is set equal to xEdge*sbW.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If x is equal to 0, the following applies:
. . .
Otherwise, if edgeTbFlags[x][y] is equal to 1, the following applies:
. . .
Otherwise, if one or more of the following conditions are true:
*Notes: may add one more condifition equal to 0 as: xEdge is equal to 1, or added as: ( x - 4 ) is*
(x+4) is greater than or equal to nCbW,
edgeTbFlags[x−4][y] is equal to 1,
edgeTbFlags[x+4][y] is equal to 1,
the following applies:

maxFilterLength*Ps*[x][y]=1     (8-1031)

maxFilterLength*Qs*[x][y]=1     (8-1032)

Otherwise, the following applies:

maxFilterLength*Ps*[x][y]=3     (8-1035)

maxFilterLength*Qs*[x][y]=3     (8-1036)

Otherwise, if edgeType is equal to EDGE_HOR, the following applies:
The variable sbH is set equal to Max(4, nCbH/numSbY).
The array edgeTbFlags is set equal to edgeFlags.
For yEdge=0 . . . min((nCbH/4)−1, numSbY−1), x=0 . . . nCbW−1:
The vertical position y inside the current coding block is set equal to yEdge*sbH.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If y is equal to 0 and edgeFlags[x][y] is equal to 1, the following applies:
. . .
Otherwise, if edgeTbFlags[x][y] is equal to 1, the following applies:
. . .
Otherwise, if one or more of the following conditions are true:
*Notes: may add one more condifition as: yEdge is equal to 1, or added as: ( y - 4 ) is equal to 0*
(y+4) is greater than or equal to nCbH,
edgeTbFlags[x][y−4] is equal to 1,
edgeTbFlags[x][y+4] is equal to 1,
the following applies:

maxFilterLength*Ps*[x][y]=1     (8-1045)

maxFilterLength*Qs*[x][y]=1     (8-1046)

Otherwise, the following applies:

maxFilterLength*Ps*[x][y]=3     (8-1047)

maxFilterLength*Qs*[x][y]=3     (8-1048)

5.1 Embodiment #2 on Applying Luma Deblocking Filter at 4×4 Grid Affine-Coded Subblock Boundaries and 8×8 Grid sbTMVP-Coded Subblock Boundaries, and Applying Chroma Deblocking Filter at 8×8 Grid Subblock Boundaries 8.8.3.2 Deblocking filter process for one direction
. . .
1. The variable filterEdgeFlag is derived as follows:
. . .
2. All elements of the two-dimensional (nCbW)×(nCbH) array edgeFlags, maxFilterLengthQs and maxFilterlengthPs are initialized to be equal to zero.
3. The derivation process of transform block boundary specified in clause 8.8.3.3 is invoked with the location (xCb, yCb), the coding block width nCbW, the coding block height nCbH, the variable cIdx, the variable filterEdgeFlag, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.
4. the derivation process of coding subblock boundary specified in clause 8.8.3.4 is invoked with the location (xCb, yCb), the coding block width nCbW, the coding block height nCbH, the array edgeFlags, the maximum filter length arrays maxFilterLengthPs and maxFilterLengthQs, and the variable edgeType as inputs, and the modified array edgeFlags, the modified maximum filter length arrays maxFilterLengthPs and maxFilterLengthQs as outputs.
5. . . .
6. . . .
7. . . .
*(notes: if chroma deblocking filter for subblock boundaries is only applied on luma component, then the above modification on subclause 8.8.3.2 is* not needed.*)*
8.8.3.4 Derivation Process of Coding Subblock Boundary
. . .
*The variable gridSize is set as follows:*
*gridSize = (cIdx = = 0 || inter_affine_flag[ xCb ][ yCb ])? 4 : 8 (notes: if chroma deblocking filter for subblock boundaries is only applied on luma component,* then the above gridSize should be set as: *gridSize = (inter_affine_
flag[ xCb ][ yCb ])? 4 : 8)*
If edgeType is equal to EDGE_VER, the following applies:
The variable sbW is set equal to Max(*gridSize*, nCbW/numSbX).
The array edgeTbFlags is set equal to edgeFlags. *gridSize*
For xEdge=0 . . . min((nCbW/*gridSize*)−1, numSbX−1), y=0 . . . nCbH−1:
The horizontal position x inside the current coding block is set equal to xEdge*sbW.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If x is equal to 0, the following applies:
. . .
Otherwise, if edgeTbFlags[x][y] is equal to 1, the following applies:
. . .
Otherwise, if one or more of the following conditions are true:
Notes: may add one more condiftion as: xEdge is equal to 1, or added as: ( x - gridSize ) is equal to 0
(x+*4 gridSize*) is greater than or equal to nCbW,
edgeTbFlags[x−*4 gridSize*][y] is equal to 1,
edgeTbFlags[x+*4 gridSize*][y] is equal to 1,
the following applies:

maxFilterLength*Ps*[*x*][*y*]=1 (notes: 1 may be modified to 2) (8-1031)

maxFilterLength*Qs*[*x*][*y*]=1
(notes: 1 may be modified to 2) (8-1032)

Otherwise, the following applies:
. . .
Otherwise, if edgeType is equal to EDGE_HOR, the following applies:
The variable sbH is set equal to Max(*gridSize*, nCbH/numSbY).
The array edgeTbFlags is set equal to edgeFlags.
For yEdge=0 . . . min((nCbH/*gridSize*)−1, numSbY−1), x=0 . . . nCbW−1:
The vertical position y inside the current coding block is set equal to yEdge*sbH.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If y is equal to 0 and edgeFlags[x][y] is equal to 1, the following applies:
. . .
Otherwise, if edgeTbFlags[x][y] is equal to 1, the following applies:
. . .
Otherwise, if one or more of the following conditions are true:
Notes: may add one more condiftion as: yEdge is equal to 1, or added as: ( y - gridSize ) is equal to 0
(y+*4 gridSize*) is greater than or equal to nCbH,
edgeTbFlags[x][y−*4 gridSize*] is equal to 1,
edgeTbFlags[x][y+*4 gridSize*] is equal to 1,
the following applies: *4 gridSize* maxFilterLength*Ps*[*x*][*y*]=1 (8-1045)

maxFilterLength*Qs*[*x*][*y*]=1 (8-1046)

Otherwise, the following applies:
. . .
8.8.3.5. Derivation Process of Boundary Filtering Strength
. . .
For $xD_i$ with i=0 . . . xN and $yD_j$ with j=0 . . . yN, the following applies:
If edgeFlags[$xD_i$][$yD_j$] is equal to 0, the variable bS[$xD_i$][$yD_j$] is set equal to 0.
Otherwise, the following applies:
. . .
Otherwise, if one or more of the following conditions are true, bS[$xD_i$][$yD_j$] is set equal to 1:
*K = (cIdx = = 0 )? 8 : 16*
*L = (cIdx = = 0 )? 1/16: 1/32*
The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.
For the prediction of the coding subblock containing the sample $p_0$ different reference pictures or a different number of motion vectors are used than for the prediction of the coding subblock containing the sample $q_0$.
One motion vector is used to predict the coding subblock containing the sample $p_0$ and one motion vector is used to predict the coding subblock containing the sample $q_0$, and the absolute difference between the horizontal or vertical component of the motion vectors used is greater than or equal to *K* in units of *L* -luma samples.
Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to *K* in units of *L* luma samples.
Two motion vectors for the same reference picture are used to predict the coding subblock containing the sample $p_0$, two motion vectors for the same reference picture are used to predict the coding subblock containing the sample $q_0$ and both of the following conditions are true:
The absolute difference between the horizontal or vertical component of list 0 motion vectors used in the prediction of the two coding subblocks is greater than or equal to *K* in units of *L* luma samples, or the absolute difference between the horizontal or vertical component of the list 1 motion vectors used in the prediction of the two coding subblocks is greater than or equal to *K* in units of *L* luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to *K* in units of *L* luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to *K* in units of *L* luma samples.

Otherwise, the variable $bS[xD_i][yD_j]$ is set equal to 0.

*(notes: if chroma deblocking filter for subblock boundaries is only applied on luma component, then the above modification on subclause 8.8.3.5 is not needed.)*

5.2 Embodiment #3 on Decoupling the Deblocking Filter Strength Setting for Transform Block Edges from Motion Vectors 8.8.3.5 Derivation process of boundary filtering strength

. . .

For $xD_i$ with i=0 . . . xN and $yD_j$ with j=0 . . . yN, the following applies:

If edgeFlags[$xD_i$][$yD_j$] is equal to 0, the variable $bS[xD_i][yD_j]$ is set equal to 0.

Otherwise, the following applies:

The sample values $p_0$ and $q_0$ are derived as follows:

If edgeType is equal to EDGE_VER, $p_0$ is set equal to recPicture[xCb+$xD_i$−1][yCb+$yD_j$] and $q_0$ is set equal to recPicture[xCb+$xD_i$][yCb+$yD_j$].

Otherwise (edgeType is equal to EDGE_HOR), $p_0$ is set equal to recPicture[xCb+$xD_i$][yCb+$yD_j$−1] and $q_0$ is set equal to recPicture[xCb+$xD_i$][yCb+$yD_j$].

The variable $bS[xD_i][yD_j]$ is derived as follows:

If cIdx is equal to 0 and both samples $p_0$ and $q_0$ are in a coding block with intra_bdpcm_flag equal to 1, $bS[xD_i][yD_j]$ is set equal to 0.

Otherwise, if the sample $p_0$ or $q_0$ is in the coding block of a coding unit coded with intra prediction mode, $bS[xD_i][yD_j]$ is set equal to 2.

Otherwise, if the block edge is also a transform block edge and the sample $p_0$ or $q_0$ is in a coding block with ciip_flag equal to 1, $bS[xD_i][yD_j]$ is set equal to 2.

Otherwise, if the block edge is also a transform block edge, cIdx is greater than 0, and the sample $p_0$ or $q_0$ is in a transform unit with tu_joint_cbcr_residual_flag equal to 1, $bS[xD_i][yD_j]$ is set equal to 1.

Otherwise, if the prediction mode of the coding subblock containing the sample $p_0$ is different from the prediction mode of the coding subblock containing the sample $q_0$ (i.e. one of the coding subblock is coded in IBC prediction mode and the other is coded in inter prediction mode), bS [$xD_i$][$yD_j$] is set equal to 1.

Otherwise, if cIdx is equal to 0 and one or more of the following conditions are true, $bS[xD_i][yD_j]$ is set equal to 1:

The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different. NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in

Otherwise, if the block edge is also a transform block edge and the sample $p_0$ or $q_0$ is in a transform block which contains one or more non-zero transform coefficient levels, $bS[xD_i][yD_j]$ is set equal to 1.

Otherwise, the variable bS $[xD_i][yD_j]$ is set equal to 0.

5.3 Embodiment #4 on Determining the Deblocking Filter Length of the First Subblock Boundary 8.8.3.4 Derivation Process of Coding Subblock Boundary
. . .
If edgeType is equal to EDGE_VER, the following applies:
  The variable sbW is set equal to Max(8, nCbW/numSbX).
  The array edgeTbFlags is set equal to edgeFlags.
  For xEdge=0 . . . min((nCbW/8)−1, numSbX−1), y=0 . . . nCbH−1:
    The horizontal position x inside the current coding block is set equal to xEdge*sbW.
    The value of edgeFlags[x][y] is derived as follows:
      If pps_loop_filter_across_virtual_boundaries_disabled flag is equal to 1 and x is equal to PpsVirtualBoundariesPosX[n] for any n=0 . . . pps_num_ver_virtual_boundaries−1, the following applies:

edgeFlags[x][y]=0  (8-1025)

Otherwise, the following applies:

edgeFlags[x][y]=1  (8-1026)

When edgeFlags[x][y] is equal to 1, the values of maxFilterLengthPs[x][y] and maxFilterLengthQs[x][y] are modified as follows:
    if edgeTbFlags[x][y] is equal to 1, the following applies:

maxFilterLength*Ps*[x][y]=Min(5,maxFilterLength*Ps*[x][y])  (8-1029)

maxFilterLength*Qs*[x][y]=Min(5,maxFilterLength*Qs*[x][y])  (8-1030)

notes: if chroma deblocking filter is applied to subblock edge, above two lines may be modified as below:
  maxFilterLengthPs[ x ] [ y ]
  = Min( L, maxFilterLengthPs[ x ][ y ] ),
  maxFilterLengthQs[ x ][ y ]
  = Min( L, maxFilterLengthQs [ x ][ y ] ),
  where L = (cIdx = = 0)? 5: X, and X may be equal to 1 or 2 or 3

Otherwise, if one or more of the following conditions are true:
  . . .

5.4 Embodiment #5 on Determining the Deblocking Filter Length without Checking the Coding Block Dimension 8.8.3.4 Derivation Process of Coding Subblock Boundary
. . .
If edgeType is equal to EDGE_VER, the following applies:
  The variable sbW is set equal to Max(8, nCbW/numSbX).
  The array edgeTbFlags is set equal to edgeFlags.
  For xEdge=0 . . . min((nCbW/8)−1, numSbX−1), y=0 . . . nCbH−1:
    The horizontal position x inside the current coding block is set equal to xEdge*sbW.
    The value of edgeFlags[x][y] is derived as follows:
    . . .
    When edgeFlags[x][y] is equal to 1, the values of maxFilterLengthPs[x][y] and maxFilterLengthQs[x][y] are modified as follows:
    If x is equal to 0, the following applies:
    . . .
    Otherwise, if edgeTbFlags[x][y] is equal to 1, the following applies:
    . . .
    Otherwise, if one or more of the following conditions are true:
      edgeTbFlags[x−4][y] is equal to 1,
      edgeTbFlags[x+4][y] is equal to 1,
      the following applies:

maxFilterLength*Ps*[x][y]=1  (8-1031)

maxFilterLength*Qs*[x][y]=1  (8-1032)

Otherwise, if one or more of the following conditions are true:
      . . .
      Otherwise, the following applies:
      . . .
Otherwise, if edgeType is equal to EDGE_HOR, the following applies:
  The variable sbH is set equal to Max(8, nCbH/numSbY).
  The array edgeTbFlags is set equal to edgeFlags.
  For yEdge=0 . . . min((nCbH/8)−1, numSbY−1), x=0 . . . nCbW−1:
    The vertical position y inside the current coding block is set equal to yEdge*sbH.
    The value of edgeFlags[x][y] is derived as follows:
    . . .
    When edgeFlags[x][y] is equal to 1, the values of maxFilterLengthPs[x][y] and maxFilterLengthQs[x][y] are modified as follows:
    If y is equal to 0 and edgeFlags[x][y] is equal to 1, the following applies:
    . . .
    Otherwise, if edgeTbFlags[x][y] is equal to 1, the following applies:
    . . .
    Otherwise, if one or more of the following conditions are true:
      edgeTbFlags[x][y−4] is equal to 1,
      edgeTbFlags[x][y+4] is equal to 1, the following applies:

maxFilterLength$Ps[x][y]$=1     (8-1045)

maxFilterLength$Qs[x][y]$=1     (8-1046)

Otherwise, if one or more of the following conditions are true:
. . .
Otherwise, the following applies:
. . .

5.5 Embodiment #6 on Determining the Deblocking Filter Length by Index of the Subblock Boundaries 8.8.3.4 Derivation process of coding subblock boundary
. . .
If edgeType is equal to EDGE_VER, the following applies:
The variable sbW is set equal to Max(8, nCbW/numSbX).
The array edgeTbFlags is set equal to edgeFlags.
For xEdge=0 . . . min((nCbW/8)−1, numSbX−1), y=0 . . . nCbH−1:
The horizontal position x inside the current coding block is set equal to xEdge*sbW.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If x is equal to 0, the following applies:
. . .
Otherwise, if edgeTbFlags[x][y] is equal to 1, the following applies:
. . .
Otherwise, if one or more of the following conditions are true:
Notes: may add one more condifition as: xEdge is equal to 1, or added as: ( x - 4 ) is equal to 0
(x+4) is greater than or equal to nCbW,
edgeTbFlags[x−4][y] is equal to 1,
edgeTbFlags[x+4][y] is equal to 1,
the following applies:

maxFilterLength$Ps[x][y]$=1     (8-1031)

maxFilterLength$Qs[x][y]$=1     (8-1032)

Otherwise, if one or more of the following conditions are true:
xEdge is equal to (nCbW/8)−1,
edgeTbFlags[x−sbW][y] is equal to 1,
edgeTbFlags[x+sbW][y] is equal to 1,
the following applies:

maxFilterLength$Ps[x][y]$=2     (8-1033)

maxFilterLength$Qs[x][y]$=2     (8-1034)

Otherwise, the following applies:
. . .
Otherwise, if edgeType is equal to EDGE_HOR, the following applies:
The variable sbH is set equal to Max(8, nCbH/numSbY).
The array edgeTbFlags is set equal to edgeFlags.
For yEdge=0 . . . min((nCbH/8)−1, numSbY−1), x=0 . . . nCbW−1:

The vertical position y inside the current coding block is set equal to yEdge*sbH.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If y is equal to 0 and edgeFlags[x][y] is equal to 1, the following applies:
. . .
Otherwise, if edgeTbFlags[x][y] is equal to 1, the following applies:
. . .
Otherwise, if one or more of the following conditions are true:
Notes: may add one more condifition as: yEdge is equal to 1, or added as: ( y - 4 ) is equal to 0
(y+4) is greater than or equal to nCbH,
edgeTbFlags[x][y−4] is equal to 1,
edgeTbFlags[x][y+4] is equal to 1,
the following applies:
. . .
Otherwise, if one or more of the following conditions are true:
yEdge is equal to (nCbH/8)−1,
edgeTbFlags[x][y−sbH] is equal to 1,
edgeTbFlags[x][y+sbH] is equal to 1,
the following applies:

maxFilterLength$Ps[x][y]$=2     (8-1043)

maxFilterLength$Qs[x][y]$=2     (8-1044)

Otherwise, the following applies:
. . .

5.6 Embodiment #7 on Determining the Deblocking Filter Length by the Neighboring TU Edges 8.8.3.4 Derivation Process of Coding Subblock Boundary
. . .
If edgeType is equal to EDGE_VER, the following applies:
The variable sbW is set equal to Max(8, nCbW/numSbX).
The array edgeTbFlags is set equal to edgeFlags.
For xEdge=0 . . . min((nCbW/8)−1, numSbX−1), y=0 . . . nCbH−1:
The horizontal position x inside the current coding block is set equal to xEdge*sbW.
The value of edgeFlags[x][y] is derived as follows:
. . .
When edgeFlags[x][y] is equal to 1, the values of maxFilterLengthPs[x][y] and maxFilterLengthQs[x][y] are modified as follows:
If x is equal to 0, the following applies:
. . .
Otherwise, if edgeTbFlags[x][y] is equal to 1, the following applies:
Otherwise, if one or more of the following conditions are true:
xEdge is equal to 1,
xEdge is equal to (nCbW/8)−1,
edgeTbFlags[x−sbW][y] is equal to 1,
edgeTbFlags[x+sbW][y] is equal to 1,
the following applies:

maxFilterLength*Ps*[x][y]=2                          (8-1033)

maxFilterLength*Qs*[x][y]=2                          (8-1034)

Otherwise, the following applies:

maxFilterLength*Ps*[x][y]=3                          (8-1035)

maxFilterLength*Qs*[x][y]=3                          (8-1036)

Otherwise, if edgeType is equal to EDGE_HOR, the following applies:
    The variable sbH is set equal to Max(8, nCbH/numSbY).
    The array edgeTbFlags is set equal to edgeFlags.
    For yEdge=0 . . . min((nCbH/8)−1, numSbY−1), x=0 . . . nCbW−1:
        The vertical position y inside the current coding block is set equal to yEdge*sbH.
        The value of edgeFlags[x][y] is derived as follows:
        . . .
        When edgeFlags[x][y] is equal to 1, the values of maxFilterLengthPs[x][y] and maxFilterLengthQs[x][y] are modified as follows:
            If y is equal to 0 and edgeFlags[x][y] is equal to 1, the following applies:
            . . .
            Otherwise, if edgeTbFlags[x][y] is equal to 1, the following applies:
            . . .
            Otherwise, if one or more of the following conditions are true:
            . . .
            Otherwise, the following applies:

5.7 Embodiment #8 on Disallowing SBT for SbTMVP/Affine Prediction Block 7.3.8.5 Coding Unit Syntax

```
if( cu_cbf ) {
 if( CuPredMode[ chType ]
  [ x0 ][ y0 ] = =
  MODE_INTER && sps_sbt_enabled_flag
    && !ciip_flag[ x0 ][ y0 ] &&
    !MergeTriangleFlag[ x0 ][ y0 ] &&
!inter_affine_flag[ x0 ][ y0 ]
&& !merge_subblock_flag[ x0 ][ y0 ] ) {
  if( cbWidth <= MaxSbtSize &&
  cbHeight <= MaxSbtSize ) {
    allowSbtVerH = cbWidth >= 8
    allowSbtVerQ = cbWidth >= 16
    allowSbtHorH = cbHeight >= 8
    allowSbtHorQ = cbHeight >= 16
    if( allowSbtVerH | |
    allowSbtHorH | |
    allowSbtVerQ | | allowSbtHorQ )
     cu_sbt_flag                         ae(v)
}
```

5.8 Embodiment #9 on Disallowing Horizontal Edge Deblocking at ALF Virtual Boundaries 8.8.3.6.1 Decision Process for Luma Block Edges
. . .
The following ordered steps apply:
1. The variables dp0, dp3, dq0 and dq3 are derived as follows:
. . .

2. When maxFilterLengthP and maxFilterLengthQ both are equal to or greater than 3 the variables sp0, sq0, spq0, sp3, sq3 and spq3 are derived as follows:
3. The variables sidePisLargeBlk and sideQisLargeBlk are set equal to 0.
4. When maxFilterLengthP is greater than 3, sidePisLargeBlk is set equal to 1:
5. When maxFilterLengthQ is greater than 3, sideQisLargeBlk is set equal to 1:
6. When edgeType is equal to EDGE_HOR and (yCb+yBl) 00 CtbSizeY is equal to 0, sidePisLargeBlk is set equal to 0.
7. *When edgeType is equal to EDGE_HOR and (yCb + yBl ) % CtbSizeY is equal to (CtbSizeY -N), sidePisLargeBlk is set equal to 0. (notes: N is a fixed integer number, such as N = 4)*
8. The variables dSam and dSam3 are initialized to 0.
9. When sidePisLargeBlk or sideQisLargeBlk is greater than 0, the following applies:
. . .
10. The variables dE, dEp and dEq are derived as follows:
. . .

5.9 Embodiment #10 on Chroma Flag Signaling 7.3.2.4 Picture Parameter Set RBSP Syntax

|  | Descriptor |
| --- | --- |
| pic_parameter_set_rbsp( ) { |  |
|   pps_pic_parameter_set_id | ue(v) |
|   . . . |  |
|   *if( ChromaArrayType !=0 ) {* |  |
|     pps_cb_qp_offset | se(v) |
|     pps_cr_qp_offset | se(v) |
|     pps_joint_cbcr_qp_offset | se(v) |
|     pps_slice_chroma_qp_offsets_present_flag | u(1) |
|     cu_chroma_qp_offset_enabled_flag | u(1) |
|   *}* |  |
|   if( cu_chroma_qp_offset_enabled_flag ) { |  |
|     cu_chroma_qp_offset_subdiv | ue(v) |
|     chroma_qp_offset_list_len_minus1 | ue(v) |
|     for( i = 0; i <= chroma_qp_offset_list_len_minus1; i++ ) { |  |
|       cb_qp_offset_list[ i ] | se(v) |
|       cr_qp_offset_list[ i ] | se(v) |
|       joint_cbcr_qp_offset_list[ i ] | se(v) |
|     } |  |
|   } |  |
| . . . |  |

5.10 Embodiment #11 on BS Settings 8.8.3.5 Derivation Process of Boundary Filtering Strength
Inputs to this process are:
  a picture sample array recPicture,
  a location (xCb, yCb) specifying the top-left sample of the current coding block relative to the top-left sample of the current picture,
  a variable nCbW specifying the width of the current coding block,
  a variable nCbH specifying the height of the current coding block,
  a variable edgeType specifying whether a vertical (EDGE_VER) or a horizontal (EDGE_HOR) edge is filtered, a variable cIdx specifying the colour component of the current coding block, a two-dimensional (nCbW)×(nCbH) array edgeFlags.

Output of this process is a two-dimensional (nCbW)×(nCbH) array bS specifying the boundary filtering strength.

The variables $xD_i$, $yD_j$, xN and yN are derived as follows:

The variable gridSize is set as follows:

$$\text{gridSize}=cIdx==0?4:8 \quad (8\text{-}1049)$$

If edgeType is equal to EDGE_VER, $$xD_i=(i*\text{gridSize}) \quad (8\text{-}1050)$$

$$yD_j=cIdx==0?(j<<2):(j<<1) \quad (8\text{-}1051)$$

$$xN \text{ is set equal to } \text{Max}(0,(nCbW/\text{gridSize})-1) \quad (8\text{-}1052)$$

$$yN=cIdx==0?(nCbH/4)-1:(nCbH/2)-1 \quad (8\text{-}1053)$$

Otherwise (edgeType is equal to EDGE_HOR), $$xD_i=cIdx==0?(i<<2):(i<<1) \quad (8\text{-}1054)$$

$$yDj=(j*\text{gridSize}) \quad (8\text{-}1055)$$

$$xN=cIdx==0?(nCbW/4)-1:(nCbW/2)-1 \quad (8\text{-}1056)$$

$$yN=\text{Max}(0,(nCbH/\text{gridSize})-1) \quad (8\text{-}1057)$$

For $xD_i$ with i=0 . . . xN and $yD_j$ with j=0 . . . yN, the following applies:

If edgeFlags[$xD_i$][$yD_j$] is equal to 0, the variable bS [$xD_i$][$yD_j$] is set equal to 0.

Otherwise, the following applies:

The sample values $p_0$ and $q_0$ are derived as follows:

If edgeType is equal to EDGE_VER, $p_0$ is set equal to recPicture[xCb+$xD_i$−1][yCb+$yD_j$] and $q_0$ is set equal to recPicture[xCb+$xD_i$][yCb+$yD_j$].

Otherwise (edgeType is equal to EDGE_HOR), $p_0$ is set equal to recPicture[xCb+$xD_i$][yCb+$yD_j$−1] and $q_0$ is set equal to recPicture[xCb+$xD_i$][yCb+$yD_j$].

The variable bS [$xD_i$][$yD_j$] is derived as follows:

If cIdx is equal to 0 and both samples $p_0$ and $q_0$ are in a coding block with intra_bdpcm_flag equal to 1, bS[$xD_i$][$yD_j$] is set equal to 0.

Otherwise, if the sample $p_0$ or $q_0$ is in the coding block of a coding unit coded with intra prediction mode, bS [$xD_i$][$yD_j$] is set equal to 2.

Otherwise, if the block edge is also (a transform block edge *or a subblock boundary)* and the sample $p_0$ or $q_0$ is in a coding block with ciip_flag equal to 1, bS[$xD_i$][$yD_j$] is set equal to 2.

Otherwise, if the block edge is also a transform block edge and the sample $p_0$ or $q_0$ is in a transform block which contains one or more non-zero transform coefficient levels, bS[$xD_i$][$yD_j$] is set equal to 1.

Otherwise, if the block edge is also a transform block edge, cIdx is greater than 0, and the sample $p_0$ or $q_0$ is in a transform unit with tu_joint_cbcr_residual_flag equal to 1, bS[$xD_i$][$yD_j$] is set equal to 1.

Otherwise, if the prediction mode of the coding subblock containing the sample $p_0$ is different from the prediction mode of the coding subblock containing the sample $q_0$(i.e. one of the coding subblock is coded in IBC prediction mode and the other is coded in inter prediction mode), bS [$xD_i$][$yD_j$] is set equal to 1.

Otherwise, if cIdx is equal to 0 and one or more of the following conditions are true, bS[$xD_i$][$yD_j$] is set equal to 1:

The coding subblock containing the sample $p_0$ and the coding subblock containing the sample $q_0$ are both coded in IBC prediction mode, and the absolute difference between the horizontal or vertical component of the block vectors used in the prediction of the two coding subblocks is greater than or equal to 8 in units of 1/16 luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 8 in units of 1/16 luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 8 in units of 1/16 luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 8 in 1/16 luma samples, or the absolute difference between the horizontal or vertical component of the list 1 motion vectors used in the prediction of the two coding subblocks is greater than or equal to 8 in units of 1/16 luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 8 in units of 1/16 luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 8 in units of 1/16 luma samples.

Otherwise, the variable $bS[xD_i][yD_j]$ is set equal to 0.

Alternatively, the above sentence

Otherwise, if the block edge is also (a transform block edge *or a subblock boundary*) and the sample $p_0$ or $q_0$ is in a coding block with ciip_flag equal to 1, $bS[xD_i][yD_j]$ is set equal to 2.

May be replaced by:

Otherwise, if the block edge is also (a transform block edge *but not a subblock boundary*) and the sample $p_0$ or $q_0$ is in a coding block with ciip_flag equal to 1, $bS[xD_i][yD_j]$ is set equal to 2.

5.11 Embodiment #12 on BS Settings 8.8.3.5 Derivation Process of Boundary Filtering Strength
...

For $xD_i$ with $i=0 \ldots xN$ and $yD_j$ with $j=0 \ldots yN$, the following applies:

If edgeFlags$[xD_i][yD_j]$ is equal to 0, the variable $bS[xD_i][yD_j]$ is set equal to 0.

Otherwise, the following applies:

The sample values $p_0$ and $q_0$ are derived as follows:

If edgeType is equal to EDGE_VER, $p_0$ is set equal to recPicture$[xCb+xD_i-1][yCb+yD_j]$ and $q_0$ is set equal to recPicture$[xCb+xD_i][yCb+yD_j]$.

Otherwise (edgeType is equal to EDGE_HOR), $p_0$ is set equal to recPicture$[xCb+xD_i][yCb+yD_j-1]$ and $q_0$ is set equal to recPicture$[xCb+xD_i][yCb+yD_j]$.

The variable bS $[xD_i][yD_j]$ is derived as follows:

If cIdx is equal to 0 and both samples $p_0$ and $q_0$ are in a coding block with intra_bdpcm_flag equal to 1, $bS[xD_i][yD_j]$ is set equal to 0.

Otherwise, if the sample $p_0$ or $q_0$ is in the coding block of a coding unit coded with intra prediction mode, bS $[xD_i][yD_j]$ is set equal to 2.

Otherwise, if the block edge is also a transform block edge and the sample $p_0$ or $q_0$ is in a coding block with ciip_flag equal to 1, bS $[xD_i][yD_j]$ is set equal to 2.

Otherwise, if the block edge is also a transform block edge and the sample $p_0$ or $q_0$ is in a transform block which contains one or more non-zero transform coefficient levels, $bS[xD_i][yD_j]$ is set equal to 1.

Otherwise, if the block edge is also a transform block edge, cIdx is greater than 0, and the sample $p_0$ or $q_0$ is in a transform unit with tu_joint_cbcr_residual_flag equal to 1, $bS[xD_i][yD_j]$ is set equal to 1.

Otherwise, if cIdx is equal to 0 and one or more of the following conditions are true, $bS[xD_i][yD_j]$ is set equal to 1:
...

Otherwise, the variable $bS[xD_i][yD_j]$ is set equal to 0.

Figure 6A:
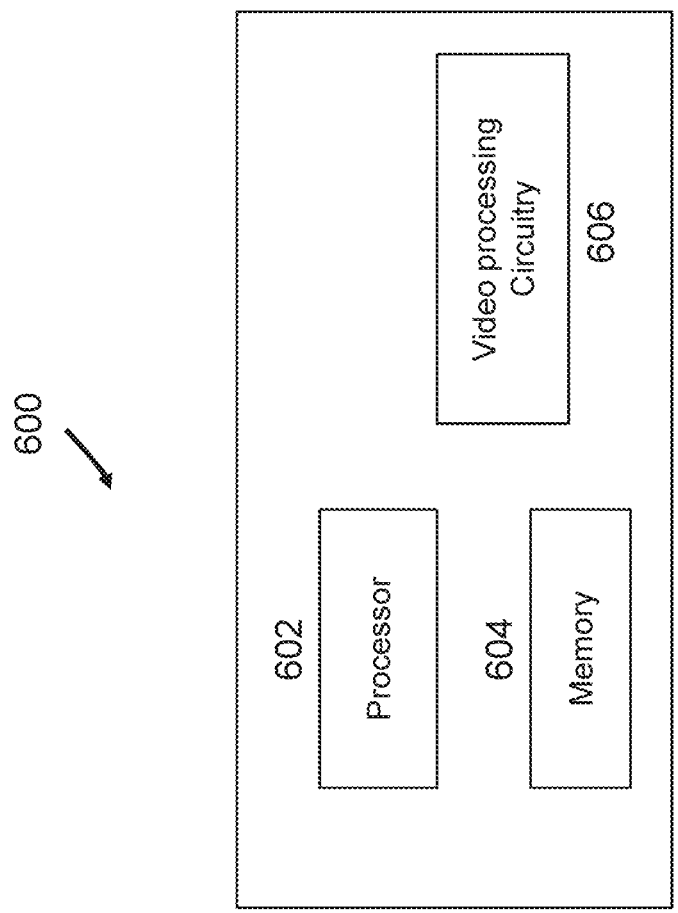
FIGS. 6A and 6B are block diagrams of example implementations of a hardware platform for video processing.

FIG. 6A is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document.

Figure 6B:
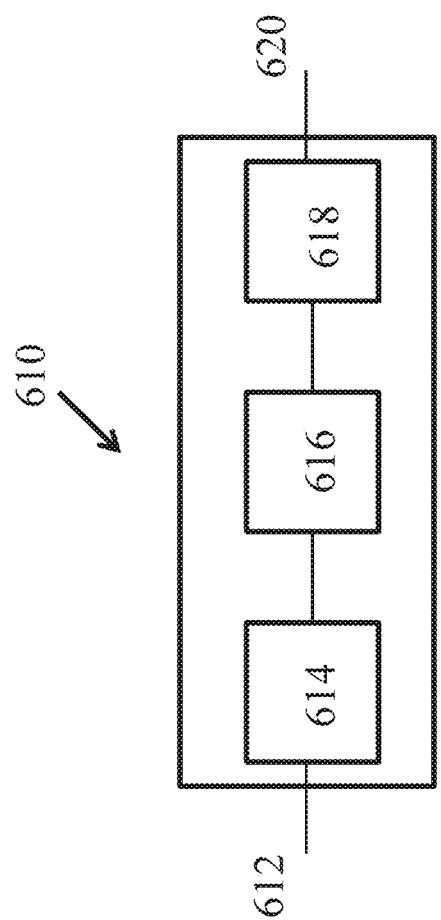

FIG. 6B is another example of a block diagram of a video processing system in which disclosed techniques may be implemented. FIG. 6B is a block diagram showing an example video processing system 610 in which various techniques disclosed herein may be implemented. Various implementations may include some or all of the components of the system 610. The system 610 may include input 612 for receiving video content. The video content may be received in a raw or uncompressed format, e.g., 8 or 10 bit multi-component pixel values, or may be in a compressed or encoded format. The input 612 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 610 may include a coding component 614 that may implement the various coding or encoding methods described in the present document. The coding component 614 may reduce the average bitrate of video from the input 612 to the output of the coding component 614 to produce a coded representation of the video. The coding techniques are therefore sometimes called video compression or video transcoding techniques. The output of the coding component 614 may be either stored, or transmitted via a communication connected, as represented by the component 616. The stored or communicated bitstream (or coded) representation of the video received at the input 612 may be used by the component 618 for generating pixel values or displayable video that is sent to a display interface 620. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The first set of following clauses may be implemented as preferred clauses in some embodiments.

The following clauses may be implemented together with additional techniques described in items listed in the previous section (e.g., item 1).

1. A method of video processing (e.g., method 700 depicted in FIG. 7), comprising making a determination (702), for a conversion between a video and a bitstream representation of the video, about whether or how a deblocking filter is applied to a natural boundary of a current subblock based on a size rule depending on a size of the current subblock and/or a position rule and/or a coding mode rule; and performing (704) the conversion according to the determination; wherein the size rule specifies that the deblocking filter is applied for 4×4 subblocks.

2. The method of clause 1, wherein the making the determination about how the deblocking filter is applied includes determining a filter length.

3. The method of clause 1, wherein the size rule further specifies that the deblocking filter is not applied to 8×8 blocks or the size rule further specifies that the determination about how the deblocking filter is applied is not performed for 8×8 subblocks.

4. The method of any of clauses 1-3, wherein the coding mode rule specifies to enable the deblocking filter at the natural boundary that aligns with a motion compensation or motion derivation edge of the current subblock.

The following clauses may be implemented together with additional techniques described in items listed in the previous section (e.g., item 4).

5. The method of any of clauses 1-4, wherein the position rule specifies to use a filter length for the current subblock that is same as that used for other subblocks in a video region.

6. The method of clause 5, wherein the video region is a current block containing the current subblock.

The following clauses may be implemented together with additional techniques described in items listed in the previous section (e.g., item 4).

7. A method of video processing, comprising: making a determination, for a conversion between a video and a bitstream representation of the video, to use a deblocking filter on a video region of the video; and performing the conversion according to the determination, wherein the deblocking filter is selectively applied to samples of the video region according to a rule that depends on a position of a virtual boundary associated with the video region.

8. The method of clause 7, wherein the video region corresponds to a coding tree unit and wherein the virtual boundary is N samples above a horizontal coding tree unit boundary and wherein the rule specifies to disable the deblocking filter at the virtual boundary.

9. The method of clause 7, wherein the video region is a transform unit and wherein the rule specifies to disable the deblocking filter at a horizontal edge of the video region coinciding with the virtual boundary.

10. The method of clause 7, wherein the video region is a prediction unit and wherein the rule specifies to disable the deblocking filter at a horizontal edge of the video region coinciding with the virtual boundary.

11. The method of any of clauses 7 or 9-10, wherein the rule specifies to disable the deblocking filter at a vertical edge of the video region coinciding with the virtual boundary.

The following clauses may be implemented together with additional techniques described in items listed in the previous section (e.g., item 14).

12. A method of video processing, comprising: making a determination, for a conversion between a video and a bitstream representation of the video, to use a deblocking filter on a video region of the video; and performing the conversion according to the determination such that calculations of the deblocking filter are performed according to a rule that depends on a position of a virtual boundary associated with the video region.

13. The method of clause 12, wherein the rule specifies that a sample p modified to a sample p' by using the deblocking filter, where p'=p+d', and d'=Clip3(t1, t2, d), where d is derived during the conversion and wherein [t1, t2] is a clipping range, where t1 and t2 are integers.

14. The method of clause 13, wherein t1 or t2 depend on whether deblocking filter is applied to the virtual boundary.

15. The method of any of clauses 13-14, wherein t1=−2N and t2=2N−1, where N is an integer.

The following clauses may be implemented together with additional techniques described in items listed in the previous section (e.g., item 15).

16. A method of video processing, comprising: performing a conversion between a video comprising multiple video blocks, at least some of which include multiple subblocks, and a coded representation of the video based on a rule of exclusion that specifies that a subblock transform mode and a subblock coding mode are used mutually exclusively during the conversion.

17. The method of clause 16, wherein the subblock coding mode corresponds to an affine coding mode.

18. The method of clauses 16 or 17, wherein the subblock coding mode includes an SbTMVP (subblock temporal motion vector predictor) mode.

The following clauses may be implemented together with additional techniques described in items listed in the previous section (e.g., item 16).

19. The method of any of clauses 16-18, wherein the coded representation excludes syntax elements for a coding mode that is excluded due to the rule of exclusion.

The following clauses may be implemented together with additional techniques described in items listed in the previous section (e.g., item 20).

20. A method of video processing, comprising: making a determination, based on a chroma format or a coding method associated with a chroma component of a video, for a conversion between the video and a coded representation of the video, whether a syntax element is signaled in the coded representation; and performing the conversion based on the determination.

21. The method of clause 20, wherein the chroma format comprises a chroma format sampling structure.

22. The method of any of clauses 20-21, wherein the syntax element is a Cb/Cr flag that is conditionally signaled in a picture parameter set according to the chroma format sampling structure.

23. The method of clause 20, wherein the syntax element, called X, is signaled only for the chroma format being a monochrome format.

24. The method of clause 20, wherein the syntax element, called X, is signaled only for the chroma format being 4:4:4 and where a separate color flag is set to 1.

25. The method of clauses 23 or 24, wherein X is pps_cb_qp_offset or pps_cr_qp_offset or pps_joint_cbcr_qp_offset or cu_chroma_qp_offset_enabled_flag or pps_slice_chroma_qp_offsets_present_flag.

The following clauses may be implemented together with additional techniques described in items listed in the previous section (e.g., item 21).

26. A method of video processing, comprising: parsing a first syntax element a coded representation of a video comprising a sequence of multiple pictures, wherein the first syntax element is included in the coded representation at a picture parameter set level, and wherein the parsing is performed in absence of an implicit rule that precludes use of the first syntax element depending on presence of a second syntax element at a sequence parameter set level; and generating the video based on the parsing.

27. A method of video processing, comprising: including a first syntax element in a coded representation of a video comprising a sequence of multiple pictures, at a picture parameter set level, and wherein the including is performed in absence of an implicit rule that precludes inclusion of the first syntax element depending on presence of a second syntax element at a sequence parameter set level; and generating the coded representation based on the including.

28. The method of any of clauses 26-27, wherein the first syntax element is log 2_transform_skip_max_size_minus2 and wherein the second syntax element is sps_transform_skip_enabled_flag.

29. The method of any of clauses 1 to 28, wherein the conversion comprises encoding the video into the coded representation.

30. The method of any of clauses 1 to 28, wherein the conversion comprises decoding the coded representation to generate pixel values of the video.

31. A video decoding apparatus comprising a processor configured to implement a method recited in one or more of clauses 1 to 30.

32. A video encoding apparatus comprising a processor configured to implement a method recited in one or more of clauses 1 to 30.

33. A computer program product having computer code stored thereon, the code, when executed by a processor, causes the processor to implement a method recited in any of clauses 1 to 30.

34. A method, apparatus or system described in the present document.

The following clauses describe some embodiments and techniques. The second set of clauses describe certain features and aspects of the disclosed techniques in the previous section (e.g., items 1 to 7).

Figure 8A:
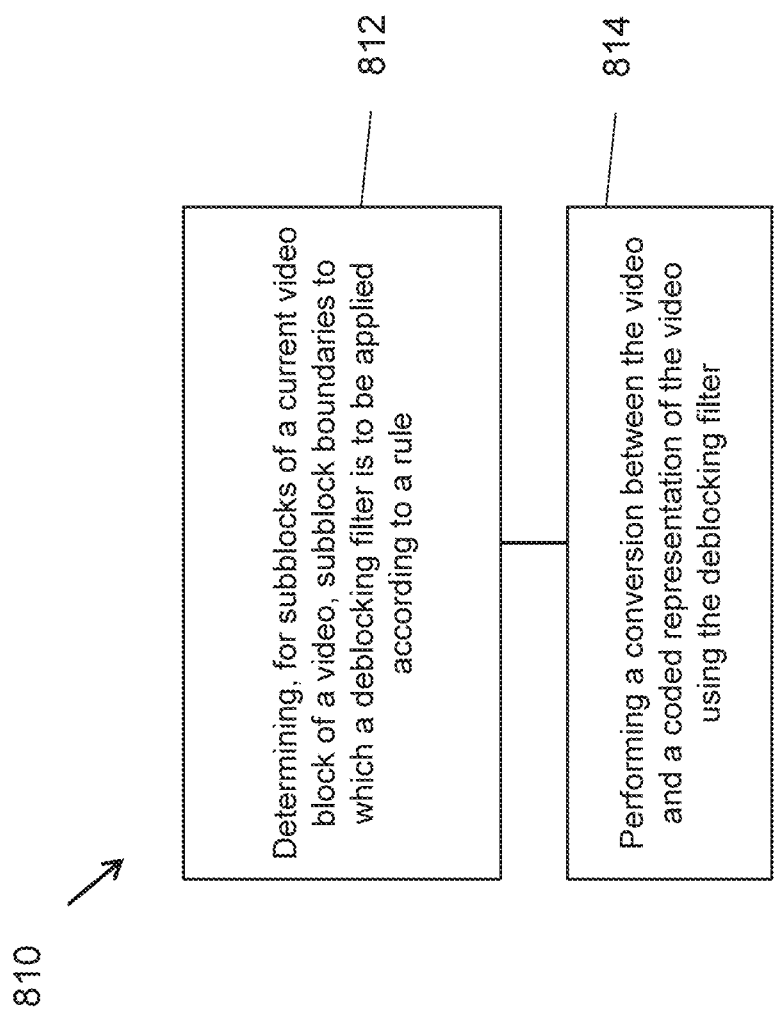
FIGS. 8A to 8D show flowcharts for example methods of video processing.

1. A method of video processing (e.g., method 810 depicted in FIG. 8A), comprising: determining (812), for subblocks of a current video block of a video, subblock boundaries to which a deblocking filter is to be applied according to a rule; and performing (814) a conversion between the video and a coded representation of the video using the deblocking filter, wherein the rule specifies that a deblocking filter length is determined without checking a relationship between i) a sum of a position of a subblock of the current video block and a predefined value and ii) a width or a height of the current video block.

2. The method of clause 1, wherein the rule specifies that the deblocking filter length in a vertical direction is determined without checking whether the value of x+dx is greater than or equal to a width of the current video block.

3. The method of clause 1, wherein x is a horizontal position of the subblock in the current video block.

4. The method of clause 3, wherein dx is set equal to 4.

5. The method of clause 1, wherein the rule specifies that the deblocking filter length in a horizontal direction is determined without checking whether the value of y+dy is greater than or equal to a height of the current video block.

6. The method of clause 5, wherein y is a vertical position of the subblock in the current video block.

7. The method of clause 6, wherein dy is set equal to 4.

Figure 8B:
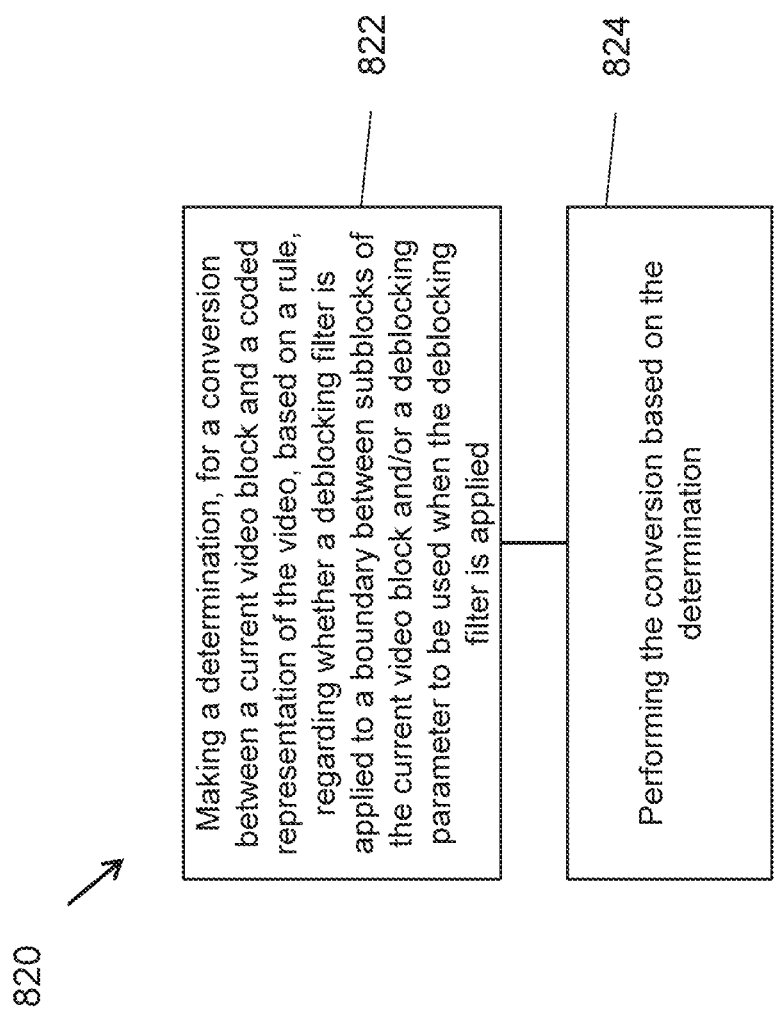

8. A method of video processing (e.g., method 820 depicted in FIG. 8B), comprising: making (822) a determination, for a conversion between a current video block and a coded representation of the video, based on a rule, regarding whether a deblocking filter is applied to a boundary between subblocks of the current video block and/or a deblocking parameter to be used when the deblocking filter is applied; and performing (824) the conversion based on the determination, wherein the rule is based on whether the boundary falls on an N×M sample grid of a subblock, where N and M are integers, and/or whether the boundary is a natural boundary of the current video block.

9. The method of clause 8, wherein the deblocking parameter includes a deblocking filter length and/or a deblocking filter strength.

10. The method of clause 8 or 9, wherein the deblocking filter corresponds to a luma deblocking filter that deblock filters video information including luma information of the video and wherein the making of the determination determines to apply the luma deblocking filter based on the rule that specifies to apply the luma deblocking filter to a 4×4 sample grid.

11. The method of clause 10, wherein the rule further specifies that the luma deblocking filter is not applied to the boundary that is the natural boundary in case that the boundary falls on an 8×8 sample grid.

12. The method of clause 8, wherein the making of the determination includes determining a filter length.

13. The method of clause 12, wherein the determining of the filter length is applied for a 4×4 sample grid and not applied for a 8×8 sample grid, in case that the deblocking filter corresponds to a luma deblocking filter that deblock filters video information including luma information of the video.

14. The method of clause 8, wherein the N×M sample grid is determined a coding mode of the subblock.

15. The method of clause 14, wherein the N×M sample grid aligns with a motion compensation or motion derivation edge of the subblock.

16. The method of clause 8, wherein the deblocking filter corresponds to a chroma deblocking filter that deblock filters video information including chroma information of the video.

17. The method of clause 16, wherein the rule further specifies that the chroma deblocking filter is applied to the N×M sample grid, each of N and M being 4 or 8.

18. The method of clause 16, wherein the making of the determination includes determining whether a current chroma deblocking edge is a boundary of the subblock and wherein such determining is performed for a N×N sample grid, N being 4 or 8.

19. The method of clause 12, wherein the determining of the filter length is applied for the N×M sample grid in case that the deblocking filter corresponds to a chroma deblocking filter that deblock filters video information including chroma information of the video, each of N and M being 4 or 8.

20. The method of clause 12, wherein the filter length determined for a chroma deblocking filter is smaller than or equal to L.

21. The method of clause 16, wherein a strength of the chroma deblocking filter is dependent on at least one of i) a number of motion vectors, ii) reference pictures, or iii) absolute block vector (BV) or motion vector (MV) differences between two neighboring pixels that are located at two side of the boundary.

22. The method of clause 8, wherein the making of the determination is performed further dependent on whether the subblock is coded using a subblock based methods.

23. The method of clause 22, wherein the current subblock is coded with an affine coding mode, a SbTMVP (subblock temporal motion vector predictor) mode, a DMVR (decoder-side motion vector refinement) mode, a chroma IBC (inter block copy) mode.

24. The method of clause 8, wherein the making of the determination depends on a color subsampling format of the video.

25. The method of any of clauses 8 to 24, wherein N and M are dependent on a color format of the video.

Figure 8C:
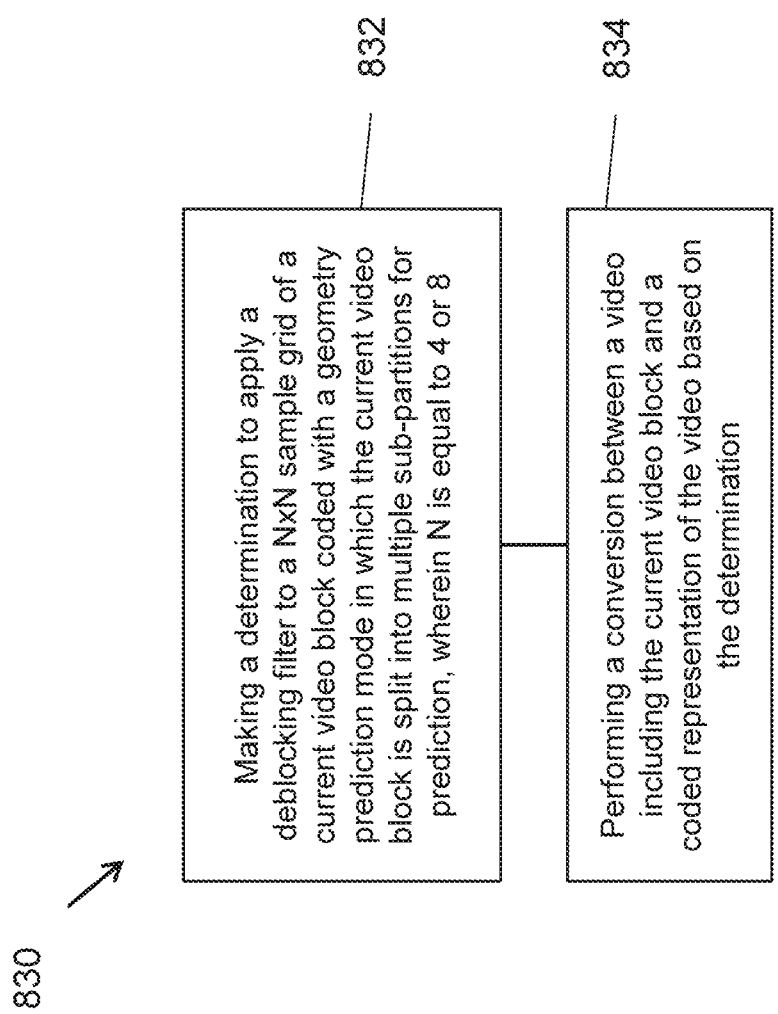

26. A method of video processing (e.g., method 830 depicted in FIG. 8C), comprising: making (832) a determination to apply a deblocking filter to a N×N sample grid of a current video block coded with a geometry prediction mode in which the current video block is split into multiple sub-partitions for prediction, wherein N is equal to 4 or 8; and performing (834) a conversion between a video including the current video block and a coded representation of the video based on the determination.

27. The method of clause 26, wherein an internal edge derivation for the current video block is performed based on a rule that is applied to a subblock boundary derivation process for a video block coded using a SbTMVP (subblock temporal motion vector predictor) mode and/or an affine mode.

28. The method of clause 26, wherein a boundary, a filter length, and/or a filter strength of the deblocking filter is determined based on a 4×4 sample grid or a 8×8 sample grid.

Figure 8D:
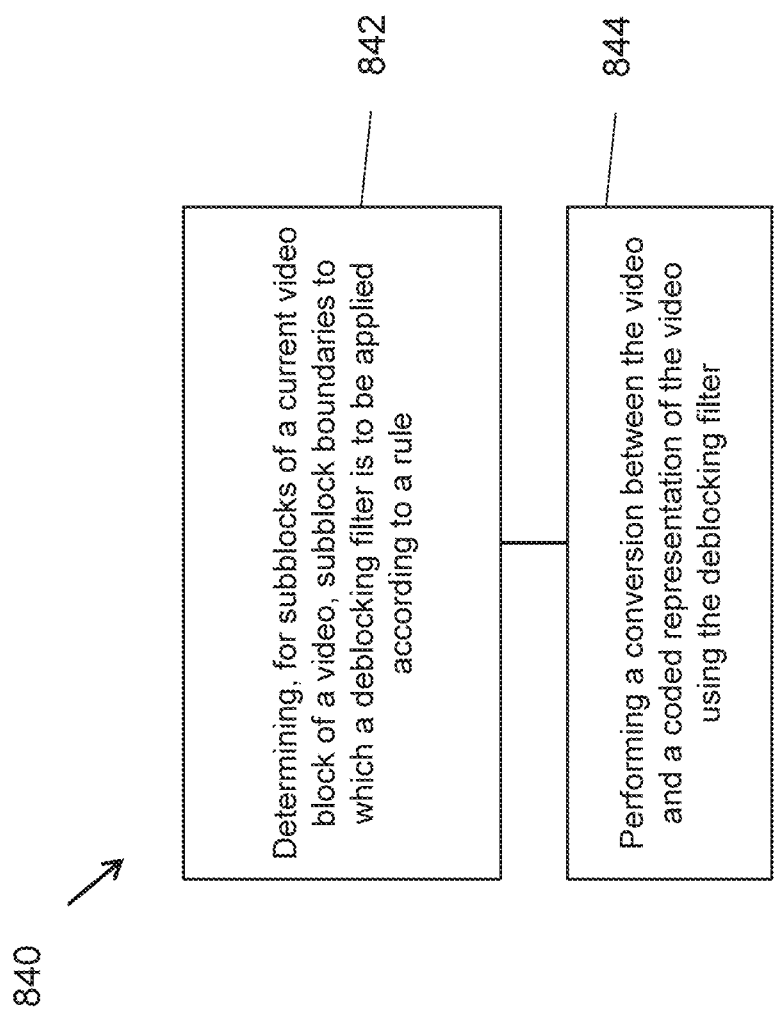

29. A method of video processing (e.g., method 840 depicted in FIG. 8D), comprising: determining (842), for subblocks of a current video block of a video, subblock boundaries to which a deblocking filter is to be applied according to a rule; and performing (844) a conversion between the video and a coded representation of the video using the deblocking filter.

30. The method of clause 29, wherein the rule specifies that a deblocking filter length for a leftmost vertical boundary or a topmost horizontal boundary is same as that used for other subblocks.

31. The method of clause 30, wherein the rule further specifies that the deblocking filter length is determined based on whether the leftmost vertical boundary or the topmost horizontal boundary coincides with a transform block edge.

32. The method of clause 30, wherein, for the leftmost vertical boundary or the topmost horizontal boundary, the deblocking filter length (maxFilterLengthPs) is set to Min(5, maxFilterLengthPs) regardless of 1) whether a left or top neighboring block to the leftmost vertical boundary or the topmost horizontal boundary is SbTMVP-coded or affine-coded, and/or 2) a number of subblocks in the current video block.

33. The method of clause 29, wherein the rule specifies that a deblocking filter length is determined based on a subblock edge position of a corresponding subblock.

34. The method of clause 33, wherein the subblock edge position has a corresponding subblock edge index (xEdge) that has a range of [0, M], M is an integer that is not less than 0.

35. The method of clause 34, wherein, for xEdge in a range of [a, b], the deblocking filter length is set to a fixed integer value (L), and wherein a and b are integers that are not less than 0.

36. The method of clause 35, wherein a=0 or 1, or b=M or M−1, or a=b=0, 1, M, or M−1.

37. The method of clause 26, wherein the rule specifies that a deblocking filter length is determined based on a relationship between a size of the current video block and a value of x+delta, and wherein x denotes a horizontal or a vertical subblock position within the current video block and delta is an integer.
38. The method of clause 37, wherein the deblocking filter length is determined by checking whether the value of x+delta is greater than or equal to a width or a height of the current video block.
39. The method of clause 29, wherein the rule specifies that a deblocking filter length of a vertical boundary at column x or a horizontal boundary at row y in the current video block is determined based on whether a vertical boundary at column x+dx or a horizontal boundary at row y+dy is a transform block boundary or not, and wherein dx and dx are integers.
40. The method of clause 39, wherein the current video block is coded using a SbTMVP (subblock temporal motion vector predictor) mode and/or an affine mode.
41. The method of clause 39, wherein the deblocking filter length is determined without checking whether a first condition that x+dx is equal to or greater than a width of the current video block is satisfied and/or whether a second condition that y+dy is equal to or greater than a height of the current video block is satisfied.
42. The method of clause 39, wherein the deblocking filter length is determined further based on whether a first condition that x+dx is equal to or greater than a width of the current video block is satisfied and/or whether a second condition that y+dy is equal to or greater than a height of the current video block is satisfied.
43. The method of any of clauses 1 to 42, wherein the performing of the conversion includes generating the coded representation from the current video block.
44. The method of any of clauses 1 to 42, wherein the performing of the conversion includes generating the current video block from the coded representation.
45. A video processing apparatus comprising a processor configured to implement a method recited in any one or more of clauses 1 to 44.
46. A computer readable medium storing program code that, when executed, causes a processor to implement a method recited in any one or more of clauses 1 to 44.

The third set of clauses describe certain features and aspects of the disclosed techniques in the previous section (e.g., items 8 to 20).

Figure 9A:
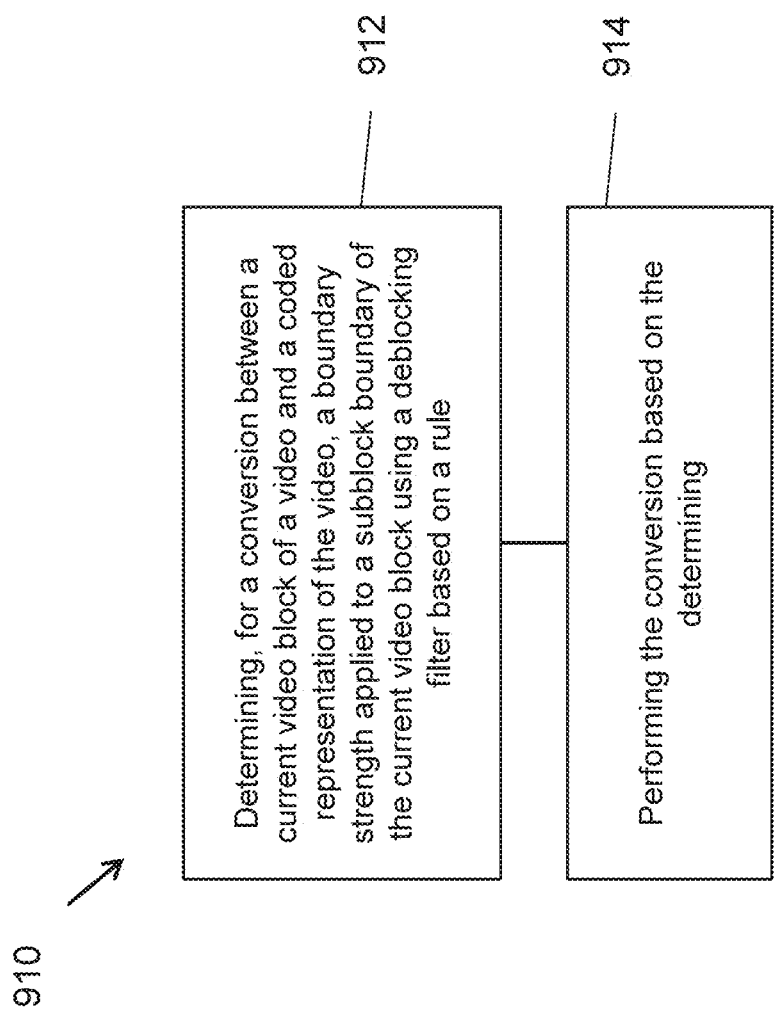
FIGS. 9A to 9I show flowcharts for example methods of video processing.
Figure 9B:
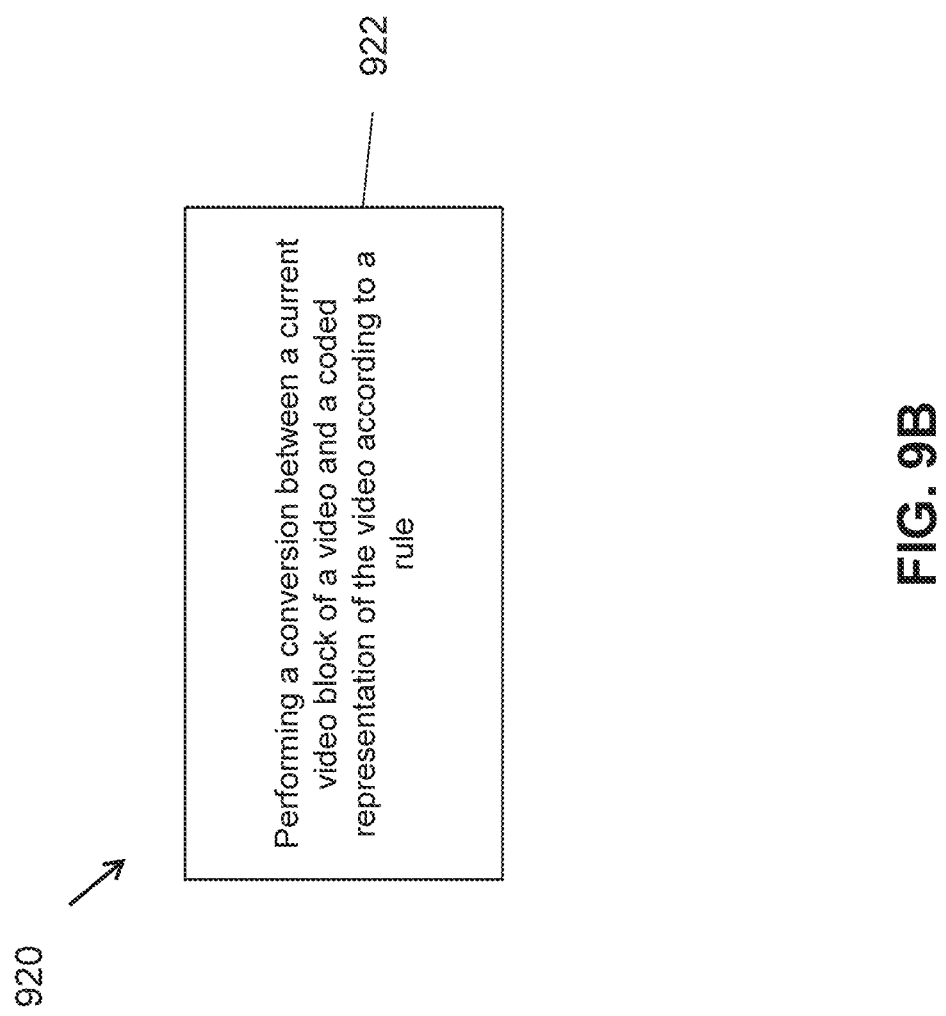
Figure 9C:
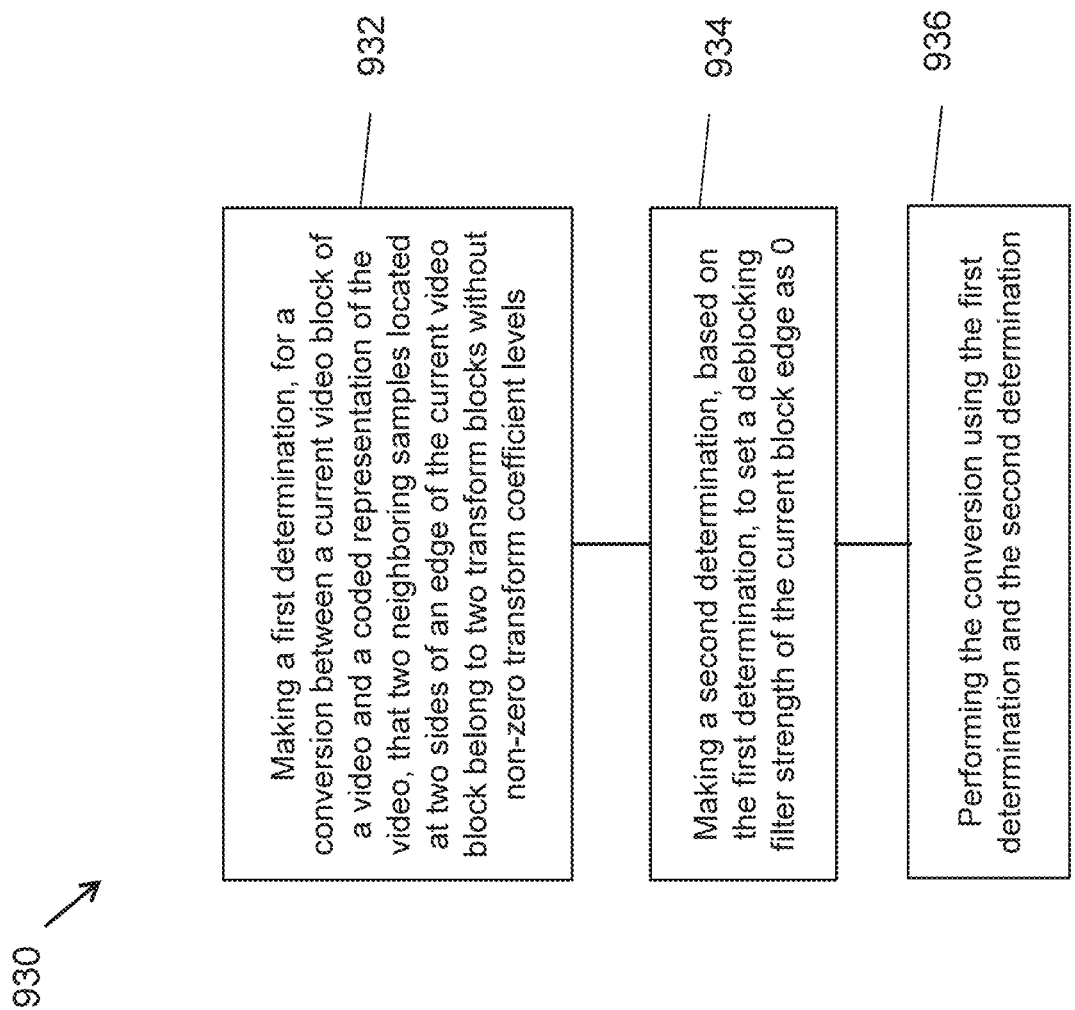

1. A method of video processing (e.g., method 910 depicted in FIG. 9A), comprising: determining (912), for a conversion between a current video block of a video and a coded representation of the video, a boundary strength applied to a subblock boundary of the current video block using a deblocking filter based on a rule; and performing (914) the conversion based on the determining, wherein the rule specifies that the boundary strength is set equal to 2 regardless of whether the subblock boundary is a transform block boundary.
2. The method of clause 1, wherein the rule specifies that the boundary strength is set equal to 2 to the subblock boundary that is not the transform block boundary.
3. The method of clause 1 or 2, wherein the rule specifies that at least one of two neighboring samples along the boundary is coded using a combined inter-intra prediction (CIIP) mode.
4. The method of clause 3, wherein the CIIP mode is used to derive a prediction sample based on a weighted sum of a inter prediction sample and intra prediction sample.
5. A method of video processing (e.g., method 920 depicted in FIG. 9B), comprising: performing (922) a conversion between a current video block of a video and a coded representation of the video according to a rule, wherein, the conversion uses a sub-block transform (SBT) tool comprising: during encoding, partitioning the current video block into transform blocks (TBs) and applying a TB level transform to the TBs, or during decoding, applying a TB level inverse transform to coded samples in the coded representation of the video, wherein the rule specifies that an adaptive filter is enabled across at least three TB boundaries in a horizontal direction and/or vertical direction.
6. The method clause 5, wherein the at least three TB boundaries include two TB boundaries between the transform blocks and a coded-block boundary of the current video block.
7. The method of clause 6, wherein a transform block has a size smaller than the current video block.
8. The method of clause 6, wherein whether to filter the coded block boundary is dependent on whether the coded block boundary is a subblock boundary between subblocks of the current video block.
9. A method of video processing (e.g., method 930 depicted in FIG. 9C), comprising: making (932) a first determination, for a conversion between a current video block of a video and a coded representation of the video, that two neighboring samples located at two sides of an edge of the current video block belong to two transform blocks without non-zero transform coefficient levels; making (934) a second determination, based on the first determination, to set a deblocking filter strength of the current block edge as 0; and performing (936) the conversion using the first determination and the second determination.
10. The method of clause 9, wherein one of the two neighboring samples are coded as a geometry prediction mode in which the current video block is split into sub-partitions.
11. The method of clause 9, wherein motion vector differences between the two neighboring samples is higher than a threshold T, whereby T is an integer.
12. The method of clause 9, wherein the second determination for the deblocking filter strength at transform block boundaries is made independently of a motion vector related rule.
13. A method of video processing, comprising: performing a conversion between a current video block of a video and a coded representation of the video using a decoder-side motion vector refinement (DMVR) tool; and applying a deblocking filter to a reconstructed video block generated during the conversion; wherein the DMVR tool includes generating the reconstructed video block by motion compensation using a refined motion vector generated by refining a coded motion vector in the coded representation; wherein a parameter of the deblocking filter is based on the refined motion vector.
14. The method of clause 13, wherein the current video block corresponds to a coding unit (CU) processed by the DMVR and the deblocking process is performed at subblock boundaries within the coding unit using the refined motion vector of subblocks of the current video block.
15. The method of clause 13, wherein the current video block corresponds to a coding unit (CU) processed by the DMVR and the deblocking process is performed at CU boundaries using a signaled motion vector of the CU.

16. The method of clause 13, wherein the current video block corresponds to a coding unit (CU) processed by the DMVR and the deblocking process is performed at CU boundaries using a signaled motion vector of the CU and the refined motion vector of subblocks of the current video block.

Figure 9D:
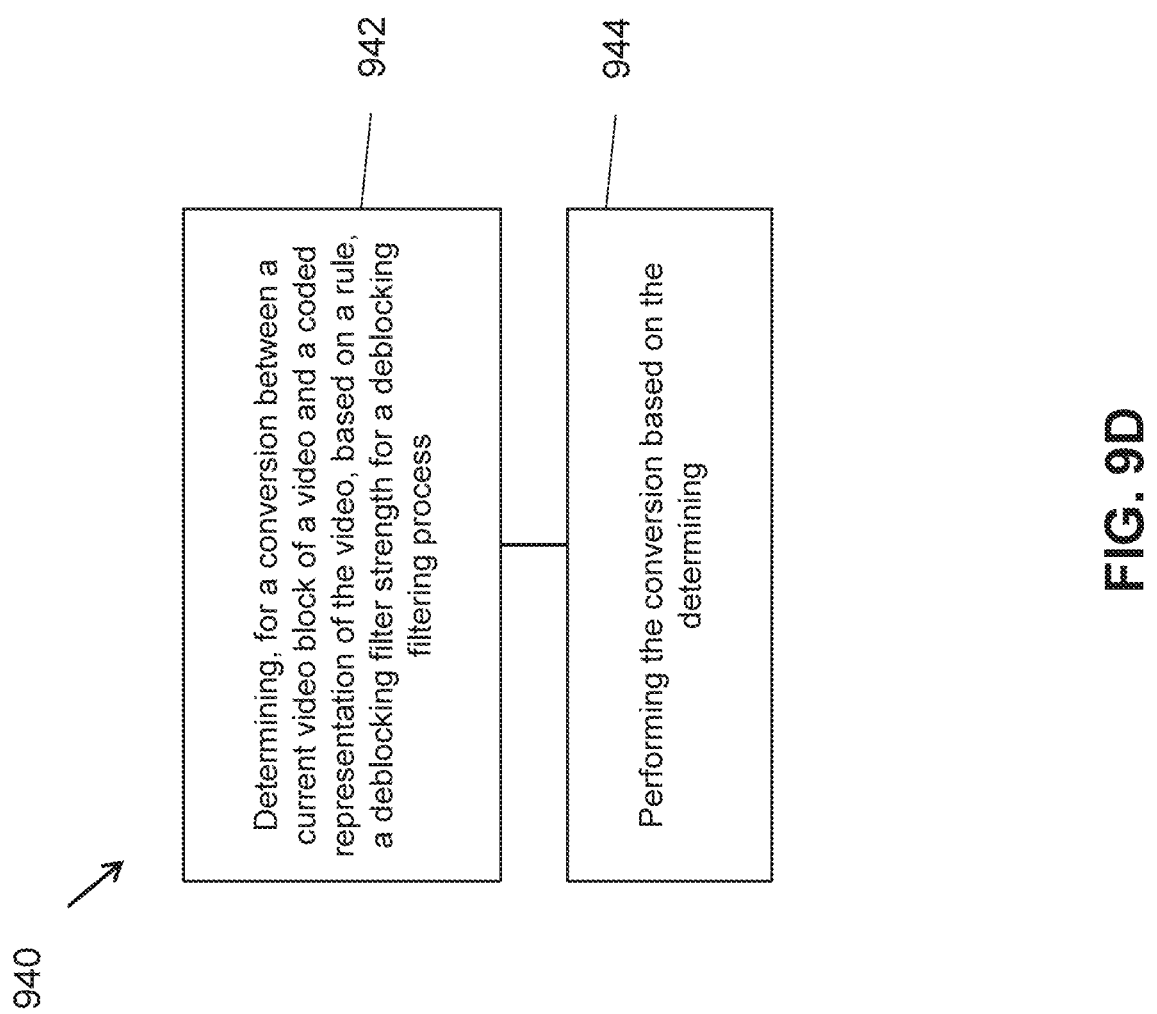

17. A method of video processing (e.g., method 940 depicted in FIG. 9D), comprising: determining (942), for a conversion between a current video block of a video and a coded representation of the video, based on a rule, a deblocking filter strength for a deblocking filtering process; and performing (944) the conversion based on the determining, and wherein the rule specifies that the deblocking filter strength is not dependent on a prediction mode of adjacent blocks of the current video block.

18. The method of clause 17, wherein the certain coding mode is an inter block copy (IBC) mode that generates a prediction block using at least a block vector pointing to a video frame containing the current video block or an inter coding mode that includes representing or reconstructing the video using a temporal correlation.

19. The method of clause 17 or 18, wherein the rule further specifies that the deblocking filter strength is dependent on whether one of the adjacent blocks is coded using an intra mode that includes representing or reconstructing the video based on a previously processed video block.

Figure 9E:
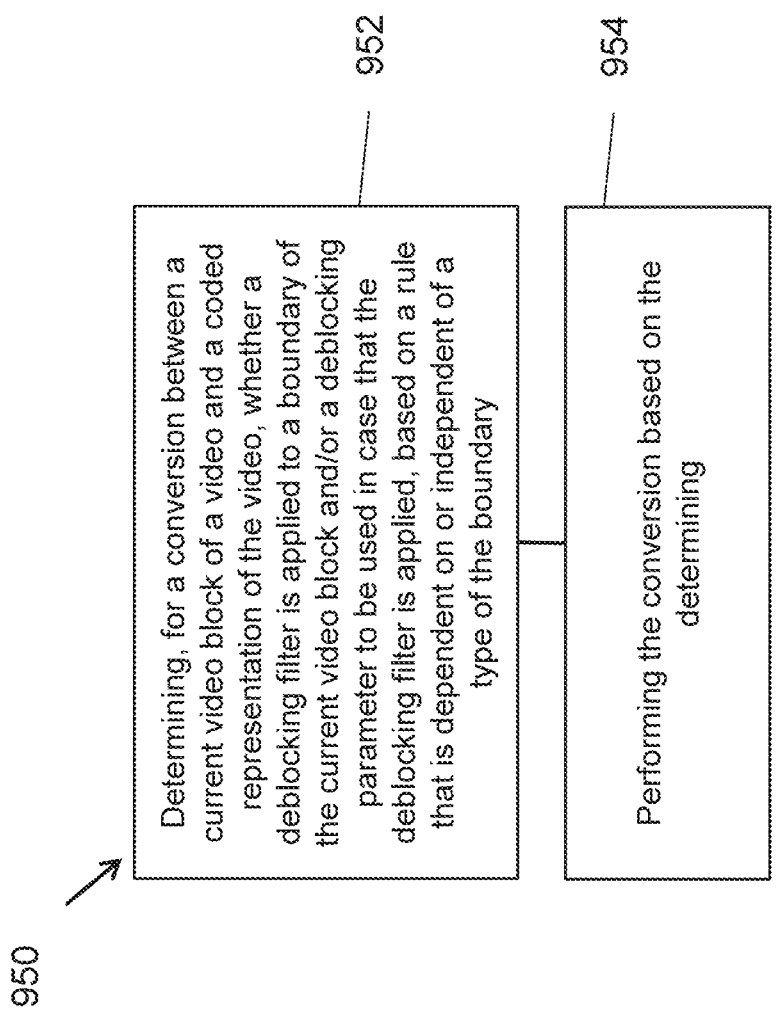

20. A method of video processing (e.g., method 950 depicted in FIG. 9E), comprising: determining (952), for a conversion between a current video block of a video and a coded representation of the video, whether a deblocking filter is applied to a boundary of the current video block and/or a deblocking parameter to be used in case that the deblocking filter is applied, based on a rule that is dependent on or independent of a type of the boundary; and performing (954) the conversion based on the determining.

21. The method of clause 20, wherein the type of the boundary relates to whether the boundary is a transform block boundary or a subblock boundary.

22. The method of clause 20 or 21, wherein the rule specifies that a deblocking filter strength is determined as different values for the transform block boundary and the subblock boundary.

23. The method of clause 22, wherein a transform block boundary flag is stored at a first array buffer and a subblock boundary flag is stored at a second array buffer different from the first array buffer.

24. The method of clause 22, wherein the deblocking filter strength for the transform block boundary is determined based on transform coefficients.

25. The method of clause 22, wherein the deblocking filter strength for the subblock boundary is determined based on motion vectors, and/or reference pictures between two neighboring pixels that are located at two sides of the boundary.

26. The method of clause 22, wherein the rule specifies that the boundary strength is set equal to 1 or 2 in a case 1) that the boundary is the transform block boundary but not the subblock boundary and 2) that at least one of two neighboring samples along the boundary is coded using a combined inter-intra prediction (CIIP) mode, whereby X is 1 or 2.

27. The method of clause 20, wherein the deblocking parameter includes at least one of a filter strength, a filter length, or a boundary strength and wherein the rule specifies to use same parameter for different types of the boundary.

Figure 9F:
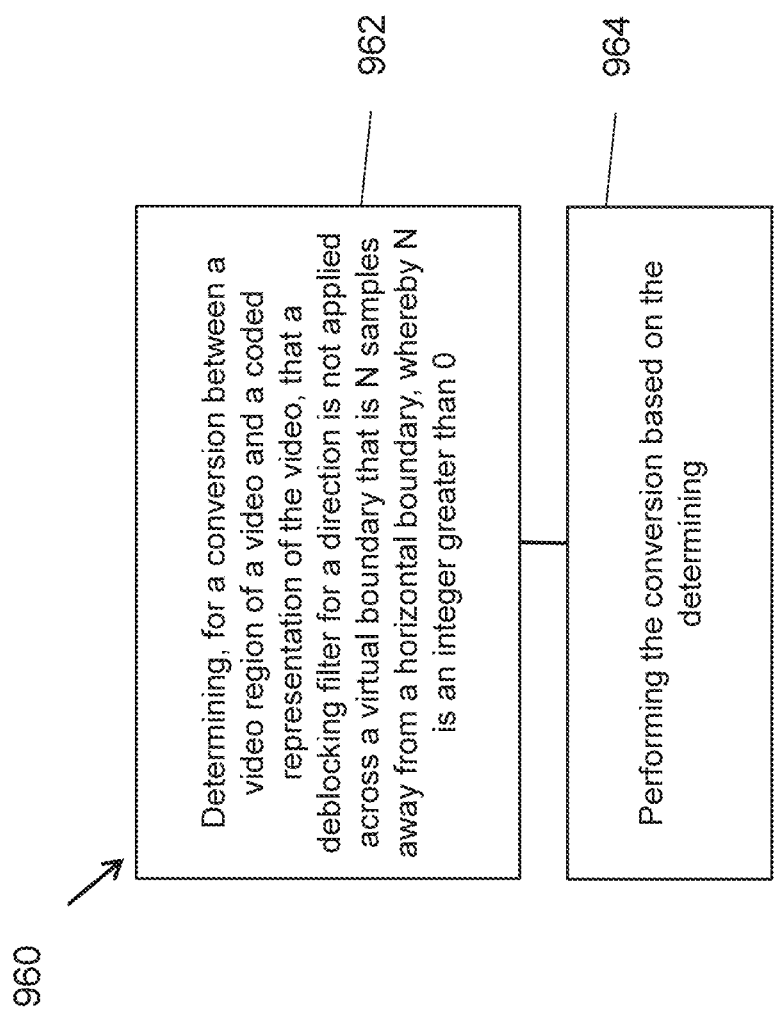

28. A method of video processing (e.g., method 960 depicted in FIG. 9F), comprising: determining (962), for a conversion between a video region of a video and a coded representation of the video, that a deblocking filter for a direction is not applied across a virtual boundary that is N samples away from a horizontal boundary, whereby N is an integer greater than 0; and performing (964) the conversion based on the determining.

29. The method of clause 28, wherein N is 4 for the video region corresponding to a luma component and N is 2 for the video region corresponding to a chroma component.

30. The method of clause 28 or 29, wherein the determining determines that the deblocking filter for a horizontal direction is not applied to a boundary of a transform unit, coding unit, prediction unit, or subblock of the current video block, the boundary coinciding with the virtual boundary.

31. The method of clause 28 or 29, wherein the determining determines that the deblocking filter for a vertical direction is applied to a boundary of a transform unit, coding unit, prediction unit, or subblock of the current video block, the boundary coinciding with the virtual boundary.

Figure 9G:
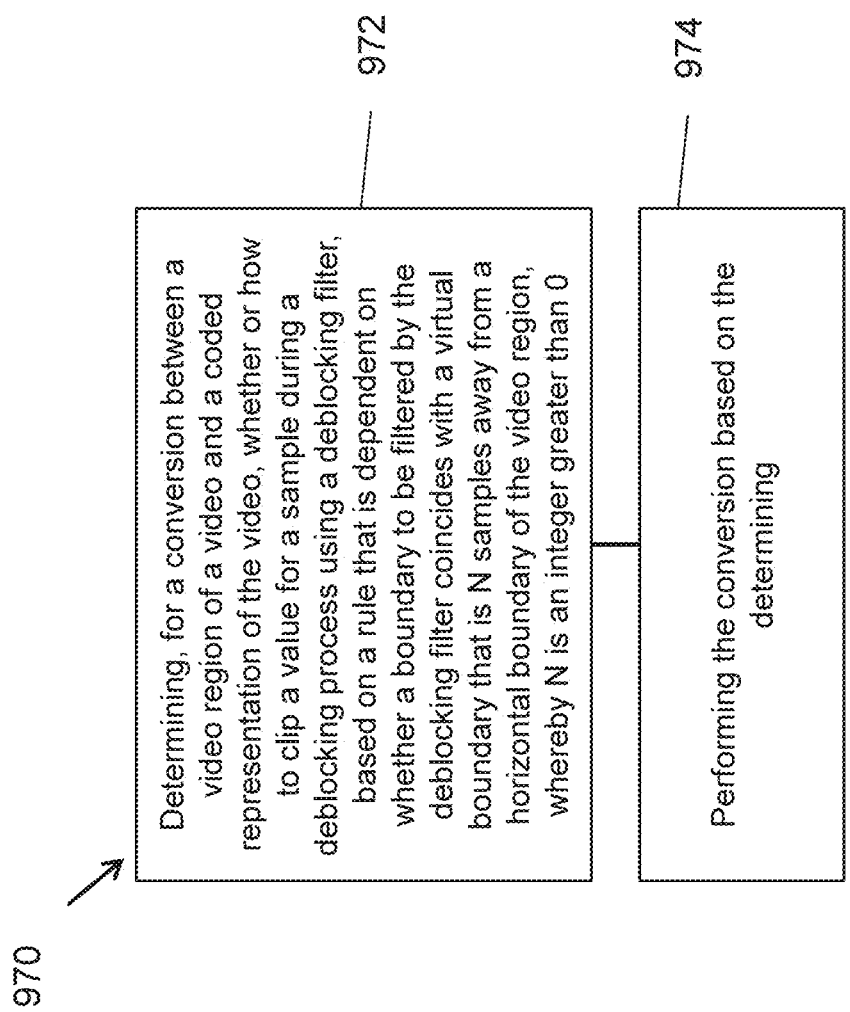

32. A method of video processing (e.g., method 970 depicted in FIG. 9G), comprising: determining (972), for a conversion between a video region of a video and a coded representation of the video, whether or how to clip a value for a sample during a deblocking process using a deblocking filter, based on a rule that is dependent on whether a boundary to be filtered by the deblocking filter coincides with a virtual boundary that is N samples away from a horizontal boundary of the video region, whereby N is an integer greater than 0; and performing (974) the conversion based on the determining.

33. The method of clause 32, wherein the rule specifies that the sample with a value (p) modified to a different value (p') by using the deblocking filter, where p'=p+d', and d'=Clip3(t1, t2, d), where d is derived during the conversion and wherein [t1, t2] is a clipping range, where t1 and t2 are integers.

34. The method of clause 33, wherein t1 or t2 depend on whether the deblocking filter is applied to the virtual boundary.

35. The method of clause 33 or 34, wherein $t1=-2^N$ and $t2=2^N-1$, where N is an integer.

36. The method of clause 35, wherein N is dependent on a color component and/or a sample bit depth.

Figure 9H:
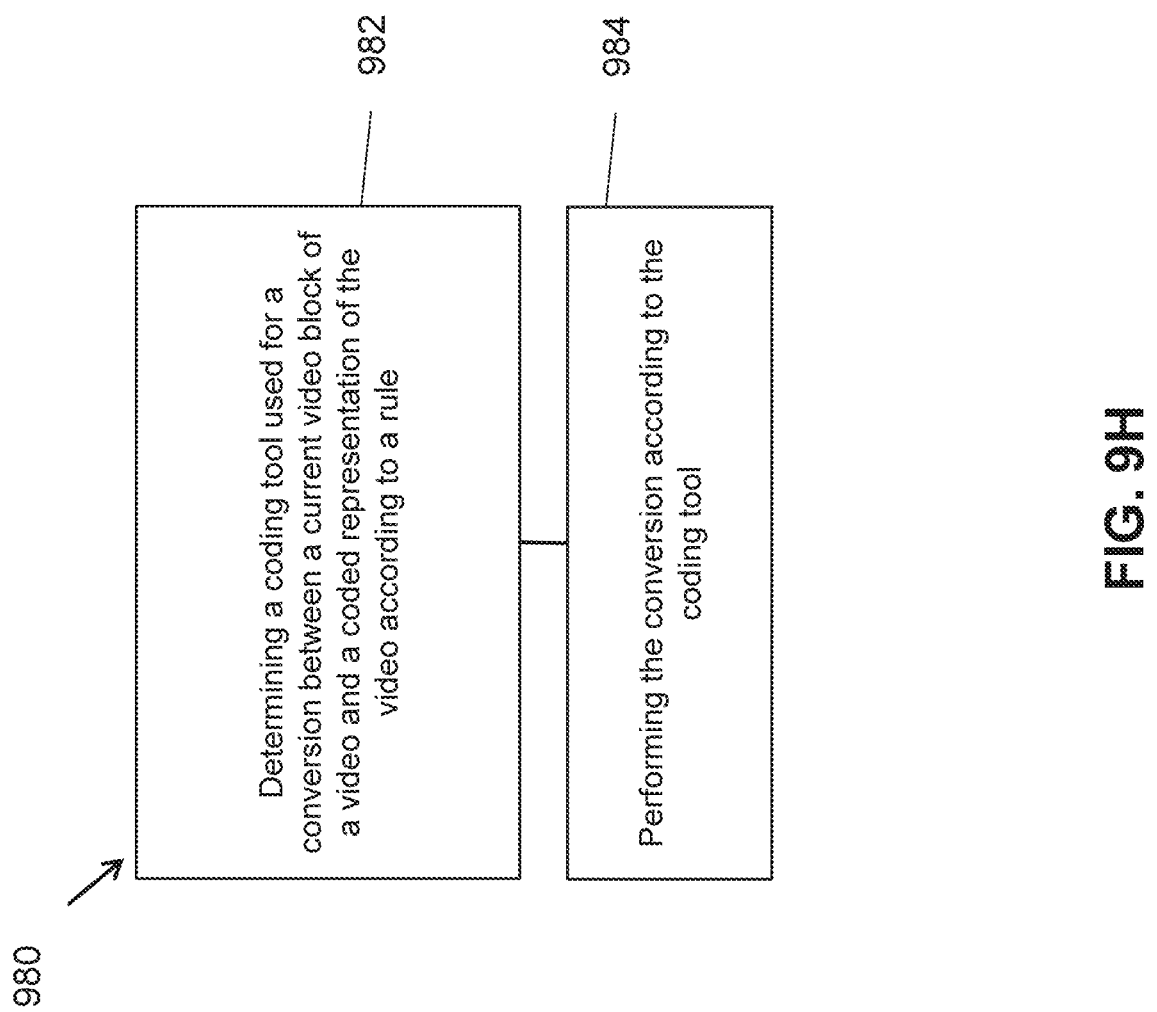

37. A method of video processing (e.g., method 980 depicted in FIG. 9H), comprising: determining (982) a coding tool used for a conversion between a current video block of a video and a coded representation of the video according to a rule, and performing (984) the conversion according to the coding tool, wherein the rule specifies that a sub-block transform (SBT) tool is used exclusively with a subblock based coding mode.

38. The method of clause 37, wherein the subblock-based coding mode includes an affine coding mode or a SbTMVP (subblock temporal motion vector predictor) mode.

Figure 9I:
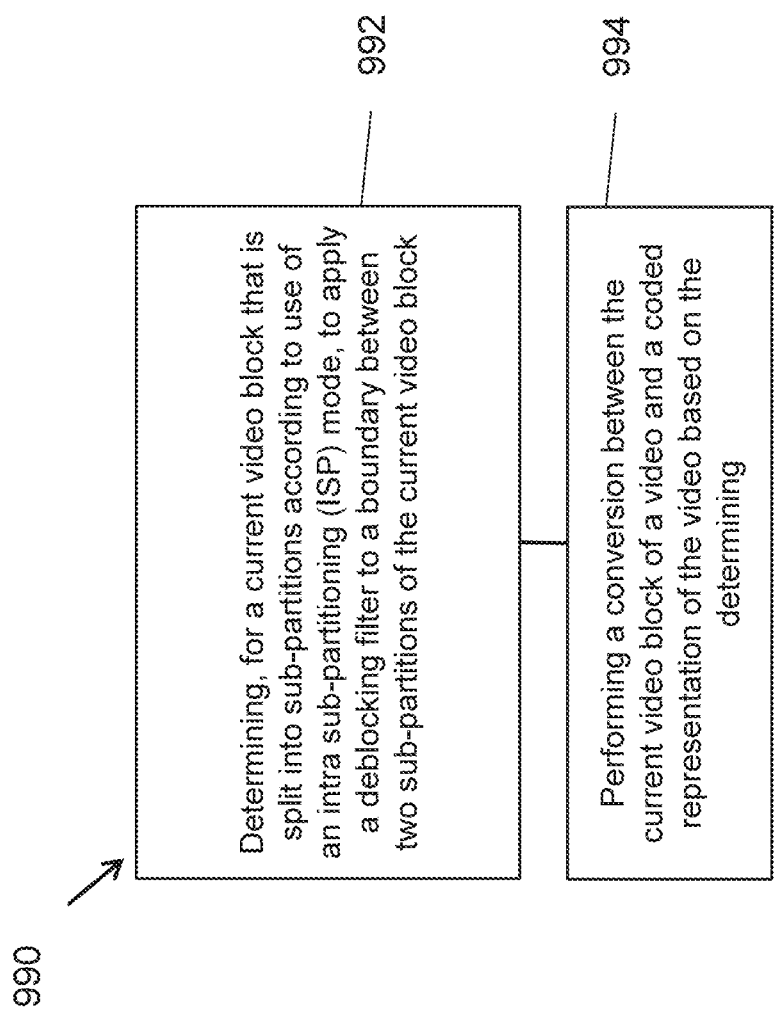
Figure 10A:
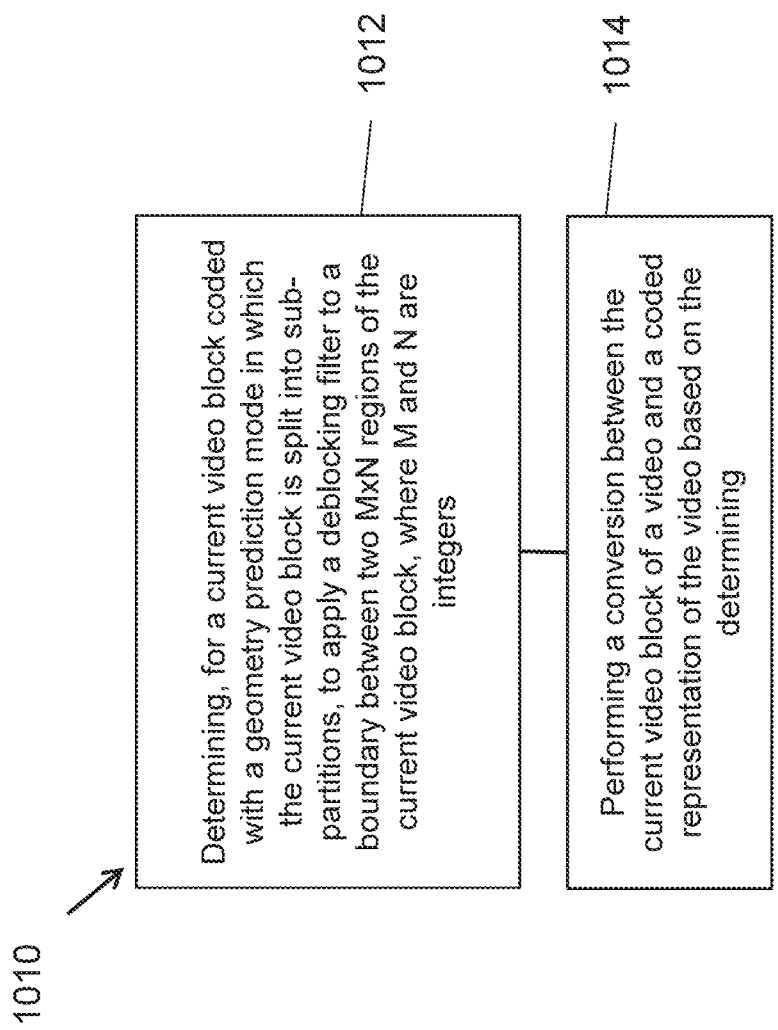
FIGS. 10A to 10C show flowcharts for example methods of video processing.
Figure 10B:
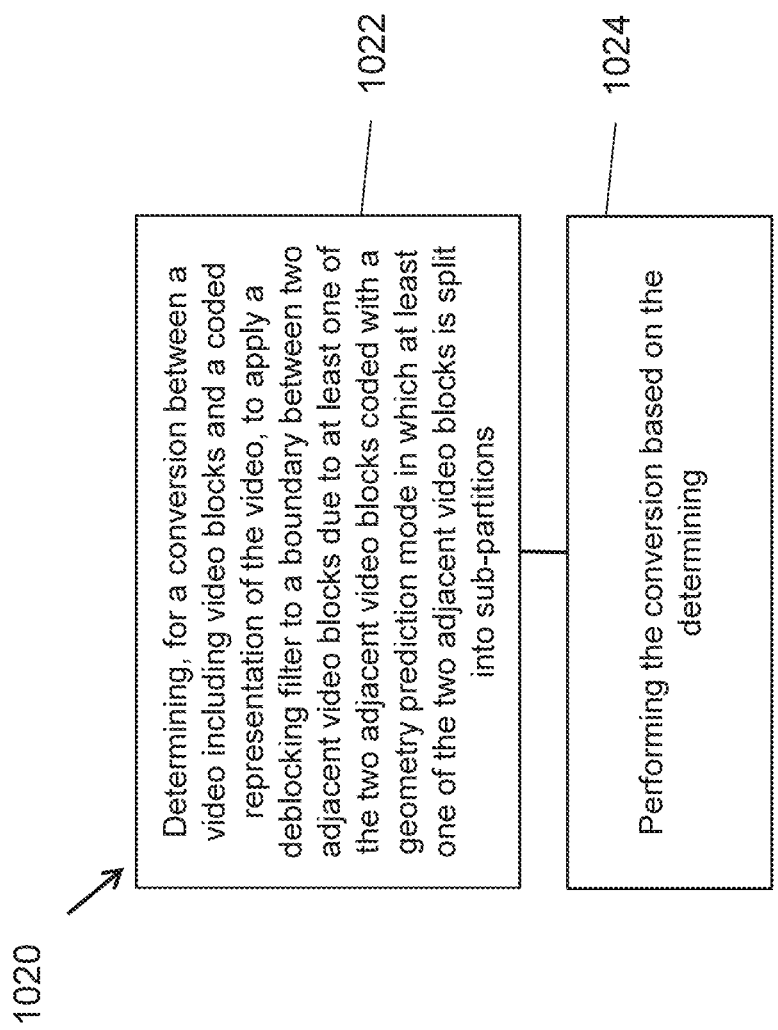
Figure 10C:
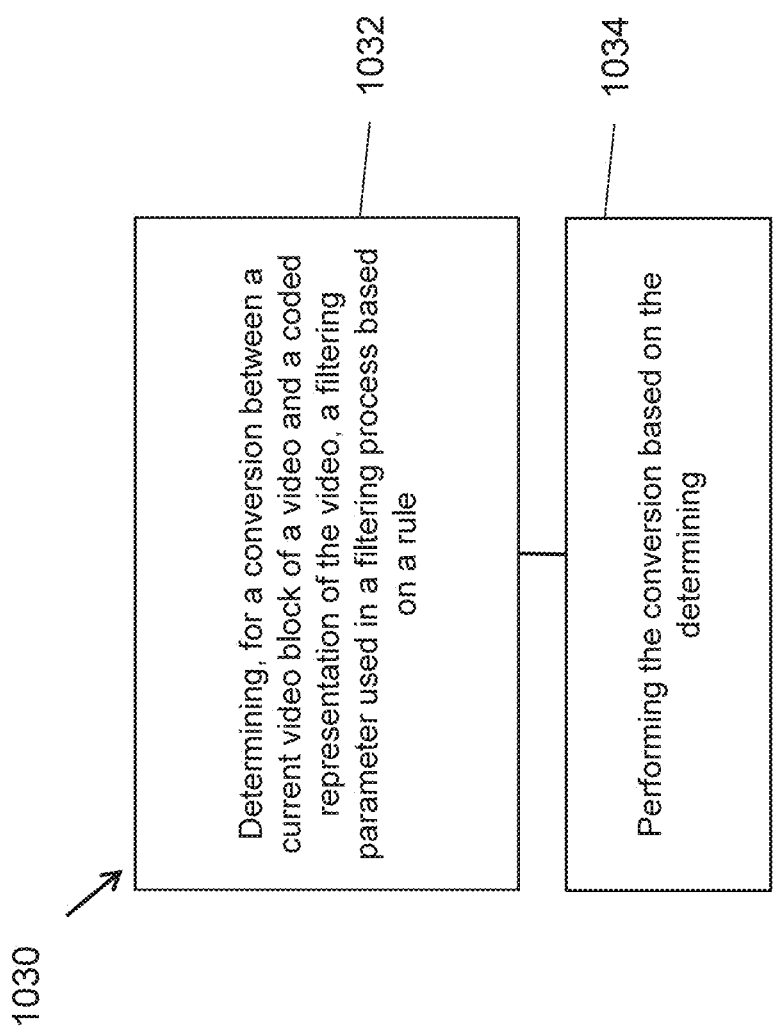

39. The method of clause 37 or 38, wherein the coded representation excludes a syntax element for the sub-block-based coding mode that is excluded due to the rule.
40. A method of video processing (e.g., method 990 depicted in FIG. 9I), comprising: determining (992), for a current video block that is split into sub-partitions according to use of an intra sub-partitioning (ISP) mode, to apply a deblocking filter to a boundary between two sub-partitions of the current video block; and performing (994) a conversion between the current video block of a video and a coded representation of the video based on the determining.
41. The method of clause 40, wherein a vertical boundary at column x between the two sub-partitions of the current video block is filtered by the deblocking filter in a case that x satisfies x=M*P+offset and/or x<W, where offset, M and P are positive integers and W is a width of the current video block.
42. The method of clause 40, wherein a horizontal boundary at row y between the two sub-partitions of the current video block is filtered by the deblocking filter in a case that y satisfies y=M*P+offset and/or y<H, where offset, M and P are positive integers and H is a height of the current video block.
43. A method of video processing (e.g., method 1010 depicted in FIG. 10A), comprising: determining (1012), for a current video block coded with a geometry prediction mode in which the current video block is split into sub-partitions, to apply a deblocking filter to a boundary between two M×N regions of the current video block, where M and N are integers; and performing (1014) a conversion between the current video block of a video and a coded representation of the video based on the determining.
44. The method of clause 43, wherein M×N is equal to 4×4 or 8×8.
45. A method of video processing (e.g., method 1020 depicted in FIG. 10B), comprising: determining (1022), for a conversion between a video including video blocks and a coded representation of the video, to apply a deblocking filter to a boundary between two adjacent video blocks due to at least one of the two adjacent video blocks coded with a geometry prediction mode in which at least one of the two adjacent video blocks is split into sub-partitions; and performing (1024) the conversion based on the determining.
46. A method of video processing (e.g., method 1030 depicted in FIG. 10C), comprising: determining (1032), for a conversion between a current video block of a video and a coded representation of the video, a filtering parameter used in a filtering process based on a rule; and performing (1034) the conversion based on the determining, and wherein the rule specifies that the filtering parameter is dependent on i) motion information used in a motion compensation process, ii) motion information stored in a motion storage, or iii) motion information used in a motion vector prediction process.
47. The method of clause 46, wherein the rule specifies that the filtering process is based on the motion information used in the motion compensation process for the current video block coded with a geometry prediction mode in which at least one of the two adjacent video blocks is split into sub-partitions.
48. The method of clause 47, wherein the rule further specifies to use a motion vector used in the motion compensation process during a deblocking filter strength derivation process and/or for a deblocking boundary filtering strength setting.
49. The method of clause 47, wherein the rule further specifies that stored H×H motion vectors of the current video block is not used for a deblocking boundary filtering strength setting, whereby H is an integer greater than 0.
50. The method of clause 47, wherein the rule is dependent on decoded information and/or a block dimension.
51. A method of video processing, comprising: performing a conversion between a video and a coded representation of the video, and wherein the coded representation conforms to a formatting rule, wherein the formatting rule specifies whether to include a chroma syntax element indicative of a chroma component in the coded representation based on a chroma format, a coding mode associated with the chroma component, or a chroma information syntax element.
52. The method of clause 51, wherein the chroma syntax element is a Cb/Cr flag that is conditionally signaled in a picture parameter set according to the chroma format sampling structure or the chroma information syntax element.
53. The method of clause 51, wherein the chroma syntax element, called X, is signaled if ChromaArrayType is equal to true.
54. The method of clause 51 or 52, wherein the chroma syntax element, called X, is signaled only for the chroma format being a monochrome format.
55. The method of clause 51 or 52, wherein the chroma syntax element, called X, is signaled only for the chroma format being 4:4:4 and where a separate color flag is set to 1.
56. The method of clause 51 or 52, wherein the chroma syntax element, called X, is signaled only for the chroma information syntax element is set to 1.
57. The method of any of clauses 52 to 56, wherein X is i) pps_cb_qp_offset or ii) pps_cr_qp_offset or iii) pps_joint_cbcr_qp_offset or iv) cu_chroma_qp_offset_enabled_flag or v) pps_slice_chroma_qp_offsets_present_flag.
58. The method of any of clauses 1 to 57, wherein the performing of the conversion includes generating the coded representation from the current video block.
59. The method of any of clauses 1 to 57, wherein the performing of the conversion includes generating the current video block from the coded representation.
60. A video processing apparatus comprising a processor configured to implement a method recited in any one or more of clauses 1 to 59.
61. A computer readable medium storing program code that, when executed, causes a processor to implement a method recited in any one or more of clauses 1 to 59. In some embodiments, a computer readable medium that stores a coded representation or a bitstream generated according to a technique described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (CD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for subblocks of a current video block of a video which is coded with a subblock temporal motion vector predictor mode or an affine prediction mode, subblock boundaries to which a deblocking filter is to be applied according to a rule; and
   performing a conversion between the current video block and a bitstream of the video based on the determining,
   wherein the rule specifies that when determining the subblock boundaries, a second deblocking filter length for a second horizontal subblock boundary of the subblock boundaries at a second vertical position (y2) and a second horizontal position (x2) inside the current video block is determined based on checking one or both of i) whether a boundary at a vertical position (y2+dy) and the second horizontal position (x2) is a transform block boundary or not, ii) whether a boundary at a vertical position (y2−dy) and the second horizontal position (x2) is a transform block boundary or not, where dy is an integer greater or equal to 0.

2. The method of claim 1, wherein the second deblocking filter length is equal to 1 in response to meeting at least one of i) the boundary at the vertical position (y2+dy) and the second horizontal position (x2) is a transform block boundary, or ii) the boundary at the vertical position (y2−dy) and the second horizontal position (x2) is a transform block boundary, wherein the second deblocking filter length includes a deblocking filter length for P side or a deblocking filter length for Q side.

3. The method of claim 1, wherein the second deblocking filter length is determined by omitting checking a second relationship between y2+dy and a height of the current video block.

4. The method of claim 3, wherein the second relationship between y2+dy and the height of the current video block comprises whether y2+dy is greater than or equal to the height of the current video block.

5. The method of claim 1, wherein dy is equal to 4 or 8.

6. The method of claim 1, wherein the rule specifies that when determining the subblock boundaries, a first deblocking filter length for a first vertical subblock boundary of the subblock boundaries at a first horizontal position (x1) and a first vertical position (y1) inside the current video block is determined based on checking one or both of i) whether a boundary at a horizontal position (x1+dx) and the first vertical position (y1) is a transform block boundary or not, ii) whether a boundary at a horizontal position (x1−dx) and the first vertical position (y1) is a transform block boundary or not, where dx is an integer greater or equal to 0.

7. The method of claim 6, wherein the first deblocking filter length is equal to 1 in response to meeting at least one of i) the boundary at the horizontal position (x1+dx) and the first vertical position (y1) is a transform block boundary, or ii) the boundary at the horizontal position (x1−dx) and the first vertical position (y1) is a transform block boundary, wherein the first deblocking filter length includes a deblocking filter length for P side or a deblocking filter length for Q side.

8. The method of claim 6, wherein the first deblocking filter length is determined by omitting checking a first relationship between x1+dx and a width of the current video block.

9. The method of claim 8, wherein the first relationship between x1+dx and the width of the current video block comprises whether x1+dx is greater than or equal to the width of the current video block.

10. The method of claim 6, wherein dx is equal to 4 or 8.

11. The method of claim 1, further comprising determining, during the conversion, that a boundary strength applied to a third subblock boundary of the subblock boundaries is equal to 2, in case that a block edge of the current video block is the third subblock boundary and at least one of two neighboring samples along the third subblock boundary is coded using a combined inter-intra prediction (CIIP) mode.

12. The method of claim 1, wherein the bitstream conforms to a formatting rule, and wherein the formatting rule specifies whether to include one or more quantization related chroma syntax elements in the bitstream based on a chroma format sampling syntax element.

13. The method of claim 12, wherein the one or more quantization related chroma syntax elements are included in a picture parameter set and comprise at least one of i) a first syntax element indicating an offset to a luma quantization parameter used for deriving Cb quantization parameter, ii) a second syntax element indicating an offset to a luma quantization parameter used for deriving Cr quantization parameter, iii) a third syntax element indicating an offset to a luma quantization parameter used for deriving CbCr joint quantization parameter or iv) a fourth syntax element indicating that a flag indicating an offset to a luma quantization parameter used for deriving a chroma component quantization parameter is allowed to be present in coding unit level or a transform unit level or v) a fifth syntax element indicating that a flag indicating an offset to a luma quantization parameter used for deriving the chroma component quantization parameter is allowed to be present in slice level.

14. The method of claim 1, wherein the conversion includes encoding the current video block into the bitstream.

15. The method of claim 1, wherein the conversion includes decoding the current video block from the bitstream.

16. An apparatus for processing video data comprising a processor and a non-transitory memory with instructions thereon, wherein the instructions upon execution by the processor, cause the processor to:
determine, for subblocks of a current video block of a video which is coded with a subblock temporal motion vector predictor mode or an affine prediction mode, subblock boundaries to which a deblocking filter is to be applied according to a rule; and
perform a conversion between the current video block and a bitstream of the video based on the determinization,
wherein the rule specifies that when determining the subblock boundaries, a second deblocking filter length for a second horizontal subblock boundary of the subblock boundaries at a second vertical position (y2) and a second horizontal position (x2) inside the current video block is determined based on checking one or both of i) whether a boundary at a vertical position (y2+dy) and the second horizontal position (x2) is a transform block boundary or not, ii) whether a boundary at a vertical position (y2−dy) and the second horizontal position (x2) is a transform block boundary or not, where dy is an integer greater or equal to 0.

17. The apparatus of claim 16, wherein the second deblocking filter length is equal to 1 in response to meeting at least one of i) the boundary at the vertical position (y2+dy) and the second horizontal position (x2) is a transform block boundary, or ii) the boundary at the vertical position (y2−dy) and the second horizontal position (x2) is a transform block boundary, wherein the second deblocking filter length includes a deblocking filter length for P side or a deblocking filter length for Q side;
wherein the second deblocking filter length is determined by omitting checking a second relationship between y2+dy and a height of the current video block;
wherein the second relationship between y2+dy and the height of the current video block comprises whether y2+dy is greater than or equal to the height of the current video block; and
wherein dy is equal to 4 or 8.

18. A non-transitory computer-readable storage medium storing instructions that cause a processor to:
determine, for subblocks of a current video block of a video which is coded with a subblock temporal motion vector predictor mode or an affine prediction mode, subblock boundaries to which a deblocking filter is to be applied according to a rule; and
perform a conversion between the current video block and a bitstream of the video based on the determining,
wherein the rule specifies that when determining the subblock boundaries, a second deblocking filter length for a second horizontal subblock boundary of the subblock boundaries at a second vertical position (y2) and a second horizontal position (x2) inside the current video block is determined based on checking one or both of i) whether a boundary at a vertical position (y2+dy) and the second horizontal position (x2) is a transform block boundary or not, ii) whether a boundary at a vertical position (y2−dy) and the second horizontal position (x2) is a transform block boundary or not, where dy is an integer greater or equal to 0.

19. The non-transitory computer-readable storage medium of claim 18, wherein the second deblocking filter length is equal to 1 in response to meeting at least one of i)

the boundary at the vertical position (y2+dy) and the second horizontal position (x2) is a transform block boundary, or ii) the boundary at the vertical position (y2−dy) and the second horizontal position (x2) is a transform block boundary, wherein the second deblocking filter length includes a deblocking filter length for P side or a deblocking filter length for Q side;

wherein the second deblocking filter length is determined by omitting checking a second relationship between y2+dy and a height of the current video block;

wherein the second relationship between y2+dy and the height of the current video block comprises whether y2+dy is greater than or equal to the height of the current video block; and wherein dy is equal to 4 or 8.

20. A non-transitory computer-readable recording medium storing a bitstream of a video which is generated by a method performed by a video processing apparatus, wherein the method comprises:

determining, for subblocks of a current video block of the video which is coded with a subblock temporal motion vector predictor mode or an affine prediction mode, subblock boundaries to which a deblocking filter is to be applied according to a rule; and generating the bitstream based on the determining, wherein the rule specifies that when determining the subblock boundaries, a second deblocking filter length for a second horizontal subblock boundary of the subblock boundaries at a second vertical position (y2) and a second horizontal position (x2) inside the current video block is determined based on checking one or both of i) whether a boundary at a vertical position (y2+dy) and the second horizontal position (x2) is a transform block boundary or not, ii) whether a boundary at a vertical position (y2−dy) and the second horizontal position (x2) is a transform block boundary or not, where dy is an integer greater or equal to 0.

* * * * *